(12) United States Patent
Kimura et al.

(10) Patent No.: US 7,101,127 B2
(45) Date of Patent: Sep. 5, 2006

(54) INTERCHANGEABLE BLADE CUTTING TOOL AND BLADE SECTION INSTALLED THEREON

(75) Inventors: Yoshihiko Kimura, Iwai (JP); Toru Nakamura, Shimotsuma (JP); Taro Abe, Iwai (JP); Takahiro Sato, Tsukuba (JP)

(73) Assignee: Mitsubishi Materials Corporation, Tokyo (JP)

( * ) Notice: Subject to any disclaimer, the term of this patent is extended or adjusted under 35 U.S.C. 154(b) by 186 days.

(21) Appl. No.: 10/378,497

(22) Filed: Mar. 3, 2003

(65) Prior Publication Data

US 2003/0164597 A1  Sep. 4, 2003

(30) Foreign Application Priority Data

| Mar. 4, 2002 | (JP) | ............................. 2002-057548 |
| Jul. 18, 2002 | (JP) | ............................. 2002-209820 |
| Oct. 23, 2002 | (JP) | ............................. 2002-308518 |

(51) Int. Cl.
*B23B 31/02* (2006.01)

(52) U.S. Cl. ...................... 409/232; 409/231; 409/234; 409/233; 408/239 A

(58) Field of Classification Search ................ 409/233, 409/234, 231, 232; 408/239 R, 238, 339 A, 408/239 A; 279/155
See application file for complete search history.

(56) References Cited

U.S. PATENT DOCUMENTS

| 829,633 A | 8/1906 | Decker |
| 2,109,108 A | 2/1938 | Fesler |
| 4,850,759 A | 7/1989 | Strand et al. |
| 4,906,147 A * | 3/1990 | Friesinger et al. .......... 409/234 |
| 4,964,762 A | 10/1990 | Arai et al. |
| RE34,256 E | 5/1993 | Strand et al. |
| 5,690,137 A * | 11/1997 | Yamada ...................... 409/233 |
| 5,730,562 A * | 3/1998 | Matsumoto et al. ........ 409/233 |
| 5,899,642 A | 5/1999 | Berglow et al. |
| 6,079,919 A * | 6/2000 | Zosi ........................... 409/233 |
| 6,260,855 B1* | 7/2001 | Curtis ......................... 409/233 |

(Continued)

FOREIGN PATENT DOCUMENTS

FR      1 589 460       5/1970

(Continued)

*Primary Examiner*—Monica Carter
*Assistant Examiner*—Dana Ross
(74) *Attorney, Agent, or Firm*—Darby & Darby

(57) ABSTRACT

Eccentricity is not allowed to occur in a blade section, and a blade section is maintained in a stable installation state. A hook section 124, which is composed of a shaft section 125 and an end section 126 provided with a corner section 132 that protrudes as a ledge farther to the outside in the radial direction than this shaft section 125, is formed in a blade section 120. A hook hole 144, which allows the passage of end section 126 of hook section 124, is formed in a bolt section 140. Engaging sections 150 are formed around hook hole 144. Corner sections 132 of end section 126 of hook section 124 are engaged with engaging sections 150 when blade section 120 and bolt section 140 are relatively moved in the direction in which they move away from each other in the direction of an axis O in the state in which blade section 120 is rotated by about 60° towards the front in a direction of screwing rotation S with respect to bolt section 140 after inserting and passing end section 126 of hook section 124 through hook hole 144.

9 Claims, 34 Drawing Sheets

U.S. PATENT DOCUMENTS

| | | | |
|---|---|---|---|
| 6,287,059 B1 * | 9/2001 | Hashidate et al. | 409/233 |
| 6,352,395 B1 * | 3/2002 | Matsumoto et al. | 409/234 |
| 6,370,995 B1 * | 4/2002 | Skoog | 409/233 |
| 6,419,430 B1 * | 7/2002 | Hangleiter | 409/233 |

FOREIGN PATENT DOCUMENTS

| | | |
|---|---|---|
| GB | 990353 | 4/1965 |
| GB | 2 158 374 A1 | 11/1985 |

* cited by examiner

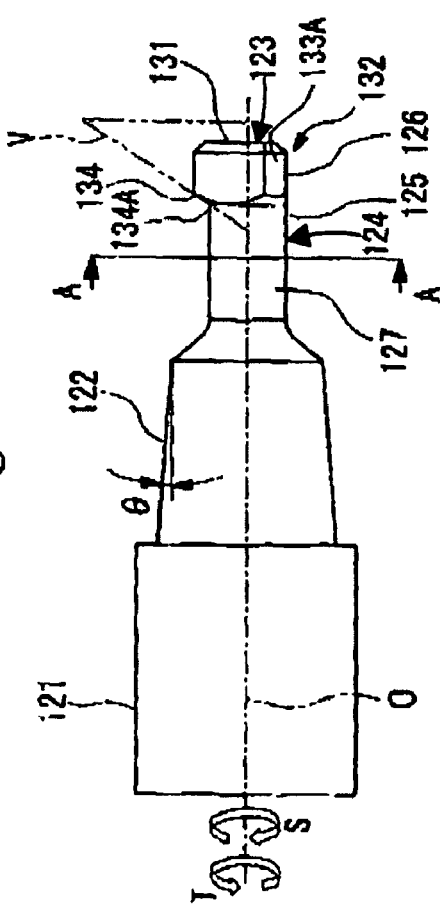
Fig. 4A
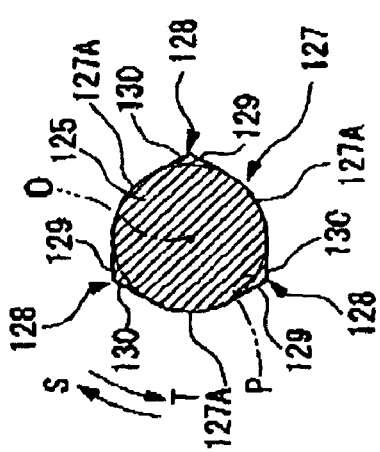
Fig. 4B
Fig. 4C

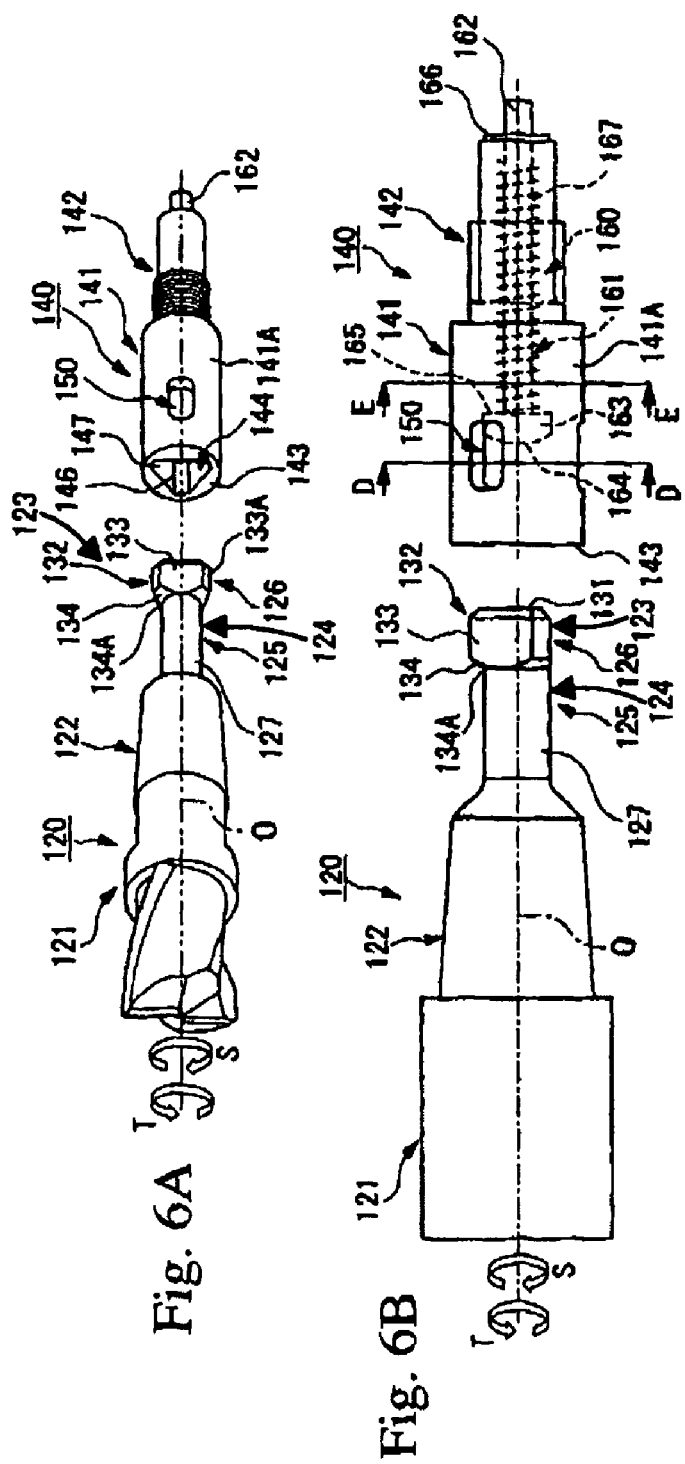
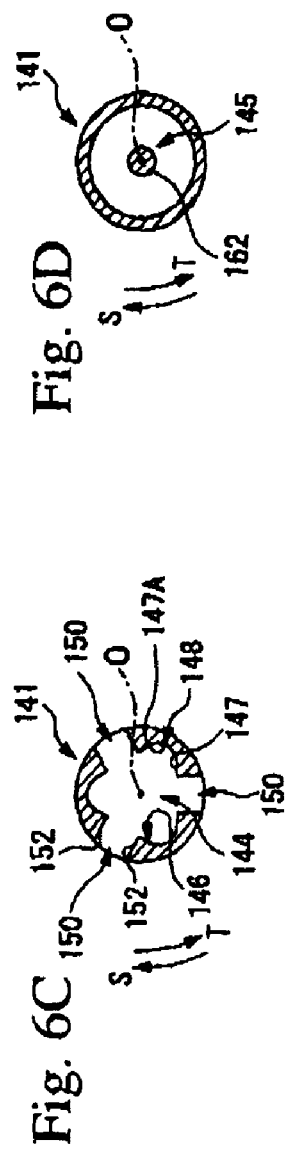
Fig. 6A
Fig. 6B
Fig. 6C
Fig. 6D

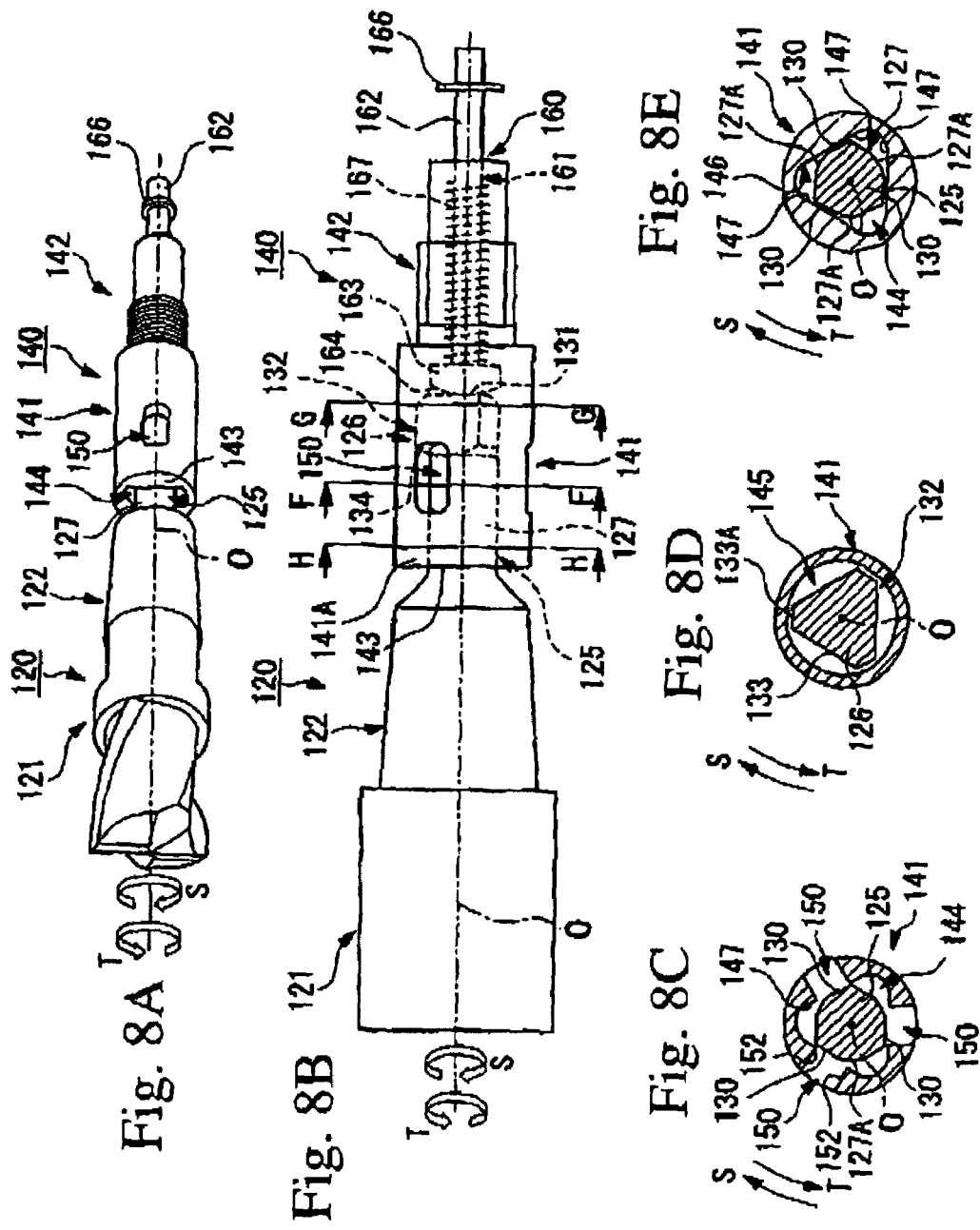

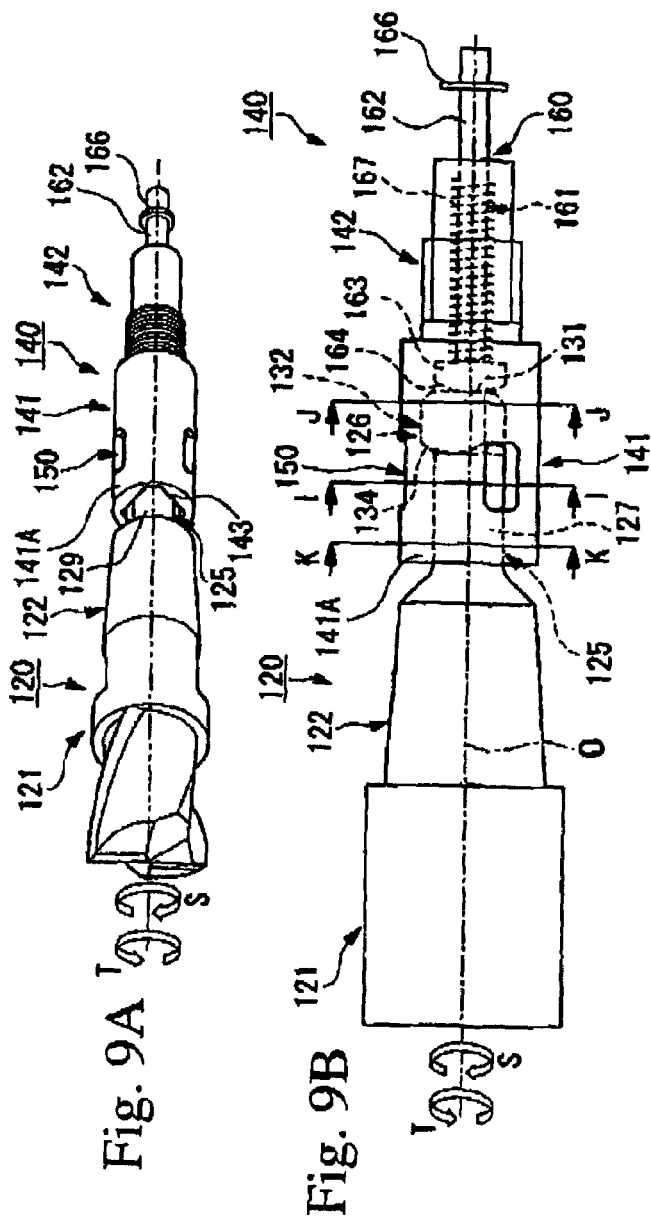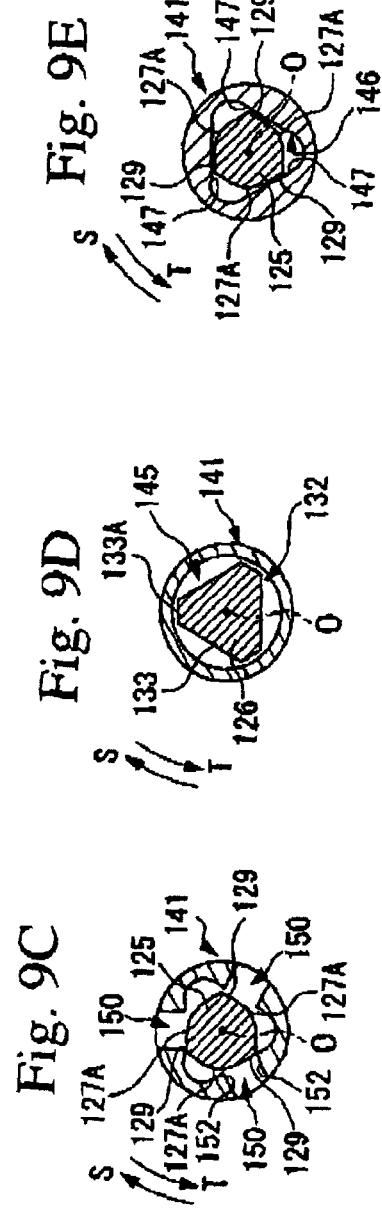

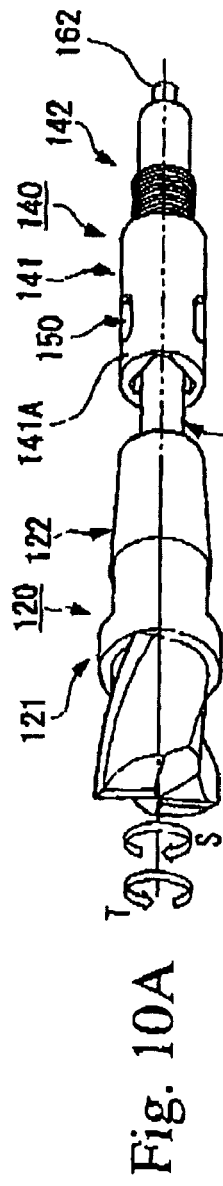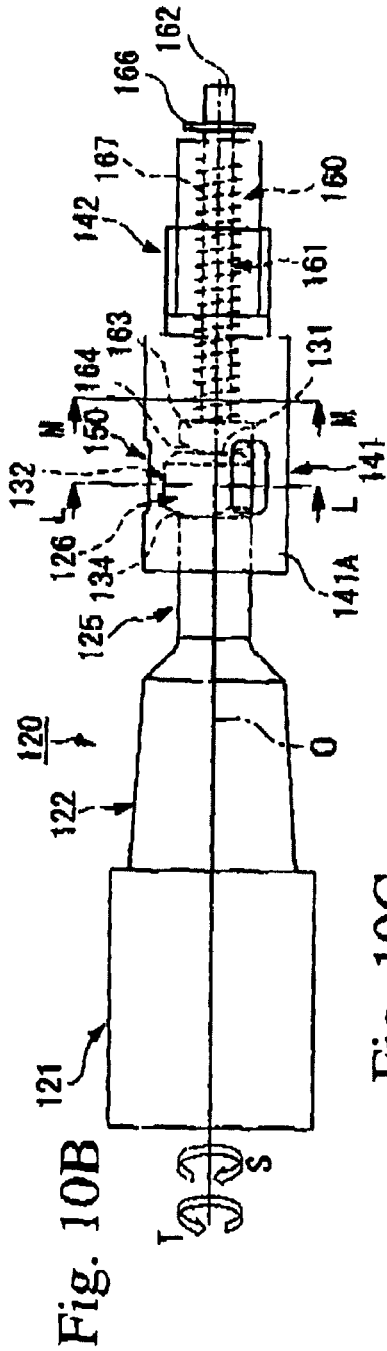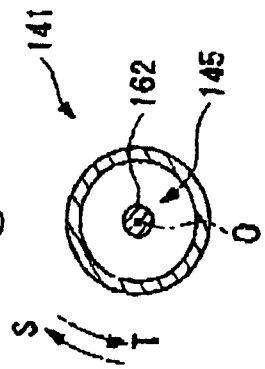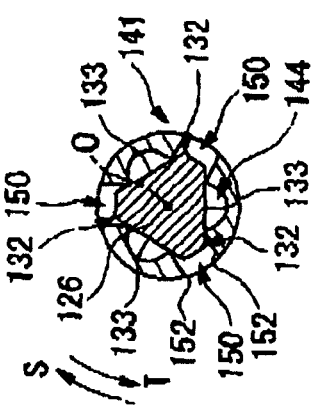
Fig. 10A
Fig. 10B
Fig. 10D
Fig. 10C

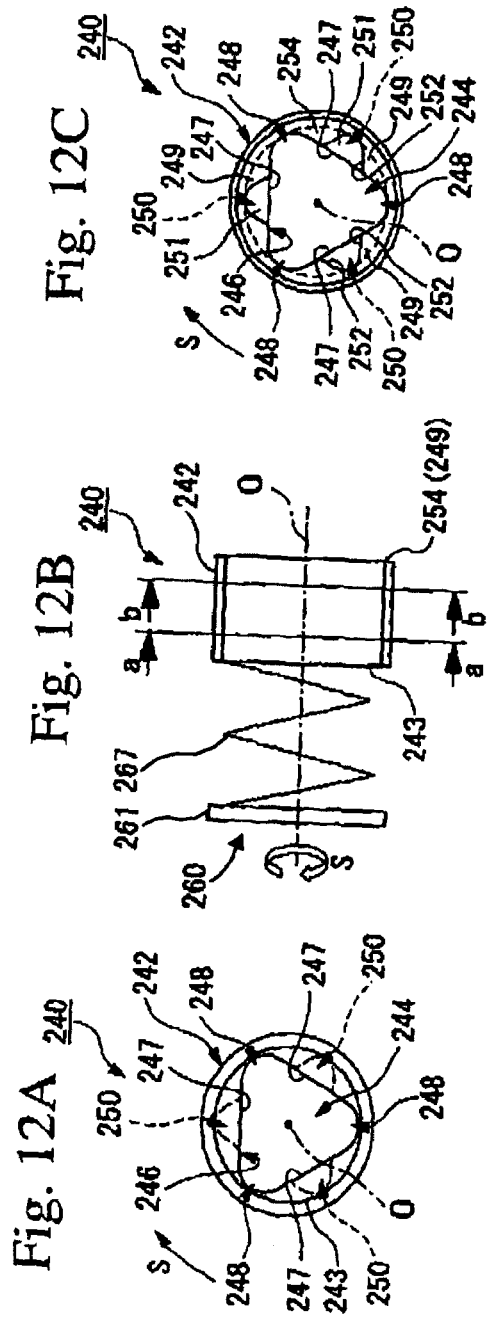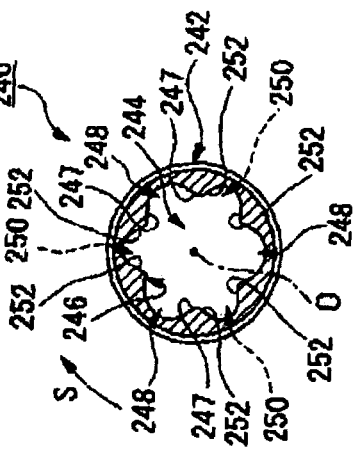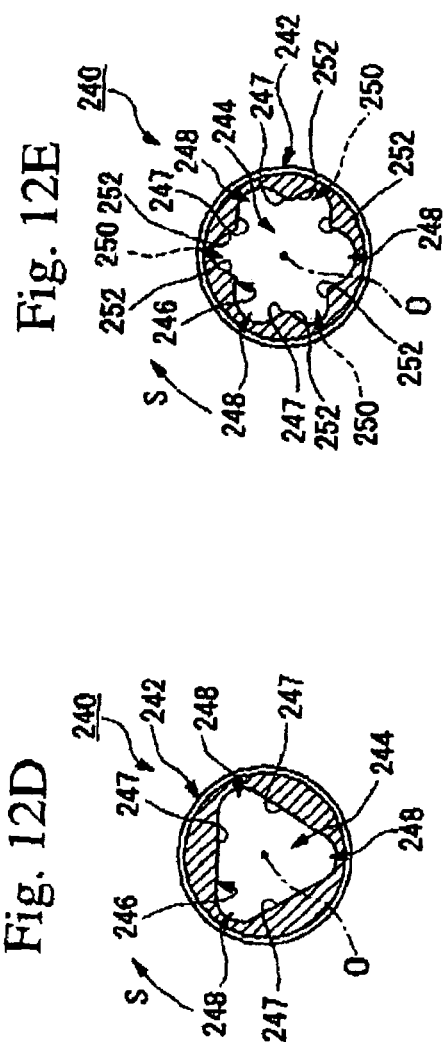

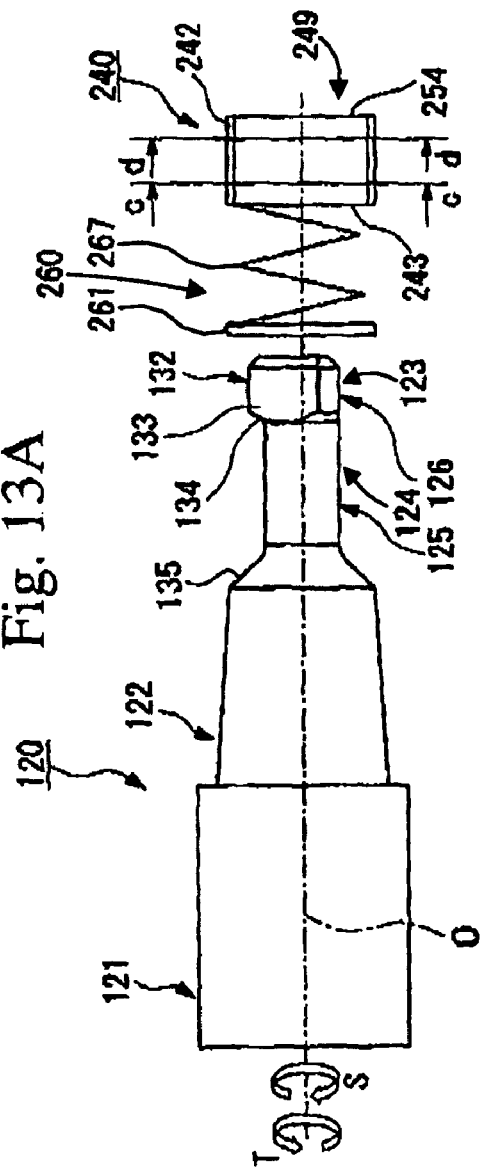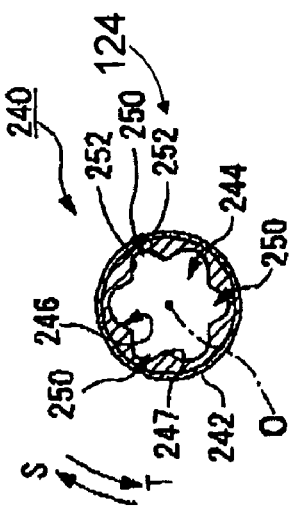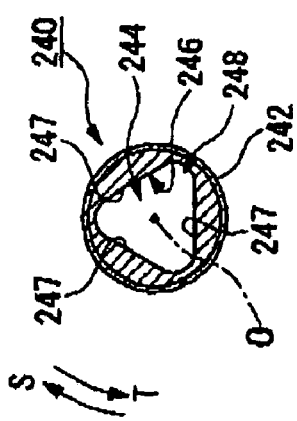

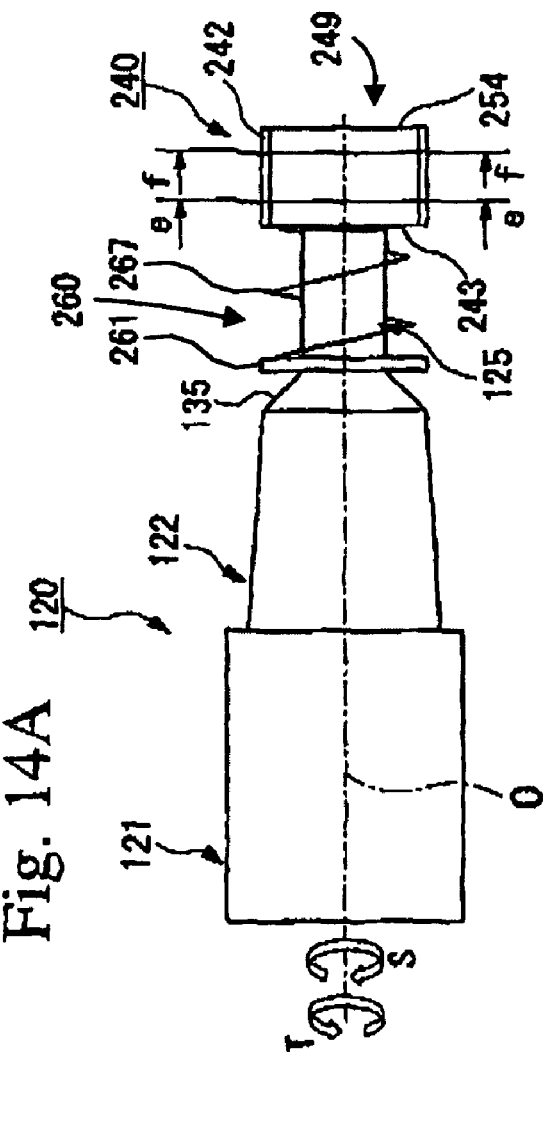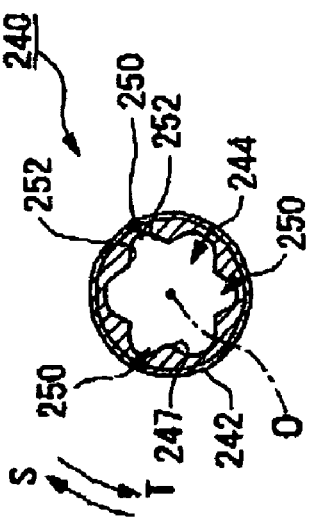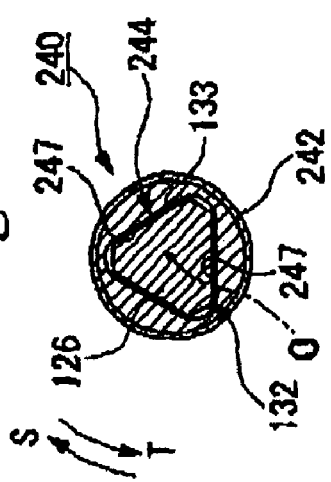
Fig. 14A
Fig. 14C
Fig. 14B

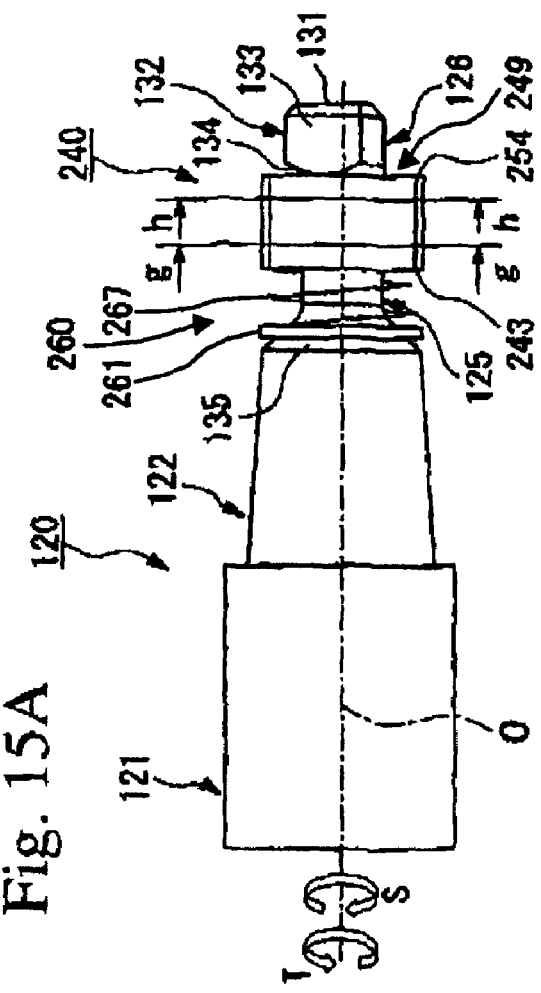
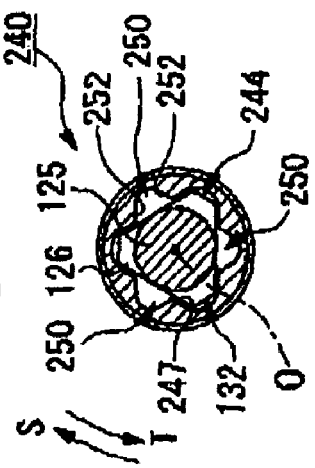
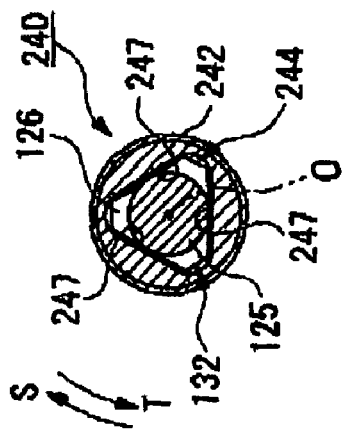

Fig. 27A
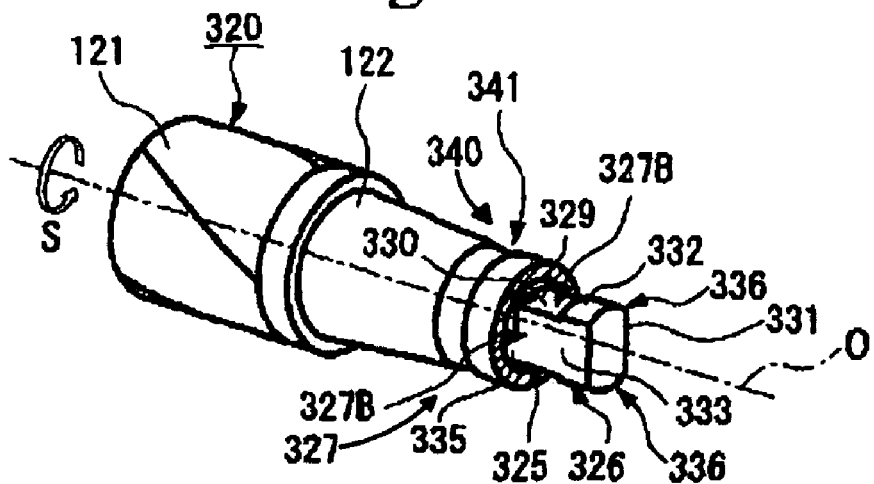
Fig. 27B
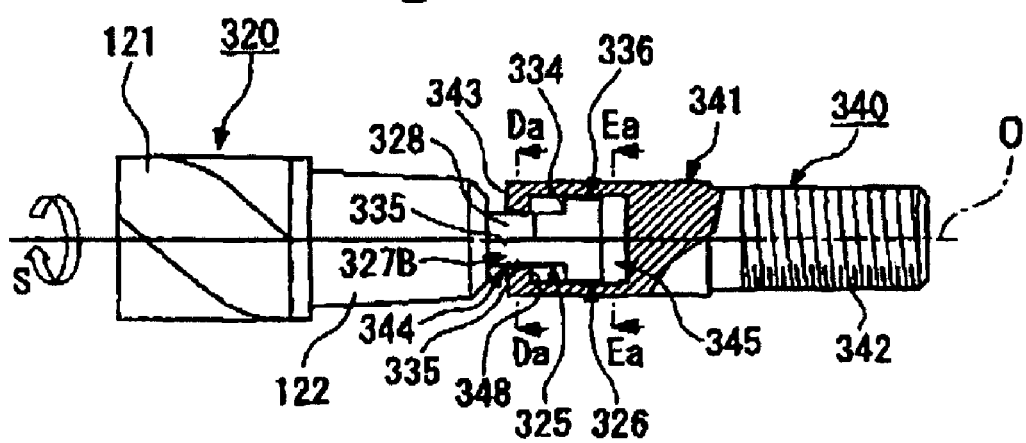
Fig. 27C
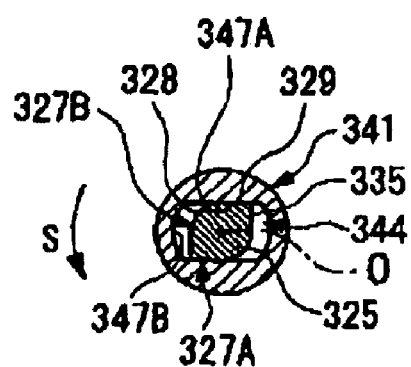
Fig. 27D

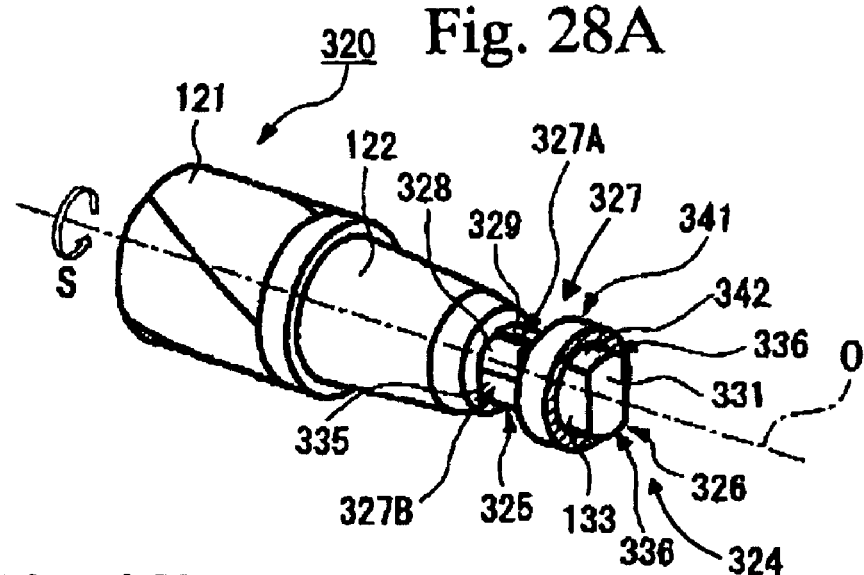
Fig. 28A
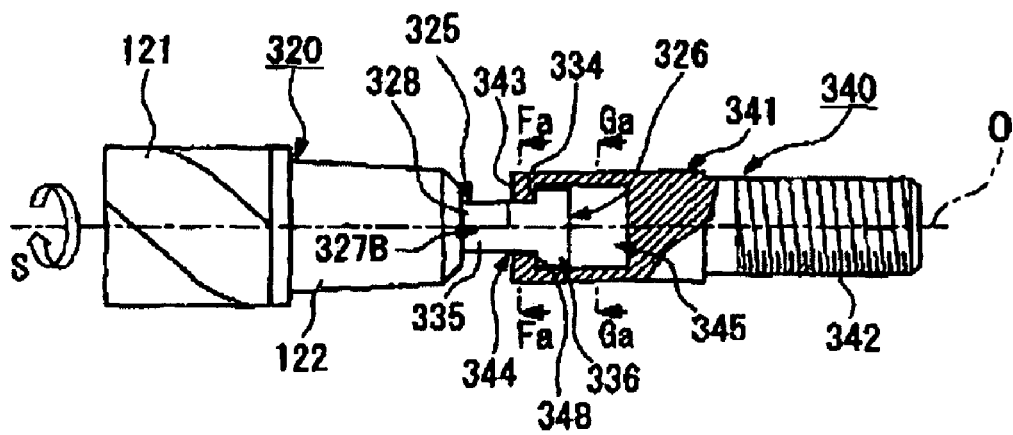
Fig. 28B
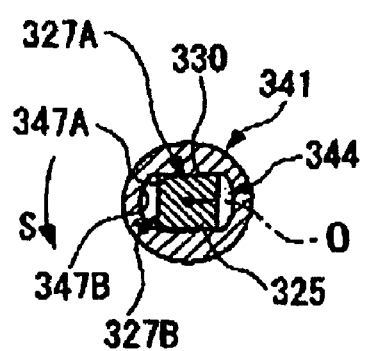
Fig. 28C
Fig. 28D

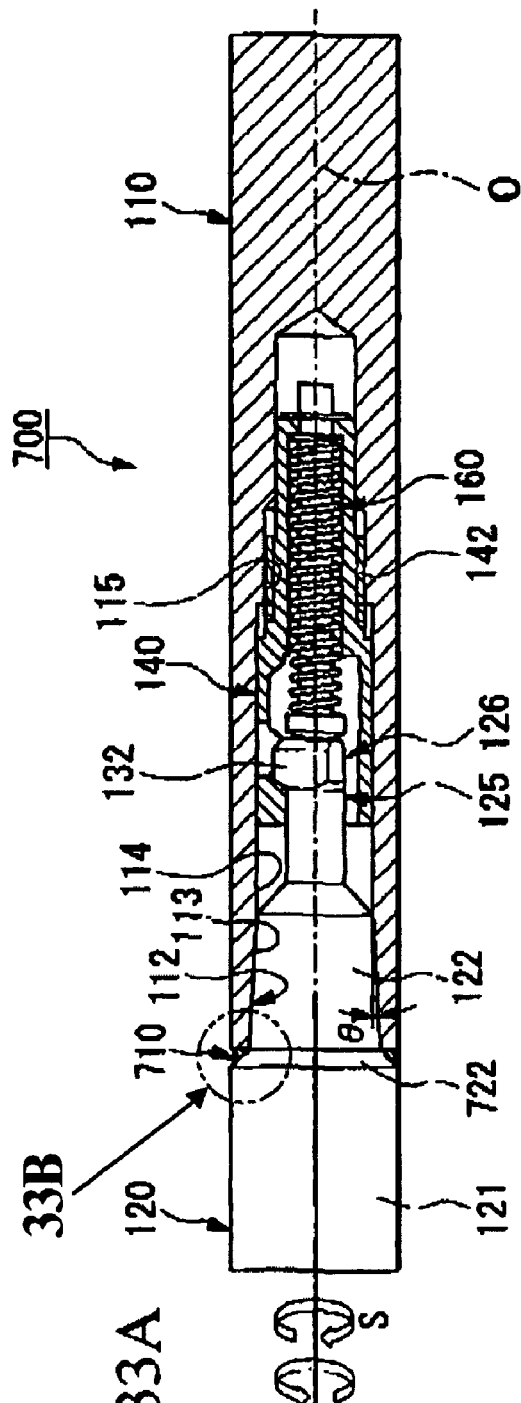
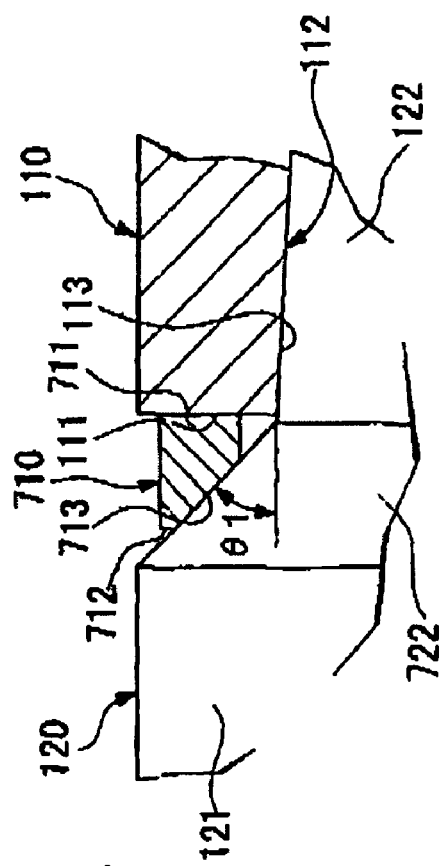
Fig. 33A
Fig. 33B

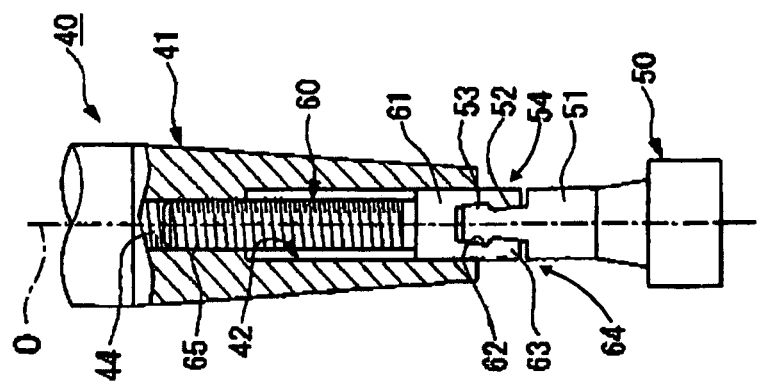
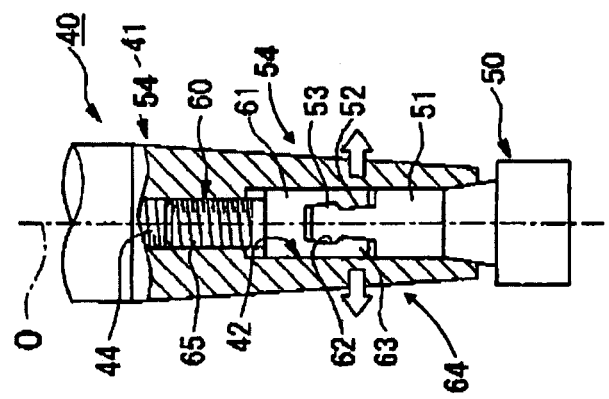
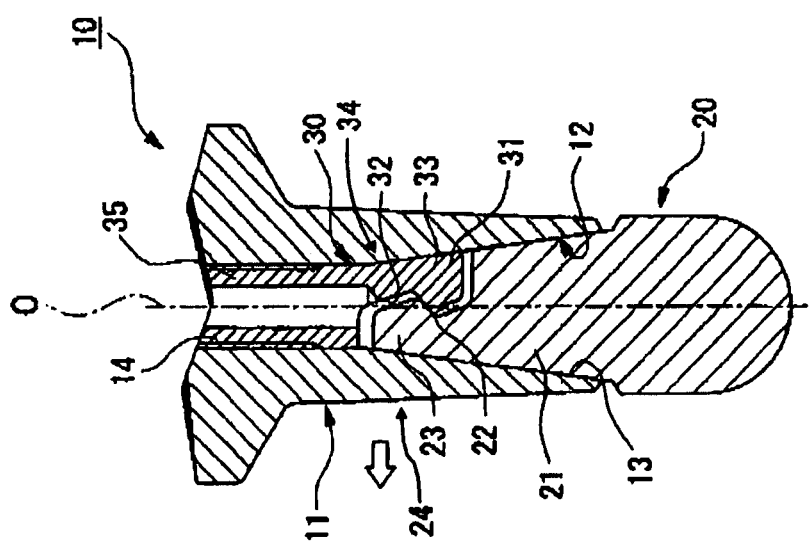
PRIOR ART

PRIOR ART

INTERCHANGEABLE BLADE CUTTING TOOL AND BLADE SECTION INSTALLED THEREON

BACKGROUND ART

1. Field of the Invention

The present invention relates to an interchangeable blade cutting tool in which a blade section is removably installed on a tool body.

2. Prior Art

An example of this kind of interchangeable blade cutting tool of the prior art consists of removably coupling a rear end section of a blade section having a cutting section at least equipped with one cutting blade, and a front end side portion of a bolt section having male threads, wherein together with this coupled blade section and bolt section being inserted into a mounting hole having female threads provided in a tool body, as a result of the male threads of the bolt section engaging with the female threads of the mounting hole, the blade section is removably installed by being drawn into the rear end side in the axial direction of the tool body.

For example, as shown in FIG. 34, an interchangeable blade cutting tool 10 is disclosed in Japanese Patent No. 2656949, as shown by its FIGS. 2 and 4. In this cutting tool 10, hook section 24 composed of groove 22 and flange 23 that opens extending in the lateral direction, is formed by cutting away the outer peripheral surface of tapered section 21 which is the rear end side of blade section 20, while hook section 34 composed of groove 32 and flange 33 and having a shape that corresponds to hook section 24 of blade section 20, is formed by cutting away the outer peripheral surface of tapered section 31 which is the front end side portion of bolt section 30, and blade section 20 and bolt section 30 are coupled by then mutually engaging these hook sections 24 and 34.

In addition, in the state in which blade section 20 is installed on tool body 11, the outer peripheral surface of tapered section 21 of blade section 20 presses against the inner peripheral surface of tapered hole 13 of mounting hole 12.

However, if blade section 20 and bolt section 30 are coupled by engaging hook sections 24 and 34 in this manner, although hook section 34 of bolt section 30 draws in blade section 20 towards the rear end side as a result of male threads 35 of bolt section 30 screwing into female threads 14 of mounting hole 12, there is the problem of tapered section 21 of blade section 20 being biased towards the opposite side of groove 22 of hook section 24 (direction indicated with a white arrow in the drawing) as a result of not following axis 0 of tool body 11, thereby causing blade section 20 to become eccentric with respect to axis 0 of tool body 11.

Moreover, since hook section 24 of blade section 20 is formed within tapered section 21, considerable bias also occurs in the force by which the outer peripheral surface of tapered section 21 of blade section 20 presses against the inner peripheral surface of tapered hole 13 of mounting hole 12, thereby causing the above tendency for blade section 20 to become eccentric to be more prominent.

Moreover, as an example of a different problem, in the state in which blade section 20 and bolt section 30 are removed from tool body 11, since the coupling between blade section 20 and bolt section 30 cannot be maintained, it is necessary to insert and screw in bolt section 30 into mounting hole 12 of tool body 11 in advance, thereby resulting in inferior workability.

In addition, an interchangeable blade cutting tool 40 as shown in FIG. 35 is also disclosed in Japanese Patent No. 2656949, as shown by its FIGS. 2 and 4. In this cutting tool 40, a hook section 54 in the shape of a dovetail (convex portion of the cross-section of a dove's tail) comprised of a pair of grooves 52 and a pair of flanges 53 that opens extending in the lateral direction, is formed in rear end section 51 of blade section 50, while a hook section 64 in the shape of a dovetail (concave portion of the cross-section of a dove's tail) comprised of a pair of grooves 62 and a pair of flanges 63 and having a shape corresponding to hook section 54 of blade section 50, is formed in front end side portion 61 of bolt section 60, and blade section 50 and bolt section 60 are coupled by mutually engaging these hook sections 54 and 64. (Furthermore, an interchangeable blade cutting tool having a similar constitution is also disclosed in European Patent Specification No. 0776719, as shown by its FIG. 1.)

However, in this interchangeable blade cutting tool 40, when blade section 50 is drawn into the rear end side in the direction of axis 0 by bolt section 60, a force acts so as to widen dovetail hook section 64 formed on the front end side portion of bolt section 60 (directions indicated with white arrows in the drawing), thereby causing deformation of this hook section 64 and making it difficult to maintain a stable installation state for blade section 50.

In addition, when installing blade section 50 in tool body 41, although blade section 50 and bolt section 60 are inserted into mounting hole 42 of tool body 41 after bolt section 60 and blade section 50 are coupled in the state of having been removed from tool body 41, since coupling between blade section 50 and bolt section 60 only takes place by means of the engaging of dovetail hook section 54 and dovetail hook section 64, there was the problem of the coupling of blade section 50 and bolt section 60 easily becoming disconnected.

Furthermore, as shown in FIG. 36, although an approach has been attempted for making the coupling between blade section 50 and bolt section 60 comparatively resistant to disconnection by increasing the length of male threads 65 of bolt section 60, and then screwing in bolt section 60 by a prescribed amount into mounting hole 42 of tool body 41 in advance, followed by coupling with blade section 50 and then screwing in male threads 65 of bolt section 60, when this is done, the amount of thread travel required to screw male threads 65 of bolt section 60 into female threads 44 of mounting hole 42 increases considerably, and the amount of turning required to turn blade section 50 coupled to bolt section 60 increases accompanying this, thereby preventing this approach from being an efficient means for solving the problem.

In addition, an interchangeable blade cutting tool like that shown in FIG. 37 is disclosed in UK Patent Specification No. 990353 ("UK '353"), as shown by its FIGS. 1 and 3, and an interchangeable blade cutting tool disclosed in UK Unexamined Patent Application, First Publication No. 2158374 ("UK '374"), as shown by its FIG. 5, although not shown in the drawings, are examples of being able to suppress the problem of eccentricity of the blade section as described above.

The interchangeable blade cutting tool as shown in FIG. 37 that is disclosed in UK '353, as shown by its FIGS. 1 and 3, has a hook section 84 opened in rear end surface 82 of blade section 80, and a hook section containment hole 85, which is continuous with the front end side of blade section 80 and is opened in outer peripheral surface 81 of rear end section 81, formed in rear end section 81 of blade section 80, while hook section 94, which is composed of rotationally symmetrical end section 92 and roughly cylindrical shaft section 93 that are able to pass through hook hole 84 and which have the axis of bolt section 90 as their two-fold axis, is formed in front end side portion 91 of bolt section 90.

When blade section 80 is installed on tool body 71, by suitably screwing in male threads 96 of bolt section 90 into female threads 73 of mounting hole 72, and by inserting blade section 80 towards the rear end side within mounting hole 72, end section 92 of bolt section 90 in hook section 94 is inserted into hook section containment hole 85 from hook hole 84.

Next, when blade section 80 is relatively turned by a prescribed angle towards the front in direction of screwing rotation S by which it is screwed into bolt section 90 (the direction of rotation when bolt section 90 is turned with respect to tool body 71 when male threads 96 of bolt section 90 are screwed into female threads 73 of mounting hole 72), as a result of rotational force transmission wall 95 formed on end section 92 of hook section 94 contacting edge 86 of the opening into outer peripheral surface 83 of hook section containment hole 85, the rotational force imparted from blade section 80 is transmitted to bolt section 90, and male threads 96 of bolt section 90 are screwed into female threads 73 of mounting hole 72.

When bolt section 90 is drawn into the rear end side, as a result of end section 92 of hook section 94 contacting and locking wall 87 surrounding hook hole 84, namely the wall that faces the front end side in hook section containment hole 85, the relative movement of blade section 80 and bolt section 90 in the direction in which they move away from each other in the axial direction is inhibited, causing blade section 80 and bolt section 90 to be coupled, and resulting in blade section 80 being drawn into the rear end side and removably installed.

Here, in an interchangeable blade cutting tool 70 as described above, in the state in which a blade section 80 is drawn into the rear end side and installed on tool body 71, in order to transmit rotational force imparted from blade section 80 when female threads 96 of bolt section 90 are screwed in to bolt section 90, rotational force transmission wall 95 formed on end section 92 of hook section 94 must contact edge 86 of the opening into outer peripheral surface 83 of hook section containment hole 85.

Whereupon, the prescribed angle at which blade section 80 is able to relatively rotate towards the front in direction of rotation S by screwing into bolt section 90 after end section 92 of hook section 94 is inserted into hook section containment hole 85 from hook hole 84 is restricted by a slight amount, and when bolt section 90 is drawn into the rear end side, it becomes difficult to secure a large enough surface for mutually contact between wall 87 surrounding hook hole 84 and end section 92 of hook section 94, thereby preventing the maintaining of a stable installation state for blade section 80.

In addition, since shaft section 93 of hook section 94 is simply formed roughly in the shape of a cylinder, it is unable to provide adequate rigidity, thereby making it difficult to maintain stable installation of blade section 80.

Moreover, when male threads 96 of bolt section 90 are attempted to be loosened from female threads 73 of mounting hole 72 in order to remove blade section 80 from tool body 71, unless blade section 80 is relatively rotated towards the rear in the direction of rotation S in which blade section 80 is screwed into bolt section 90 by the prescribed angle at which blade section 80 is relatively rotated towards the front in the direction of rotation S in which blade section 80 is screwed into bolt section 90, the rotational force imparted from blade section 80 cannot be transmitted to bolt section 90, resulting in the problem of poor workability due to the bother involved when removing blade section 80, as well as the risk of blade section 80 becoming disconnected from bolt section 90 in the case force is applied towards the rear in the direction of rotation S in which it is screwed into this bolt section 80 even if blade section 80 is installed on tool body 71.

In addition, in the interchangeable blade cutting tool like that disclosed in 4 UK '374, as shown by its FIG. 5, a hook section is formed in the rear end section of a blade section, and this hook section is roughly T-shaped when viewed from the side and is composed of a rotationally symmetrical end section and roughly cylindrical shaft section that use the axis of the blade section as their two-fold axis. As a result of screwing in the male threads of the bolt section into the female threads of a mounting hole in the tool body after inserting this hook section a hook section containment hole from a hook hole formed in a bolt section, the bolt section and blade section are drawn in towards the rear end side so as to maintain the state in which the blade section and bolt section are relatively rotated about 90°.

However, in this type of interchangeable blade cutting tool, since there is no impairment of relative rotation of the blade section and bolt section in the peripheral direction, not only during installation of the blade section but also after the blade section has been installed on the tool body, in the case a force in the peripheral direction is applied to the blade section, there is the risk of the blade section easily becoming disconnected from the bolt section, thereby resulting in the problem of an extremely poor installation state.

In addition, since the shaft section of the hook section is only formed into a roughly cylindrical shape, the problem remains in which it is unable to secure adequate rigidity.

In consideration of the above problems, the object of the present invention is to provide an interchangeable blade cutting tool and blade section installed thereon that eliminates the occurrence of eccentricity of the blade section and is able to maintain a stable installation state for the blade section.

SUMMARY OF THE INVENTION

In order to solve the above problems and achieve the object of the present invention, the interchangeable blade cutting tool according to the present invention is characterized as being an interchangeable blade cutting tool in which, by removably coupling a rear end section of a blade section having a cutting section (provided with at least one cutting blade) and a drawing member, inserting this coupled blade section and drawing member into a mounting hole provided in a tool body, while also drawing the drawing member towards the rear end in the axial direction of the tool body, the blade section coupled to this drawing member is drawn in towards the rear end in the axial direction of the tool body and removably installed in the tool body; wherein, a hook section, composed of a shaft section and end section provided with a corner section that protrudes as a ledge farther to the outside in the radial direction than this shaft section, is formed on one of the rear end section of the blade section or the drawing member, a hook hole that opens to a size that allows passage of the end section of the hook section through its end face is formed in the other rear end section of the blade section or the drawing member, and as a result of the hook section contacting the rear end section or drawing member in which a hook hole is formed when the blade section and drawing member are mutually moved in the direction in which they move away from each other in the axial direction after the end section of the hook section has been inserted and passed through the hook hole and the blade section has been relatively rotated by a prescribed angle in the peripheral direction with respect to the drawing member, relative rotation in the peripheral direction by the blade section and drawing member, as well as relative movement in the direction in which they move away from each other in the axial direction, are impaired, and the blade section and drawing member are coupled.

At this time, coupling of the blade section and drawing member that results from contact by the hook section and rear end section or drawing member of the blade section in which the hook hole is formed may take place, for example, by forming an engaging section capable of coupling to the corner section of the end section of the above hook section in the wall that surrounds the hook hole, or by forming a wall that limits rotation in both directions capable of contacting the inner peripheral surface of the hook hole in the shaft section of the hook hole, so that together with the wall that limits rotation in both directions making contact with the inner peripheral surface of the hook hole, the corner section of the end section of the hook section makes contact with the wall surrounding the hook hole.

In the interchangeable blade cutting tool of the present invention that employs this type of constitution, since coupling of the blade section and drawing member is carried out by contacting the hook section and rear end section of the blade section or drawing member in which a hook hole is formed in the state in which the blade section and drawing member are relatively rotated at a prescribed angle after inserting and passing through the end section of the hook section into the hook hole (engaging the corner section of the end section of the hook section in an engaging section formed in the wall around the hook hole or contacting a wall that limits rotation in both directions formed on the shaft section or the hook section with the inner peripheral surface of the hook hole while also contacting the corner section of the end section of the hook section with the wall surrounding the hook hole), the shape of the end section of the hook section can be made to rotate symmetrically using the axis as an n-fold axis (n≧2), thereby eliminating bias in the force by which the blade section is drawn in by the drawing member, as well as eliminating the occurrence of eccentricity of the blade section. (Here, rotational symmetry refers to the property of the same shape being repeated by rotation of the 2 π/n radian (where n is an integer) when a symmetrical operation is carried out in which a certain shape is rotated about a single axis, and that axis of rotation is referred to as the n-fold axis.)

In addition, since the prescribed angle during relative rotation in the peripheral direction by the blade section with respect to the drawing member after the end section of the hook section is inserted into and passed through the hook hole impairs relative movement in the direction in which the blade section and drawing member move away from each other in the axial direction without being restricted by a slight amount according to the shape of the end section of the hook section, the area over which the hook section and rear end section of the blade section or drawing member in which the hook hole is formed make contact (surface over which the corner section on the end section of the hook section and engaging section formed in the wall surrounding the hook hole make contact, or surface over which the corner section on the end section of the hook section and wall surrounding the hook hole make contact) can be secured to be sufficiently large, thereby making it possible to maintain the blade section in a stable installation state.

Moreover, since it is not necessary for the hook hole to be opened to the outer peripheral surface of either the rear end section of the blade section or drawing member in which it is formed, and since it may have a structure in which it is closed in the peripheral direction, it is able to retain high strength without causing deformation.

Furthermore, in consideration of the rigidity of the blade section having a cutting section to be used for machining of workpieces, together with the hook section being formed on the rear end section of the blade section, it is preferable that the hook hole be formed in the drawing member.

In addition, when the blade section is relatively rotated by a prescribed angle towards one direction of the peripheral direction with respect to the drawing member after having inserted into and passed through the end section of the hook section into the hook hole, a wall that limits rotation in one direction is preferably formed in the shaft section of the hook section to contact the inner peripheral surface of the hook hole and impair further relative rotation towards one direction in the peripheral direction.

If such a constitution is employed, when the blade section is relatively rotated towards one direction in the peripheral direction with respect to the drawing member after having inserted and passed through the end section of the hook section into the hook hole, the blade section and drawing member are mutually locked in a state in which they are relatively rotated by precisely the prescribed angle at which they are to be relatively rotated, while relative rotation towards the other direction in the peripheral direction is impaired.

As a result, there is no risk of relatively rotating the blade section with respect to the drawing member beyond that which is necessary, and even when the blade section and drawing member are subsequently relatively moved in the direction in which they move away from each other in the axial direction, contact between the hook section and rear end section of the blade section of drawing member in which the hook hole is formed (for coupling the blade section and drawing member) can be carried out reliably and smoothly (in which the corner section in the end section of the hook section engages with an engaging section formed in the wall surrounding the hook hole, or a wall that limits rotation in both direction formed on the shaft section of the hook section contacts the inner peripheral surface of the hook hole together with the corner section in the end section of the hook section contacting the wall surrounding the hook hole).

In addition, since a wall that limits rotation in one direction is formed on the shaft section of the hook section, when compared with a shaft section of the prior art formed roughly into the shape of a cylinder, its cross sectional area is larger by the amount at which the wall that limits rotation in one direction is formed, thereby making it possible increase the rigidity of this shaft section and stabilize the installation state of the blade section.

In addition, as a preferable drawing means for drawing the above drawing member towards the rear end in the axial direction of the above tool body, the drawing member has a male threaded section, and the above mounting hole has a female threaded section, and as a result of the male threaded section of the drawing member being screwed into the female threaded section of the mounting hole, the drawing member is screwed into the rear end side in the axial direction of the tool body.

As a result of employing this constitution, when installing the blade section in the tool body, by turning the blade section towards the front in the direction of rotation in which the blade section is screwed into male threaded section of the drawing member, and turning the drawing member coupled to this blade section in the same direction, the male threaded section of the drawing member screws into the female threaded section of the mounting hole, thereby enabling the drawing member and blade section coupled to it to be drawn in with a firm force towards the rear end in the axial direction.

Here, in the interchangeable blade cutting tool according to the present invention, when the blade section is installed on the tool body, since the hook section is contacted with the rear end section of the blade section or drawing member in which a hook hole is formed (as a result of the corner section of the end section of the hook section engaging with an engaging section formed on the wall surrounding the hook hole, or as a result of a wall that restricts rotation in both directions formed on the shaft section of the hook section making contact with the inner peripheral surface of the hook hole), and relative rotation in the peripheral direction between the blade section and drawing member is impaired, as previously described, when a constitution is employed in which the male threaded section of the drawing member screws into the female threaded section of the mounting hole as a result of turning the blade section, rotational force is constantly transmitted to the front and the rear in the direction of rotation when screwing in imparted from the blade section to the drawing member.

For this reason, when the blade section is turned towards the rear in the direction of rotation of screwing in to remove the blade section from the tool body, the rotational force imparted from the blade section is transmitted directly to the drawing member without loss of force, and in the state in which the blade section is installed on the tool body, even if force is applied to this blade section towards the rear in the direction of rotation in which it is screwed in, as long as the male threaded section of the drawing member does not loosen from the female threaded section of the mounting hole, the blade section does not become disconnected from the drawing member.

In addition, the above blade section preferably has a cutting section (that is equipped with at least one cutting blade), a tapered section coupled to the rear end side of the cutting section and having a roughly conical shape in which the outer diameter gradually becomes smaller towards the rear end side, and a the above rear end section coupled to the rear end side of this tapered section, the above mounting hole preferably has a tapered hole roughly in the shape of a truncated cone having an inner diameter that gradually becomes smaller towards the rear end side, and the outer peripheral surface of the tapered section of the blade section presses against the inner peripheral surface of the tapered hole of the mounting hole to enable the blade section to be removably installed.

When this type of constitution is employed, when the blade section is drawn into the rear end side in the axial direction of the tool body by the drawing member, the outer peripheral surface of the tapered section of the blade section is able to press uniformly without bias on the inner peripheral surface of the tapered hole of the mounting hole, thereby enabling the axis of the blade section and axis of the tool body to be perfectly aligned and centered.

In addition, the interchangeable blade cutting tool according to the present invention is characterized in that, it is provided with a pressing member that presses the above blade section and the above drawing member in the direction in which they move away from each other when the end section of the above hook section is inserted into and passes through the above hook hole.

When this type of constitution is employed, when the blade section is installed on the tool body, it is no longer necessary to insert the driving member into the mounting hole in advance, and after preparing a driving member that has been removed from the mounting hole and a blade section, and relatively rotating the blade section by a prescribed angle with respect to the driving member after inserting and passing through the end section of the hook member into the hook hole, when the force by which the end section of the hook section is inserted into the hook hole is reduced, the blade section and driving member are pressed in the direction in which they move away from each other by the pressing member, and naturally enter a state in which the hook section is contacted with the rear end section of the blade member or driving member in which the hook hole is formed (for coupling the blade section and driving member) (namely, a state in which the corner section on the end section of the hook section is engaged with an engaging section formed on the wall surrounding the hook hole, or the state in which a wall that limits rotation in both directions formed on the shaft section of the hook section makes contact with the inner peripheral surface of the hook hole together with the corner section on the end section of the hook section making contact with the wall surrounding the hook hole).

As a result, the blade section can be installed on the tool body as a result of the blade section and driving member that have been removed from the tool body mutually coupling and being able to continuously maintain this coupled state, and unitarily inserting the coupled blade section and driving member into the mounting hole.

In addition, in the case of employing a constitution in which the drawing member is drawn into the rear end side in the axial direction of the tool body as a result of the drawing member having a male threaded section, the mounting hole having a female threaded section and the male threaded section of the drawing member being screwed into the female threaded section of the mounting hole, and coupling the blade section to the drawing member that has been screwed into the mounting hole in advanced by a predetermined amount when the blade section is installed on the tool body, by inserting the blade section towards the rear end side of the mounting hole, the blade section and drawing member are pressed towards the direction in which they move away from each other in the axial direction when the end section of the hook section is inserted into and passes through the hook hole.

This being the case, since the drawing member is pressed to the rear end side accompanying insertion of the blade section towards the rear end side of the mounting hole, pressing force of a suitable magnitude is generated in the axial direction between the female threaded section of the mounting hole and the male threaded section of the drawing member screwed into this female threaded section.

For this reason, when the blade section is relatively rotated by a prescribed angle in the peripheral direction with respect to the drawing member in the state in which the end section of the hook section is inserted into and passed through the hook hole, since frictional force acts so as to suppress relative rotation by the drawing member in the peripheral direction with respect to the tool body, only the blade section is able to reliably rotate with respect to the tool body, thereby making it possible to suppress unitary rotation by the blade section and drawing member, and reliably only allowing relative rotation by a prescribed angle in the peripheral direction without loss by the blade section with respect to the drawing member.

Here, the above pressing member preferably has a head section that presses on the end section of the above hook section, and at least one of the end surfaces at which there is roughly point contact between the head section of the above pressing member and the end section of the above hook section, such as the end surface that makes contact with the end section of the above hook section at the head section of the above pressing member, and the end surface that makes contact with the head section of the above pressing member at the end section of the above hook section, preferably has roughly spherical shape, and when such a constitution is employed, there is no need for an excessively large force when relatively rotating the blade section by a prescribed angle in the peripheral direction with respect to the drawing member after inserting and passing through the end section of the hook section into the hook hole.

In addition, the blade section according to the present invention is characterized by being a blade section installed on the interchangeable blade cutting tool of the present invention, having a cutting section (provided with at least one cutting blade), and having a hook section formed in a rear end section that is composed of a shaft section and an end section provided with a corner section that protrudes by as a ledge farther to the outside in the radial direction than this shaft section, or having a hook hole formed in its end surface that opens to a size that allows passage of the end section of the above hook section.

According to the interchangeable blade cutting tool of the present invention composed in this manner, since coupling between the blade section and drawing member is carried out by contacting the hook section and the rear end section of the blade section or drawing member in which the hook hole is formed in the state in which the blade section and drawing member are relatively rotated by a prescribed angle after inserting into and passing through the end section of the hook section into the hook hole, the shape of the end section of the hook section has rotational symmetry that uses the axis as the n-fold axis (n≧2), thereby eliminating bias in the force by which the blade section is drawn in by the drawing member, as well as eliminating the occurrence of eccentricity of the blade section.

In addition, since the prescribed angle during relative rotation in the peripheral direction by the blade section with respect to the drawing member after the end section of the hook section is inserted into and passed through the hook hole impairs relative movement in the direction in which the blade section and drawing member move away from each other in the axial direction without being restricted by a slight amount according to the shape of the end section of the hook section, the area over which the hook section and rear end section of the blade section or drawing member in which the hook hole is formed make contact can be secured to be sufficiently large, thereby making it possible to maintain the blade section in a stable installation state.

Moreover, since it is not necessary for the hook hole to be opened to the outer peripheral surface of either the rear end section of the blade section or drawing member in which it is formed, by employing a structure in which it is closed in the peripheral direction, the blade section can also be maintained in a stable installation state by retaining high strength without causing deformation.

BRIEF DESCRIPTION OF THE DRAWINGS

FIG. 4(a) is a side view showing the blade section of an interchangeable blade cutting tool according to a first embodiment of the present invention, FIG. 4(b) is a rear end view of the same blade section, and FIG. 4(c) is a cross-sectional view taken along line A—A in FIG. 4(a).

FIG. 6(a) is a perspective view for explaining the installation step of the blade section of an interchange blade cutting tool according to a first embodiment of the present invention, FIG. 6(b) is a side view of the blade section and bolt section in the state of FIG. 6(a), FIG. 6(c) is a cross-sectional view taken along line D—D in FIG. 6(b), and FIG. 6(d) is a cross-sectional view taken along line E—E in FIG. 6(b).

FIG. 8(a) is a perspective view for explaining the installation step of the blade section of an interchangeable blade cutting tool according to a first embodiment of the present invention, FIG. 8(b) is a side view of the blade section and bolt section in the state of FIG. 8(a), FIG. 8(c) is a cross-sectional view taken along line F—F in FIG. 8(b), FIG. 8(d) is across-sectional view taken along line G—G in FIG. 8(b), and FIG. 8(e) is a cross-sectional view taken along line H—H in FIG. 8(b).

FIG. 9(a) is a perspective view for explaining the installation step of the blade section of an interchangeable blade cutting tool according to a first embodiment of the present invention, FIG. 9(b) is a side view of the blade section and bolt section in the state of FIG. 9(a), FIG. 9(c) is a cross-sectional view taken along line I—I in FIG. 9(b), FIG. 9(d) is a cross-sectional view taken along line J—J in FIG. 9(b), and FIG. 9(e) is a cross-sectional view taken along line K—K in FIG. 9(b).

FIG. 10(a) is a perspective view for explaining the installation step of the blade section of an interchangeable blade cutting tool according to a first embodiment of the present invention, FIG. 10(b) is a side view of the blade section and bolt section in the state of FIG. 10(a), FIG. 10(c) is a cross-sectional view taken along line L—L in FIG. 10(b) and FIG. 10(d) is a cross-sectional view taken along line M—M in FIG. 10(b).

FIG. 12(a) is a side view showing the bolt section (drawing member) of an interchangeable blade cutting tool according to a second embodiment of the present invention, FIG. 12(b) is a front end view of the same bolt section, FIG. 12(c) is a rear end view of the same bolt section, FIG. 12(d) is a cross-sectional view taken along line B—B in FIG. 5(a), FIG. 5(e) is a cross-sectional view taken along line a—a in FIG. 12(a) and FIG. 12(e) is a cross-sectional view taken along line b—b in FIG. 12(a).

FIG. 13(a) is a side view for explaining the installation step of the blade section of an interchangeable blade cutting tool according to a second embodiment of the present invention, FIG. 13(b) is a cross-sectional view taken along line c—c in FIG. 13(a) and FIG. 13(c) is a cross-sectional view taken along line d—d in FIG. 13(a).

FIG. 14(a) is a side view of the blade section and bolt section for explaining the installation step of the blade section of an interchangeable blade cutting tool according to a second embodiment of the present invention, FIG. 14(b) is a cross-sectional view taken along line e—e, and FIG. 14(c) is a cross-sectional view taken long line f—f.

FIG. 15(a) is a side view of the blade section and bolt section for explaining the installation step of the blade section of an interchangeable blade cutting tool according to a second embodiment of the present invention, FIG. 15(b) is a cross-sectional view taken along line g—g in FIG. 15(a), and FIG. 15(c) is a cross-sectional view taken along line h—h in FIG. 15(a).

FIG. 27(a) is a partially cutaway perspective view showing the installation step of the blade section of an interchangeable blade cutting tool according to a third embodiment of the present invention, FIG. 27(b) is a partially exploded perspective view of the interchangeable blade cutting tool in the state of FIG. 27(a), FIG. 27(c) is a cross-sectional view taken along line Da—Da in FIG. 27(b), and FIG. 27(d) is a cross-sectional view taken along line Ea—Ea in FIG. 27(b).

FIG. 28(a) is a partially cutaway perspective view showing the installation step of the blade section in an interchangeable blade cutting tool according to a third embodiment of the present invention, FIG. 28(b) is partially exploded perspective view of the interchangeable blade cutting tool in the state of FIG. 28(a), FIG. 28(c) is a cross-sectional view taken along line Fa—Fa in FIG. 28(b), and FIG. 28(d) is a cross-sectional view taken along line Ga—Ga in FIG. 28(b).

FIG. 33(a) is a partially exploded cross-sectional view of an interchangeable blade cutting tool according to a seventh embodiment of the present invention, and FIG. 33(b) is an enlarged view of the essential portion in FIG. 33(a).

FIG. 34 is a cross-sectional view showing an example of an interchangeable blade cutting tool of the prior art.

FIG. 35 is a partially exploded cross-sectional view showing an example of an interchangeable blade cutting tool of the prior art.

FIG. 36 is a partially exploded cross-sectional view showing a variation of the interchangeable blade cutting tool of the prior art shown in FIG. 35.

EMBODIMENTS

The following provides an explanation of embodiments of the present invention while referring to the attached drawings.

To begin with, an explanation is provided of a first embodiment of the present invention.

Figure 1:
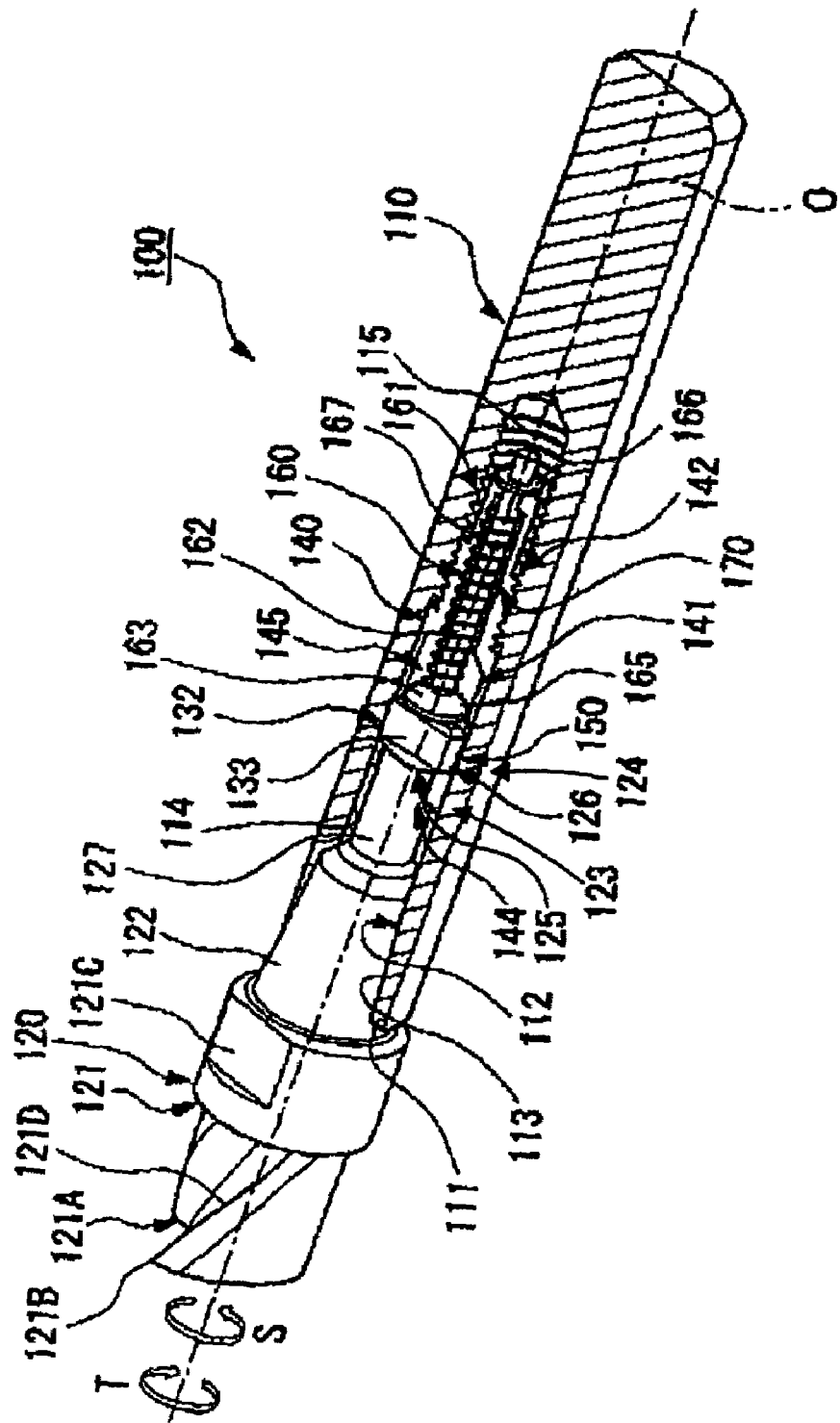
FIG. 1 is a partially exploded perspective view showing an interchangeable blade cutting tool according to a first embodiment of the present invention.
Figure 2:
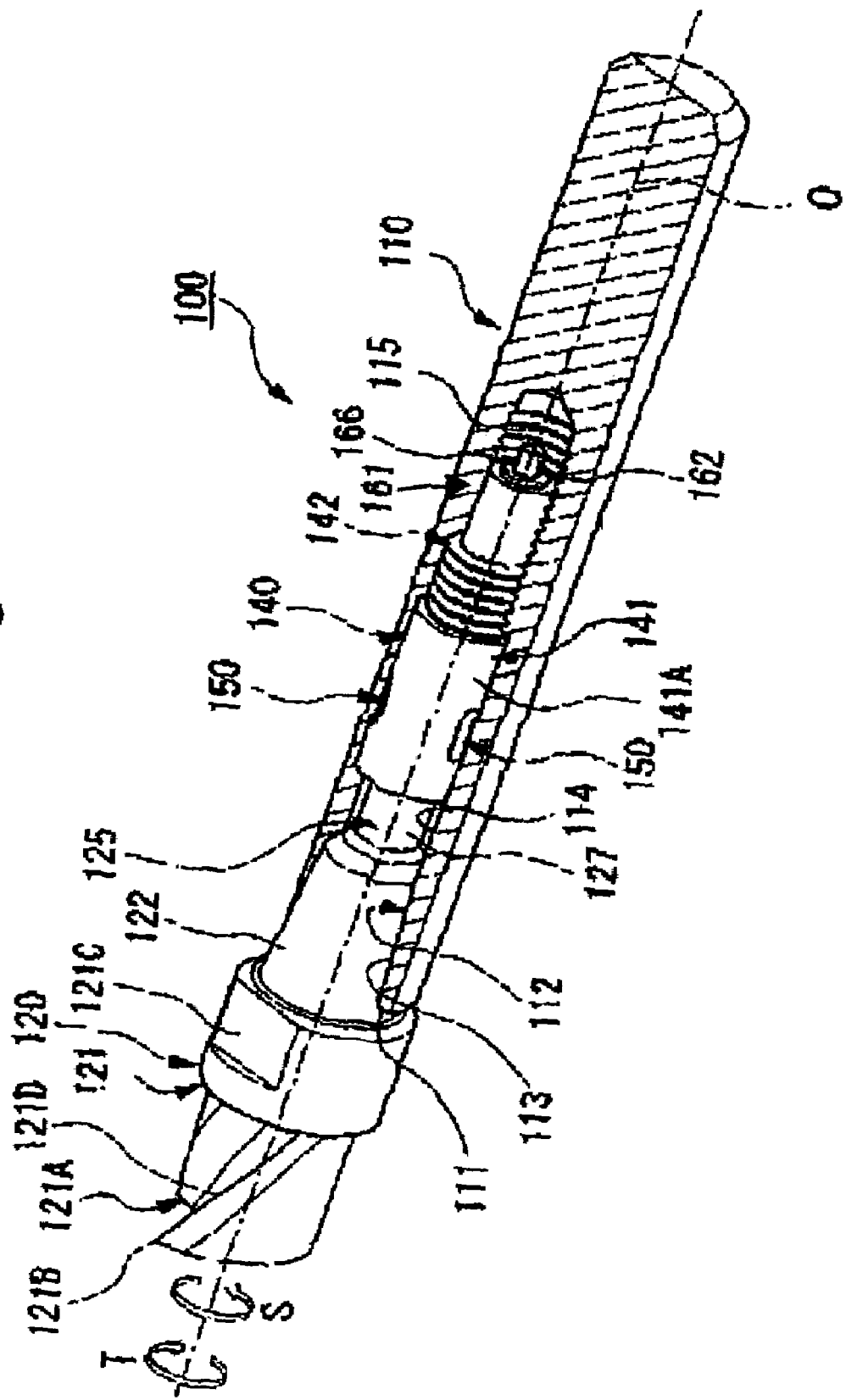
FIG. 2 is a partially exploded perspective view showing an interchangeable blade cutting tool according to a first embodiment of the present invention.

As shown in FIGS. 1 and 2, an interchangeable blade cutting tool 100 according to the present first embodiment is composed of a tool body 110 made to rotate about axis O, a blade section 120 removably installed and fixed on this tool body 110, and a bolt section 140 serving as a drawing member that is used to install blade section 120 on tool body 110.

Together with being formed roughly in the shape of a cylinder centering on axis O from steel and so forth, tool body 110 is provided with a mounting hole 112 centered about axis O extending from its front end surface 111 towards its rear end.

This mounting hole 112 is composed of tapered hole 113 roughly in the shape of a truncated conical hole in which the inner diameter gradually becomes smaller at a constant gradient from front end surface 111 towards the rear end of tool body 110, containment hole 114 roughly in the shape of a cylindrical hole, which together with being continuous with the rear end of this tapered hole 113, extends towards the rear end at a constant inner diameter, and female threads 115 serving as a female threaded section continuous with the rear end of this containment hole 114.

Figure 3:
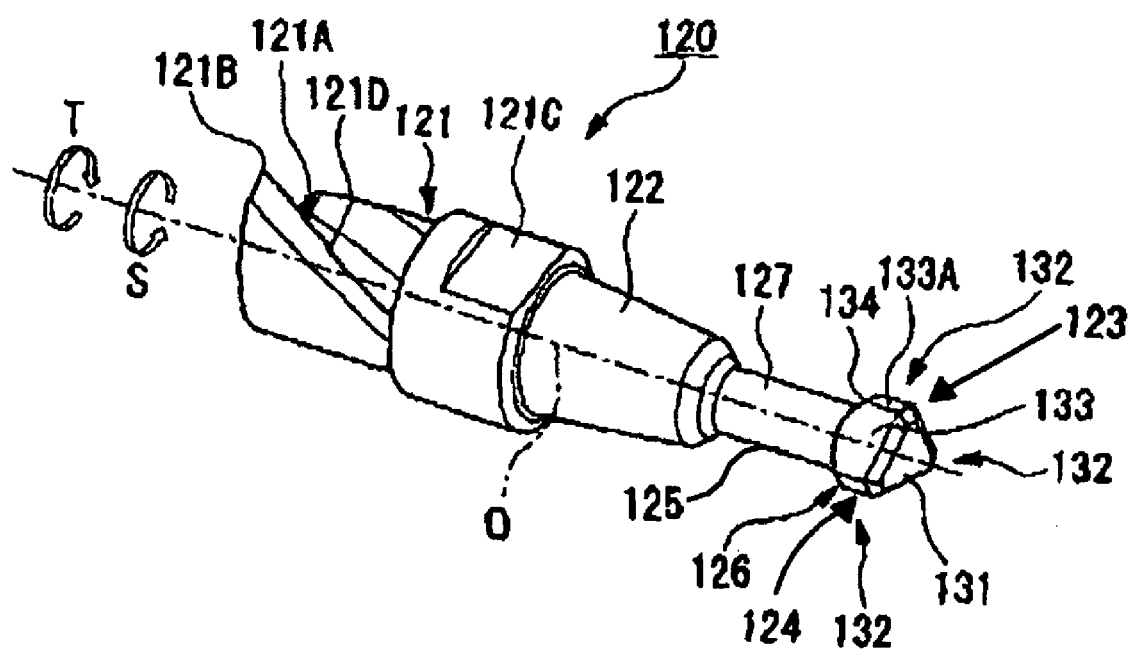
FIG. 3 is a perspective view of the blade section of an interchangeable blade cutting tool according to a first embodiment of the present invention.

In addition, as shown in FIGS. 3 and 4, blade section 120 is made from, for example, sintered hard alloy, is composed of cutting section 121 in which at least one cutting blade is formed, tapered section 122 roughly in the shape of a truncated cone, which together with being continuous with the rear end of this cutting section 121, has an outer diameter that gradually becomes smaller at a constant gradient as it approaches the rear end, and rear end section 123 continuous with the rear end of this tapered section 122, and is formed centered about axis O.

Furthermore, the taper angle θ at one corner of tapered section 122 is set within the range of 2–25°.

Here, a more detailed explanation is provided of the shape of cutting section 121 of blade section 120. As shown in FIG. 3, a pair of cuttings discharge grooves 121A are formed in cutting section 121a of this blade section 120 that twist towards the rear in the direction of tool rotation T (to be described later) as they approach the rear end in the direction of axis O so as to be located on mutually opposite sides with respect to axis O, and a pair of outer peripheral blades (cutting blades) 121D are formed in the outer ridge lines of the wall surface facing towards the front in the direction of tool rotation T in these cutting discharge grooves 121A.

In addition, the front end of the wall surface facing towards the front in the direction of tool rotation T in these cutting discharge grooves 121A serves as a front end cutting face, and the leading end of blade section 120 is formed at the intersection of this front end cutting face and front end flank, while a pair of bottom blades (cutting blades) 121B that extend towards the outer periphery from the vicinity of axis O are formed positioned on mutually opposite sides about axis O.

Moreover, in this cutting section 121, together with the section farther towards the rear end than the section in which the pair of cutting discharge grooves 121A are formed being roughly in the shape of a cylinder, its outer peripheral surface is notched, and a pair of flat surfaces 121C are formed so as to be mutually parallel and positioned on mutually opposite sides with respect to axis O.

The rear end section 123 of blade section 120 serves as a hook section 124 composed of shaft section 125 that is continuous with the rear end of tapered section 122 by means of a ledge section, and end section 126, which together with being continuous with the rear end of this shaft section 125, serves as the rear end section of blade section 120.

As shown in FIG. 4(c), shaft section 125 of hook section 124 has an outer peripheral surface 127 of a shape such that three corner sections 128, which protrude towards the outside in the radial direction farther than circle P centering about axis O, are arranged at roughly equal intervals in the circumferential direction when viewed in a cross-section perpendicular to axis O, and the cross-sectional area of this shaft section 125 is greater than the area of virtual circle P.

Each corner section 128 is formed by the intersection of two flat surfaces formed along the direction of axis O over the entire length of shaft section 125 of hook section 124, and of these two flat surfaces, the flat surface located towards the front in the direction of screwing rotation S (to be described later) as shown with the arrows in the drawings serves as a wall 129 that restricts rotation in one direction, while the flat surface towards the rear in the direction of screwing rotation S is a wall 130 that restricts rotation in the other direction.

Furthermore, a description of the functions of wall 129 that restricts rotation in one direction and wall 130 that restricts rotation in the other direction is provided later.

In addition, when again viewing a cross-section perpendicular to axis O, outer peripheral surface 127 of shaft section 125 of hook section 124 is such that wall 129 that restricts rotation in one direction in one corner section 128, and wall 130 that restricts rotation in the other direction in another corner section adjacent to this first corner section 128 towards the front in the direction of screwing rotation S are smoothly connected by arc-shaped outer peripheral surface 127A that serves as an arc of virtual circle P.

When viewed towards the front end in the direction of axis O so as to be in opposition to its flat end surface 131 (rear end surface in blade section 120), as shown in FIG. 4(b), end section 126 of hook section 124 has a roughly triangular shape, and the three corner sections 132 of this roughly triangular end section 126 each protrude as a ledge towards the outside in the radial direction farther than outer peripheral surface 127 of shaft section 125.

Each of the lateral surfaces 133 of this end section 126 respectively form flat surfaces, and three notched surfaces 133A are formed in the vicinity of the three corner sections 132 that are mutually intersected by these three lateral surfaces 133 as a result of cutting away notches from the flat surfaces.

In addition, each of the three lateral surfaces 133 of end section 126 are positioned to be roughly in the same plane as wall 130 that restricts rotation in the other direction formed on shaft section 125 of hook section 124.

Here, as a result of the three corner sections 132 in end section 126 of hook section 124 protruding as a ledge towards the outside in the radial direction from outer peripheral surface 127 of shaft section 125, together with lateral surfaces 133 of end section 126 and notched surfaces 133A intersecting at these corner sections 132 rising from outer peripheral surface 127 of shaft section 125, wall surfaces 134 are formed facing towards the front end in the direction of axis O.

In addition, as shown in FIG. 4(a), wall surfaces 134 that face towards the front end in the direction of axis O in these corner sections 132 are formed as a curved surfaces centered about axis O so that their apices form a portion of the peripheral surface of virtual roughly shaped cone V facing the front end in the direction of axis O, and are inclined towards the rear end in the direction of axis O as they approach the outside in the radial direction.

In addition, when viewed as a cross-section with respect to outer peripheral surface 127 of shaft section 125 of hook section 124 (cross-section perpendicular to outer peripheral surface 127 and parallel to axis O), wall surfaces 134 facing the front end in the direction of axis O in these corner sections 132 are smoothly connected by means of curved surfaces 134A having a roughly circular arc shape (or roughly oval arc shape) for which the radius of curvature has been set to 0.02–0.2 mm.

Furthermore, the entire hook section 124, including end surface 126 of this hook section 124, is rotationally symmetrical having axis O as a three-fold axis.

On the other hand, as shown in FIG. 5, bolt section 140 is made of, for example, steel, is composed of front end section 141 having a roughly cylindrical shape, and a male threaded section in the form of male threads 142 on the rear end of this front end section 141, and is formed centered about axis O.

In addition to a hook hole 144 that opens to its front end surface 143 (front end surface in bolt section 140) being formed in the front end section 141 of bolt section 140, a hook section containment hole 145 roughly in the shape of a cylindrical hole and having a constant inner diameter centering about axis O is formed so be continuous with the rear end side of this hook hole 144.

Figure 5C:
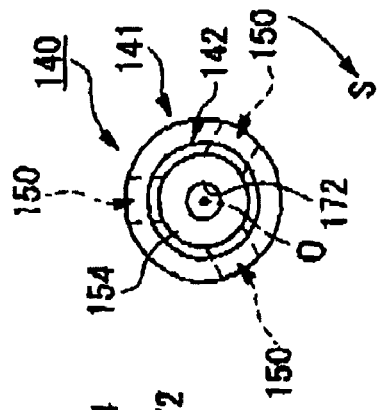
FIG. 5(c) is a rear end view of the same bolt section.
Figure 5A:
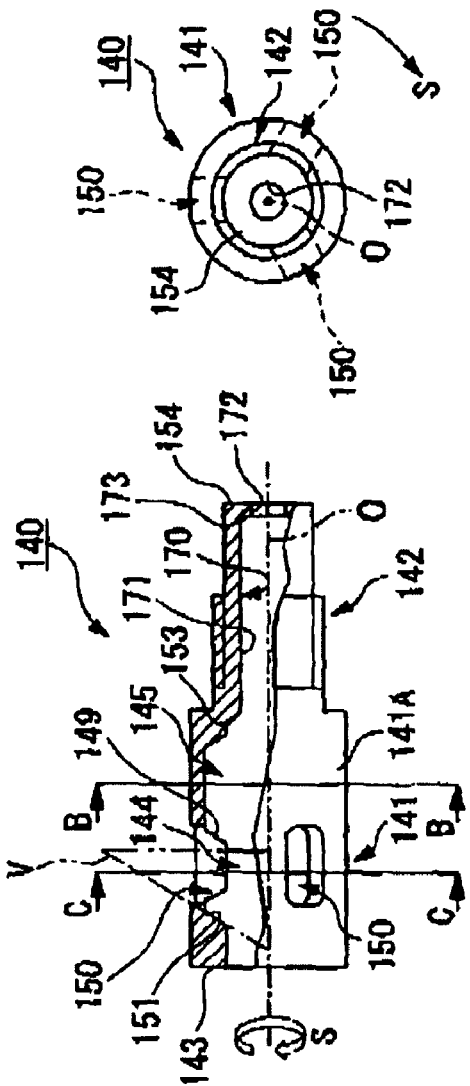
FIG. 5(a) is a partially exploded cross-sectional view showing a bolt section (drawing member) of an interchangeable blade cutting tool according to a first embodiment of the present invention.
Figure 5E:
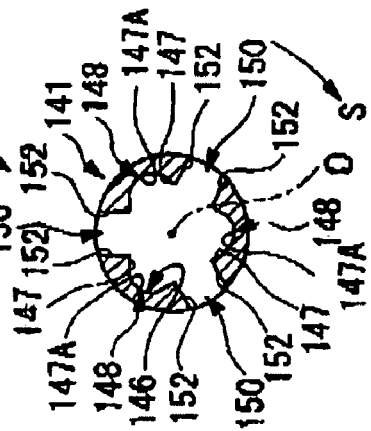
FIG. 5(e) is a cross-sectional view taken along line C—C in FIG. 5(a).
Figure 5D:
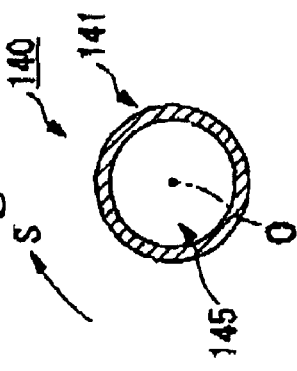
FIG. 5(d) is a cross-sectional view taken along line B—B in FIG. 5(a)
Figure 5B:
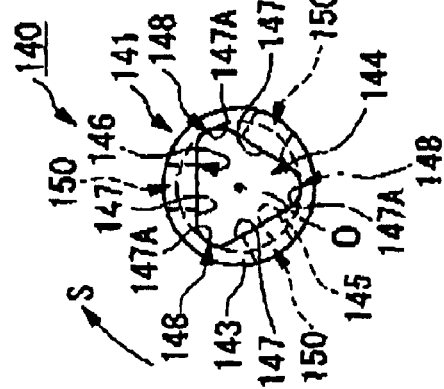
FIG. 5(b) is a front end view of the same bolt section.

Hook hole 144 has roughly the shape of an equilateral triangle as shown in FIG. 5(b) when viewed towards the rear end in the direction of axis O so as to be in opposition to front end surface 143 of front end section 141.

The three inner walls 147 that compose inner peripheral surface 146 of this hook hole 144 having roughly the shape of an equilateral triangle are each a flat surface, and the vicinity of three corner sections 148 that mutually intersect these three inner walls 147 is composed by circular arc-shaped walls 147A having the shape of a cross-sectional arc, and the intersecting sections of these inner walls 147 are connected smoothly.

Here, as a result of this hook hole 144 having roughly the shape of an equilateral triangle as described above, it has a shape that corresponds to end section 126 of hook section 124 in blade section 120, is of a size that allows the passage of end section 126 and shaft section 125 of hook section 124, and is opened to front end surface 143 of front end section 141 of bolt section 140.

In addition, since hook section containment hole 145 in the shape of roughly a cylindrical hole is formed so as to be continuous in the rear end of hook hole 144 having roughly the shape of an equilateral triangle, together with intersecting the three inner walls 147 in inner peripheral surface 146 of hook hole 144 rising from the inner peripheral surface of hook section containment hole 145, three walls 149 facing the rear end in the direction of axis O are formed to as to be positioned around this hook hole 144.

One engaging section 150 each is formed in the three walls 149 positioned around hook hole 144 and facing towards the rear end in the direction of axis O so as to be indented as a ledge in the front end in the direction of axis O from walls 149 facing towards the rear end in the direction of axis O. Moreover, these engaging sections 150 are respectively opened in the center in the peripheral direction of inner walls 147 in inner walls 146 of hook hole 144.

These three engaging sections 150 are arranged in the center in the peripheral direction between those corner sections 148 that are adjacent in the peripheral direction among the three corner sections 148 of hook hole 144, are arranged at roughly equal intervals in the peripheral direction in front end section 141 of bolt section 140, and are able to engage with corner sections 132 of end section 126 having roughly the shape of an equilateral triangle of the hook section 125.

Each engaging section 150 has a wall 151 facing the rear end in the direction of axis O, and a pair of side walls 152 arranged in parallel to as to be mutually opposed towards the peripheral direction. Moreover, as a result of extending from the openings of inner walls 147 in inner peripheral surface 146 of hook hole 144 towards the outside in the radial direction while maintaining a constant width in the peripheral direction, they are opened to the outer peripheral surface 141A of front end section 141 of bolt section 140.

In addition, as shown in FIG. 5(a), the walls 151 facing towards the rear end in the direction of axis O in these engaging sections 150 are formed as curved surfaces centering around axis O such that their apices serve as a portion of the peripheral surface of a virtual roughly cone shape V facing towards the rear end in the direction of axis O so as to correspond to the shape of walls 134 facing towards the front end in the direction of axis O in corner sections 132 of end section 126 of the previously described hook section 124, and are inclined towards the rear end in the direction of axis O as they approach the outside in the radial direction.

Furthermore, the entire front end section 141 of bolt section 140, including this hook hole 144, engaging sections 150 and hook section containment hole 145, is rotationally symmetrical having axis O as a three-fold axis.

Moreover, although not shown in FIG. 5 but understandable from FIGS. 1 and 2, pressing member 160 is housed within pressing member containment hole 170 passing through and formed in this bolt section 140 from a bottom surface 153 of hook section containment hole 145 in this bolt section 140, namely the wall facing wards the rear end in the direction of axis O in hook section containment hole 145, to a rear end surface 154 of bolt section 140.

As shown in FIG. 5, pressing member containment hole 170 is formed centered about axis O and composed from a first hole section 171 roughly in the shape of a cylindrical hole extending from bottom surface 153 of hook section containment hole 145 to the rear end in the direction of axis O at a constant inner diameter, and a second hole section 172 continuous with the rear end of this first hole section 171 that opens to rear end surface 154 of bolt section 140 at a constant inner diameter smaller than the inner diameter of the first hole section 171.

As a result of the inner diameter of first hole section 171 in this pressing member containment hole 170 being set to be larger than the inner diameter of second hole section 172, a ledge section 173 is formed at the junction between this first hole section 171 and second hole section 172 that is composed of a wall that faces towards the rear end in the direction of axis O.

On the other hand, as shown in FIGS. 1 and 2, pressing member 160 is composed of a presser 161 and a spring 167, and presser 161 is formed centered about axis O and composed of a shaft section 162 having a roughly cylindrical shape and constant outer diameter, and head section 163 coupled to the front end of this shaft section 162 and roughly in the shape of a disk having an outer diameter that is larger than the outer diameter of shaft section 162.

As a result of the outer diameter of head section 163 in this presser 161 being larger than the outer diameter of shaft section 162, a ledge section 165 is formed at the junction between this head section 163 and shaft section 162 that is composed of a wall facing towards the rear end in the direction of axis O.

In addition, an end surface 164 (front end surface) of head section 163 in presser 161 has a roughly spherical shape that protrudes towards the front end in the direction of axis O so that the vicinity of axis O becomes the leading end.

Moreover, a locking ring 166 is attached to the rear end portion of shaft section 162 in presser 161 that is roughly in the form of a ring so as to have a shape that protrudes farther to the outside in the radial direction from its outer peripheral surface.

Together with shaft section 162 in this presser 161 of this pressing member 160 being housed in the first hole section 171 in pressing member containment hole 170, the head section 163 in presser 161 is housed within the hook section containment hole 145.

In addition, the spring 167 is juxtaposed between ledge section 165 in presser 161 (wall facing towards the rear end in the direction of axis O) and ledge section 173 in pressing member containment hole 170 (wall facing towards the front end in the direction of axis O) so as to encircle shaft section 162 of presser 161, and these ledge sections 165 and 173 are pressed in the direction in which they mutually move away from each other in the direction of axis O.

Namely, force is applied to presser 161 towards the front end in the direction of axis O with respect to bolt section 140.

Furthermore, the pressing force of spring 167 is set within the range of 2 [N] to 20 [N].

Here, the rear end section of shaft section 162 of presser 161 housed in first hole section 171 in pressing member containment hole 170 is passed through second hole section 172 in pressing member containment hole 170, and together with protruding to the rear end in the direction of axis O from rear end surface 154 of bolt section 140, the locking ring 166 is attached to this protruding section.

As a result, the position of the head section 163 in presser 161 that is pressed by spring 167 and to which force is applied towards the rear end in the direction of axis O with respect to bolt section 140 is limited within hook section containment hole 145 immediately to the rear of hook hole 144.

In the state in which the hook section 120 employing a constitution like that described above is installed in tool body 110 by means of bolt section 140, three corner sections 132 of end section 126 of hook section 124 that form the rear end section 123 of blade section 120 are engaged with three engaging sections 150 formed in wall 149 positioned around hook hole 144 in front end section 141 of bolt section 140 and facing towards the rear end in the direction of axis O.

At this time, the direction facing towards one of the three corner sections 132 from axis O in end section 126 of hook section 124 that roughly form an equilateral triangle, and the direction facing towards one of the three corner sections 148 from axis O in hook hole 144 that roughly form an equilateral triangle, cross at an angle of intersection of about 60°. Namely, the phase angles of blade section 120 and bolt section 140 differ by about 60°.

In addition, as a result of providing pressing member 160 having presser 161 to which force is applied towards the front end in the direction of axis O in bolt section 140, end section 126 of hook section 124 having corner sections 132 engaged with engaging sections 150 formed around hook hole 144 is pressed towards the front end in the direction of axis O by its end surface 131 making roughly point contact with end surface 164 having a roughly spherical shape of head section 163 of presser 161.

Moreover, together with walls 134 facing towards the front end in the direction of axis O in the three corner sections 132 of end section 126 of hook section 124 being arranged to as to oppose walls 151 facing towards the rear end in the direction of axis O in the three engaging sections 150 formed around hook hole 144, as a result of these walls 134 and 151 making contact and being closely adhered to each other, the relative movement of blade section 120 and blade section 140 in the direction in which they move away from each other in the direction of axis O is inhibited.

Here, since the walls 134 facing towards the front end in the direction of axis O in the corner sections 132 of end section 126 and the walls 151 facing towards the rear end in the direction of axis O in engaging sections 150 are formed as a curved surface so as to form a portion of the peripheral surface of virtual roughly cone shape V as previously mentioned, their contact surfaces also form a curved surfaced centered about axis O so that their apices form a portion of the peripheral surface of a virtual roughly cone shape facing towards the front end in the direction of axis O, and are inclined towards the rear end in the direction of axis O as they approach the outside in the radial direction.

In addition, as a result of the wall facing in the peripheral direction in the three corner sections 132 of end section 126 of hook section 124, namely the section on the side of each corner section 132 in the three lateral surfaces 133 of end section 126, contacting the pair of mutually opposing side walls 152 facing in the respective peripheral directions of the three engaging sections 150, the relative rotation of blade section 120 and bolt section 140 in the peripheral direction is inhibited.

Furthermore, among the relative rotation that is prohibited in the peripheral direction (relative rotation towards the front and rear sides in the direction of screwing rotation S with respect to blade section 120 and bolt section 140), relative rotation towards the front side in the direction of screwing rotation S of blade section 120 with respect to bolt section 140 is achieved by shaft section 125 of hook section 124 being housed within hook hole 144, and walls 129 restricting rotation in one direction formed on this shaft section 125 being arranged and mutually making contact so as to oppose inner walls 147 in inner peripheral surface 146 of hook hole 144.

In this manner, relative rotation in the direction of moving away from each other in the direction of axis O and relative rotation in the peripheral direction are inhibited, and blade section 120 and bolt section 140 in the coupled state are inserted into mounting hole 112 provided in tool body 110 so that tapered section 122 roughly in the shape of a truncated cone of blade section 120 is housed within tapered hole 113 roughly in the shape of a truncated cone of mounting hole 112, and rear end section 123 of blade section 120 (hook section 124) and front end section 141 of bolt section 140 are housed within mounting hole 114 roughly in the shape of a cylindrical hole of mounting hole 112, and male threads 142 of bolt section 140 are screwed into female threads 115 of mounting hole 112.

As a result of male threads 142 of bolt section 140 being screwed into female threads 115 of mounting hole 112, together with this bolt section 140 being drawn to the rear end side in the direction of axis O within mounting hole 112, blade section 120 having rear end section 123 coupled with front end section 141 of bolt section 140 is drawn to the rear end side in the direction of axis O within mounting hole 112.

As a result, roughly the entire surface of the outer peripheral surface of tapered section 122 of blade section 120 presses on roughly the entire surface of the inner peripheral surface of tapered hole 113 of mounting hole 112, axis O of blade 120 and axis O of tool body 110 are aligned and centered, and blade section 120 is removably installed and fixed in tool body 110.

Furthermore, in the state in which blade section 120 is installed and fixed in tool body 110, male threads 142 of bolt section 140 and female threads 115 of mounting hole 112 are set to mesh for about 2–6 threads. Consequently, female threads 142 of bolt section 140 are such that male threads are only formed on its front end section.

Next, an explanation is provided of the process by which blade section 120 is installed on tool body 110.

To begin with, as shown in FIG. 6, blade section 120 and bolt section 140 are prepared in a state in which they are removed from tool body 110, and blade section 120 and bolt section 140 are then relatively moved so as to approach each other in the direction of axis O while aligning end section 126 roughly in the shape of an equilateral triangle of hook section 124 with hook hole 144 roughly in the shape of an equilateral triangle, namely while aligning the phase angles of blade section 120 and bolt section 140.

Furthermore, the direction facing towards one of the three corner sections 132 from axis O in end section 125 of hook section 124 roughly in the shape of an equilateral triangle at this time coincides with the direction facing towards one of the three corner sections 148 from axis O in hook hole 144 roughly in the shape of an equilateral triangle, and are considered to intersect at an angle of intersection of about 0°. In other words, the difference in phase angles of blade section 120 and bolt section 140 is considered to be about 0°.

Figure 7:
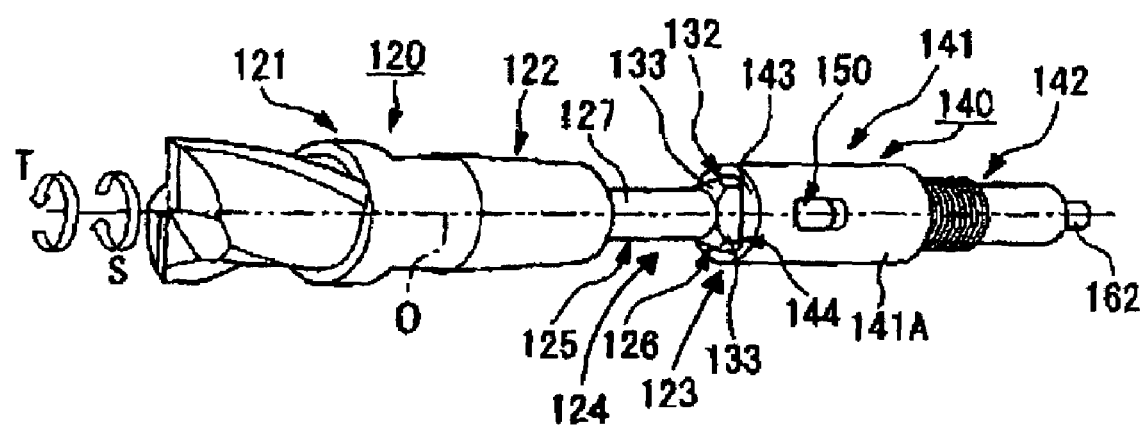
FIG. 7 is a perspective view for explaining the installation step of the blade section of an interchangeable blade cutting tool according to a first embodiment of the present invention.

This being the case, as shown in FIG. 7, end section 126 of hook section 124 is inserted into and passes through hook hole 144 formed to a size at which end section 126 of hook section 124 is just able to pass through.

Here, pressing member 160 having presser 161, to which force is applied towards the front end in the direction of axis O, is provided in bolt section 140, and since head section 163 of this presser 161 is positioned within hook section containment hole 145 immediately to the rear of hook hole 144 by locking ring 166, end surface 131 of end section 126 of hook section 124 that has passed through hook hole 144 makes contact with end surface 164 of head section 163 of presser 161 in pressing member 160.

At this time, while end surface 131 of end section 126 of hook section 124 is in the form of a flat surface that is perpendicular to axis O, since end surface 164 of head section 163 of presser 161 making contact with this end surface 131 had a roughly spherical shape that protrudes towards the front end in the direction of axis O so that the vicinity of axis O becomes the leading end, this end surface 131 of end section 126 and this end surface 164 of head section 163 are in a state in which they only make roughly point contact in the vicinity of axis O.

If end section 126 of hook section 124 is continued to be inserted into hook hole 144 as is, as shown in FIG. 8, presser 161 of pressing member 160, to which force is applied towards the front end in the direction of axis O, is pressed towards the rear end in the direction of axis O by this end section 126 of hook section 124, resulting in compression of spring 167.

By then containing relative movement of blade section 120 and bolt section 140 in the direction in which they approach each other in the direction of axis O while aligning the phase angles of blade section 120 and bolt section 140, end section 126 of hook section 124 is positioned within hook section containment hole 145, and shaft section 125 of hook section 124 is positioned within hook hole 144.

In this state, due to the restoring force of spring 167, bolt section 140, having presser member containment hole 170 in which ledge section 173 is formed that is contacted by the rear end of spring 167, and blade section 120, that contacts head section 163 of presser 161 in which ledge section 173 is formed that is contacted by the front end of spring 167, are pressed in the direction in which they move away from each other in the direction of axis O.

Moreover, in this state, although outer peripheral surface 127 of shaft section 125 of hook section 124 is arranged in opposition to inner walls 147 in inner peripheral surface 146 of hook hole 144, since walls 130 that restrict rotation in the other direction in outer peripheral surface 127 of shaft section 125 are positioned in roughly the same plane as lateral surfaces 133 of end section 126, and the phase angles of blade section 120 and bolt section 140 are aligned, as shown in FIG. 8(e), together with these walls 130 that restrict rotation in the other direction making mutual contact by being arranged in opposition to the front section in the direction of screwing rotation S of inner walls 147 in inner peripheral surface 146 of hook hole 144, arc-shaped outer peripheral surfaces 127A formed continuously towards the rear in the direction of screwing rotation S of walls 130 that restrict rotation in the other direction are arranged in opposition to the rear section in the direction of screwing rotation S of inner walls 147 in inner peripheral surface 146 of hook section 144.

In this manner, as a result of walls 130 that restrict rotation in the other direction formed on shaft section 125 of hook section 124 making mutual contact by being arranged in opposition to the front section in the direction of screwing rotation S of inner walls 147 in inner peripheral surface 146 of hook section 144, together with the relative rotation of bolt section 120 towards the rear in the direction of screwing rotation S with respect to bolt section 140 being inhibited, as a result of arc-shaped outer peripheral surfaces 127A formed on shaft section 125 of hook section 124 being arranged in opposition to the rear section in the direction of screwing rotation S of inner walls 147 in inner peripheral surface 146 of hook section 144, relative rotation of blade section 120 towards the front in the direction of screwing rotation S with respect to bolt section 140 becomes possible.

If blade section 120 is then relatively rotated towards the front in the direction of screwing rotation S around axis O with respect to bolt section 140, as shown in FIG. 9, when this blade section 120 is relatively rotated towards the front in the direction of screwing rotation S by only a prescribed angle (about 60° in the present first embodiment) with respect to bolt section 140 (in FIG. 9, a drawing is shown in which only bolt section 140 is rotated towards the rear in the direction of screwing rotation S with respect to blade section 120), walls 129 that restrict rotation in one direction formed in outer peripheral surface 127 of shaft section 125 of hook section 124 make mutual contact by being arranged in opposition to the rear section in the direction of screwing rotation S in inner walls 147 of inner peripheral surface 146 of hook hole 144.

Furthermore, when blade section 120 is relatively rotated towards the front in the direction of screwing rotation S with respect to bolt section 140, since pressing member 160 is provided on bolt section 140, and blade section 120 and bolt section 140 are pressed in the direction in which they move away from each other in the direction of axis O, by applying force such that blade section 120 and bolt section 140 are pressed in the direction in which they approach each other in the direction of axis O, it is necessary for blade section 120 to relatively rotate with respect to bolt section 140 while maintaining the state in which end section 126 of hook section 124 is housed within hook section containment hole 145.

In addition, in the state in which blade section 120 is relatively rotated by a prescribed angle with respect to bolt section 140, and walls 129 that restrict rotation in one direction in shaft section 125 of hook section 124 are contacting inner walls 147 in inner peripheral surface 146 of hook hole 144, as shown in FIG. 9(*e*), together with these walls 129 that restrict rotation in one direction making mutual contact by being arranged in opposition to the rear section in the direction of screwing rotation S of inner walls 147 in inner peripheral surface 146 of hook hole 144, arc-shaped outer peripheral surfaces 127A formed continuously towards the front in the direction of screwing rotation S of walls 129 that restrict rotation in one direction are arranged in opposition to the front section in the direction of screwing rotation S of inner walls 147 in inner peripheral surface 146 of hook hole 144.

In this manner, as a result of walls 129 that restrict rotation in one direction formed on shaft section 125 of hook section 124 making mutual contact by being arranged in opposition to the rear section in the direction of screwing rotation S of inner walls 147 in inner peripheral surface 146 of hook hole 144, relative rotation of blade section 120 towards the front in the direction of screwing rotation S with respect to bolt section 140 is inhibited.

As a result of bolt section 120 then relatively rotating towards the front in the direction of screwing rotation S by about 60° with respect to bolt section 140 after end section 126 of hook section 124 has been inserted into and passed through hook hole 144, the difference in the phase angles of blade section 120 and bolt section 140 is also changed from about 0° to about 60°.

Here, as a result of walls 129 restricting rotation in one direction and walls 130 restricting rotation in the other direction being formed on shaft section 125 of hook section 124, the range over which the difference in phase angles of blade section 120 and bolt section 140 can be changed is restricted to the range of 0° to 60°.

Subsequently, when force that presses blade section 120 and bolt section 140 in the direct in which they approach each other in the direction of axis O is weakened, as a result of this blade section 120 and this bolt section 140 being pressed in the direction in which they move away from each other in the direction of axis O by pressing member 160, blade section 120 and bolt section 140 are relatively moved in the direction in which they move away from each other in the direction of axis O while the phase angles of blade section 120 and bolt section 140 remain different by about 60°, and as shown in FIG. 10, the three corner sections 132 of end section 126 of hook section 124 are engaged with the three engaging sections 150 formed around hook hole 144.

Namely, walls 129 restricting rotation in one direction formed on shaft section 125 of hook section 124 are made to inhibit the relative rotation of blade section 120 towards the front in the direction of screwing rotation S with respect to bolt section 140 at a prescribed angle (about 60° in the present first embodiment) so that corner sections 132 of end section 126 of hook section 124 just engages with engaging sections 150 formed around hook hole 144 when blade section 120 and hook section 140 are relatively moved in the direction in which they move away from each in the direction of axis O.

In the state in which these corner sections 132 of end section 126 of hook section 124 are engaged with engaging sections 150, walls 134 that form a portion of the peripheral surface of the virtual roughly shaped cone V facing towards the front end in the direction of axis O in corner sections 132 of end section 126, and walls 151 that form a portion of the virtual roughly shaped cone V facing towards the rear end in the direction of axis O in engaging sections 150, make mutual contact and are pressed together, thereby inhibiting relative movement of blade section 120 and bolt section 140 in the direction in which they move away from each other in the direction of axis O.

Similarly, in the state in which corner sections 132 of end section 126 of hook section 124 are engaged with engaging sections 150, as a result of the walls facing towards the peripheral direction in corner sections 132 of end section 126, namely the portion on the side of each corner section 132 in the three lateral surfaces 133 of end section 126, contacting the pair of side walls 152 in mutual opposition facing in the peripheral direction in each engaging section 150, relative rotation of blade section 120 and bolt section 140 in the peripheral direction is inhibited, resulting in a state in which the rotational force when blade section 120 is rotated in the peripheral direction (towards the front and rear in the direction of screwing rotation S) is constantly transmitted to bolt section 140.

At this time, among the relative rotation of blade section 120 in the peripheral direction with respect to bolt section 140, relative rotation towards the front in the direction of screwing rotation S is inhibited as a result of walls 129 restricting rotation in one direction formed on shaft section 125 of hook section 124 being arranged in opposition to and contacting the front side portion in the direction of screwing rotation S of inner walls 147 in inner peripheral surfaced 146 of hook hole 144.

In addition, since engaging sections 150 have an opening to the outer peripheral surface 141A of front end section 141 of bolt section 140 extending to the outside in the radial direction, whether or not corner sections 132 of end section 126 of hook section 124 are reliably engaged with these engaging sections 150 can be confirmed visually from the side of outer peripheral surface 141A of front end section 141 of bolt section 140.

As a result of relative movement in the direction in which they move away from each other in the direction of axis O and relative rotation in the peripheral direction of blade section 120 and bolt section 140 being inhibited in the manner described above, blade section 120 and bolt section 140 are coupled.

Together with it being possible to treat blade section 120 and bolt section 140 as a single integrated unit and insert the coupled blade section 120 and bolt section 140 into mounting hole 112 provided in tool body 110, by, for example, applying a wrench to flat surfaces 121C formed in cutting section 121 of blade section 120, blade section 120 is relatively rotated with respect to tool body 110 in the direction of rotation in which bolt section 140 is rotated with respect to tool body 110, namely towards the front in the direction of screwing rotation S of male threads 142, when male threads 142 of bolt section 140 are screwed into the female threads 115 of mounting hole 112.

Whereupon, as a result of rotational force being transmitted to bolt section 140, which is coupled to this blade section 120 and inhibited from relative rotation in the peripheral direction, towards the front in the direction of screwing rotation S, and the male threads 142 of bolt section 140 being screwed into the female threads 115 of mounting hole 112, bolt section 140 is drawn in towards the rear end in the direction of axis O within mounting hole 112.

As a result, blade section 120, which is coupled to bolt section 140 and is inhibited from relative movement in the direction in which they move away from each other in the direction of axis O, is also drawn in towards the rear end in the direction of axis O within mounting hole 112, and in the state in which the outer peripheral surface of tapered section 122 of blade section 120 presses on the inner peripheral surface of tapered section 113 of mounting hole 112, blade section 120 is installed on and removably fixed in cutting tool 110.

On the other hand, in the process of removing blade section 120 from tool body 110, to begin with, by, for example, applying a wrench to flat surfaces 121C formed in cutting section 121 of blade section 120, blade section 120 is relatively rotated with respect to tool body 110 towards the rear in the direction of screwing rotation S of male threads 142 of bolt section 140.

Here, in the state in which blade section 120 is coupled to bolt section 140, as a result of corner sections 132 of end section 126 of hook section 124 engaging with engaging sections 150 formed around hook hole 144, and relative rotation of blade section 120 and bolt section 140 being inhibited in the peripheral direction, the rotational force when blade section 120 is relatively rotated towards the rear in the direction of screwing rotation S with respect to tool body 110 is directly transmitted to bolt section 140.

By blade section 120 then being relatively rotated towards the rear in the direction of screwing rotation S with respect to tool body 110, accompanying male threads 142 of bolt section 140 loosening from female threads 115 of mounting hole 112, bolt section 140 is pressed towards the front end in the direction of axis O within mounting hole 112, and the pressing on the inner peripheral surface of tapered section 113 of mounting hole 112 by the outer peripheral surface of tapered section 122 of blade section 120 is released.

Continuing, as a result of blade section 120 being relatively rotated towards the rear in the direction of screwing rotation S with respect to tool body 110, the meshing of male threads 142 of bolt section 140 with female threads 115 of mounting hole 112 is completely released, and blade section 120 and bolt section 140 can be removed from tool body 110 while still coupled.

In addition, if mutually coupled blade section 120 and bolt section 140 are desired to be disconnected, in addition to applying a force that presses blade section 120 and bolt section 140, which are pressed in the direction in which they move away from each other in the direction of axis O, in the direction in which they approach each other in the direction of axis O by pressing member 160, by relatively moving blade section 120 and bolt section 140 in the direction in which they approach each other in the direction of axis O, the engagement between corner sections 132 of end section 126 of hook section 124 and engaging sections 150 is completely released.

When blade section 120 is relatively rotated towards the rear in the direction of screwing rotation S by a prescribed angle with respect to bolt section 140, since walls 130 that restrict rotation in the other direction formed on shaft section 125 of hook section 124 contact inner walls 147 in inner peripheral surface 146 of hook hole 144, the phase angles of blade section 120 and bolt section 140 are aligned, and this relative rotation is inhibited.

This being the case, as a result of blade section 120 and bolt section 140 being pressed in the direction in which they move away from each other in the direction of axis O by pressing member 160, blade section 120 and bolt section 140 are relatively moved in the direction in which they move away from each other in the direction of axis O, and end section 126 of hook section 124 naturally is pulled out from hook section 144, enabling blade section 120 to be removed from bolt section 140.

In the interchangeable blade cutting tool 100 composed in this manner, since the rear end of tool body 110 is attached to the rotary shaft of a machine tool, and is rotated about axis O, a workpiece is machined by cutting blades (bottom blades 121B and outer peripheral blades 121D) of cutting section 121 of blade section 120.

Here, the direction of screwing rotation S when bolt section 140 is rotated with respect to cutting body 110 when male threads 142 of bolt section 140 are screwed into female threads 115 of mounting 112 is the opposite of the direction of tool rotation T along axis O during machining. Namely, these male threads 142 and female threads 115 are formed so that the front side of the direction of screwing rotation S becomes the rear side of the direction of tool rotation T.

In other words, considerations are given so that male threads 142 of bolt section 140 do not become loose due to cutting resistance subjected to cutting section 121 of blade section 120 during machining.

According to the interchangeable blade cutting tool 100 according to the present first embodiment composed in the manner described above, coupling of blade section 120 and bolt section 140 is carried out by relatively moving blade section 120 and bolt section 140 in the direction in which they move away from each other in the direction of axis O, and engaging corner sections 132 of end section 126 of hook section 124 with engaging sections 150 formed in walls 149 around hook hole 144 in the state in which blade section 120 and bolt section 140 are relatively rotated by about 60° after inserting and passing through end section 126 of hook section 124 into hook hole 144.

Since this end section 126 of hook section 124 is rotationally symmetrical by having axis O as its nth-fold axis (n=3 in the present first embodiment), the force when bolt section 140 draws blade section 120 towards the rear end in the direction of axis O can be made to be along the direction of axis O, thereby preventing the occurrence of eccentricity in blade section 120 with respect to tool body 110.

In the state in which blade section 120 is installed on tool body 110 in particular, since the outer peripheral surface of tapered section 122 of blade section 120 presses on the inner peripheral surface of tapered hole 113 of mounting hole 112, when blade section 120 is drawn towards the rear end in the direction of axis O by bolt section 140, since the force with which the outer peripheral surface of tapered section 122 of blade section 120 presses on the inner peripheral surface of tapered hole 113 of mounting hole 112 can be made to be uniform without bias, axis O of blade section 120 and axis O of tool body 110 are centered in perfect alignment, thereby making it possible to adequately accommodate even machining requiring a high level of precision, and allowing the obtaining of satisfactory dynamic balance.

In addition, as a result of the taper angle θ at one corner of tapered section 122 being set within the range of 2–25°, a suitable pressing force can be produced between the outer peripheral surface of tapered section 122 and the inner peripheral surface of tapered hole 113 of mounting hole 112.

If this taper angle θ is smaller than 2°, the pressing force produced between the outer peripheral surface of tapered section 122 and the inner peripheral surface of tapered hole 113 (due to a wedge effect) becomes excessively high, causing tapered hole 113 to increase in diameter due to elastic deformation. Consequently, even in the state in which blade section 120 is not drawn in by bolt section 140, tapered section 122 is tightened by the elastic force of tapered hole 113, resulting the in the risk of blade section 120 being unable to be removed from tool body 110.

Conversely, if taper angle θ is larger than 25°, the pressing force becomes excessively small, thereby preventing blade section 120 from being held adequately.

Moreover, together with hook section 124 of blade section 120 being made to be rotationally symmetrical having axis O as its axis of rotation, since front end section 141 of bolt section 140 is also made to be rotationally symmetrical having axis O as its axis of rotation, all of the members that compose interchangeable blade cutting tool 100 (tool body 100, blade section 120 and bolt section 140) become rotationally symmetrical, and since their centers of gravity are aligned with axis O, there is no occurrence of eccentricity caused by centrifugal force even when tool body 110 is rotated at high speeds about axis O.

After end section 126 of hook section 124 is inserted into hook section containment hole 145 from hook hole 144, the prescribed angle at which blade section 120 is relatively rotated towards the front in the direction of screwing rotation S with respect to bolt section 140 is not limited by a slight amount by end section 126 of hook section 120.

For this reason, the area over which walls 134 facing towards the front end in the direction of axis O in corner sections 132 of end section 126, which is rotationally symmetrical having axis O as its nth-fold axis, make mutual contact with walls 151 facing towards the rear end in the direction of axis O in engaging sections 150 around hook hole 144 can be set to be larger, thereby making it possible to maintain blade section 120 in a stable installed state.

For example, in the present first embodiment, since end section 126 of hook section 124 is formed to be rotationally symmetrical having axis O as its three-fold axis (n=3), by relatively rotating blade section 120 by 180°/n (=60°) towards the front in the direction of screwing rotation S with respect to bolt section 140, and engaging corner sections 132 of end section 126 of hook section 124 with engaging sections 150 while the difference in the phase angles of blade section 120 and bolt section 140 is still 60°, the contact area between walls 134 facing towards the front end in the direction of axis O of corner sections 132 and walls 151 facing towards the rear end in the direction of axis O of engaging sections 150 is able to be made larger.

In addition, since front end section 141 of bolt section 140 has a roughly cylindrical shape, and the periphery of hook hole 144 that opens to front end surface 143 has a structure in which it is closed in its peripheral direction, the strength of this front end section 141 can be maintained at a high level and there is no occurrence of deformation and so forth, and due to this as well blade section 120 can be maintained in a stable installation state.

Moreover, in the present first embodiment, since a constitution is employed in which male threads 142 of bolt section 140 are screwed into female threads 115 of mounting hole 112 in order to draw a drawing member in the form of bolt section 140 towards the rear end in the direction of axis O with respect to tool body 110, bolt section 140 and blade section 120 coupled to it can be drawn towards the rear end in the direction of axis O at a strong force with respect to tool body 110.

In the state in which blade section 120 and bolt section 140 are coupled, since corner sections 132 of end section 126 of hook section 124 are engaged with engaging sections 150, and relative rotation of blade section 120 and bolt section 140 in the peripheral direction is inhibited, when a constitution is employed in which male threads 142 of bolt section 140 are screwed into female threads 115 of mounting 112 by relatively rotating blade section 120 towards the front in the direction of screwing rotation S with respect to tool body 110 as previously described, the rotational force towards the front and rear in the direction of screwing rotation S imparted from blade section 120 (rotational force in the peripheral direction) is transmitted to bolt section 140 at all times.

For this reason, during removal of blade section 120 from tool body 110, since the rotational force imparted from blade section 120 is transmitted directly to bolt section 140 without loss when blade section 120 is rotated towards the rear in the direction of screwing rotation S, the ease of operation in the installation process of blade section 120 is improved.

Moreover, in the state in which blade section 120 is installed on tool body 110, due to relative rotation of blade section 120 and bolt section 140 in the peripheral direction being inhibited, even if force is applied to blade section 120 installed on tool body 110 that causes it to relatively rotate towards the rear in the direction of screwing rotation S, there is no risk of blade section 120 being disconnected from bolt section 140 provided male threads 142 of bolt section 140 do not come loose from female threads 115 of mounting hole 112.

Here, in the state in which blade section 120 is fixed when installed on tool body 110, since the meshing between male threads 142 of bolt section 140 and female threads 115 of mounting hole 112 are set within the range of about 2–6 threads, work involved in screwing in the threads is not bothersome, and bolt section 140 can be reliably fixed in mounting hole 112.

If the meshing between these male threads 142 and female threads 115 extends over a range of less than 2 threads, there is the risk of bolt section 140 being unable to be reliably fixed in mounting hole 112, while conversely, if this meshing extends over a range of more than 6 threads, the amount of rotation for which blade section 120 is rotated in order to screw in male threads 142 of bolt section 140 becomes excessively large, thereby resulting in the risk of decreased ease of operation.

In addition, since walls 130 that restrict rotation in the other direction are formed on shaft section 125 of hook section 124, the direction of rotation when blade section 120 is relatively rotated with respect to bolt section 140 after inserting and passing through end section 126 of hook section 124 into hook hole 144 is restricted to the front in the direction of screwing rotation S.

Since walls 129 restricting rotation in one direction are formed on shaft section 125 of hook section 124, when blade section 120 is relatively rotated towards the front in the direction of screwing rotation S with respect to bolt section 140, that relative rotation is inhibited when relatively rotated by precisely the prescribed angle to which they are to be relatively rotated (about 60° in the present first embodiment).

As a result, there is no risk of relatively rotating blade section 120 with respect to bolt section 140 beyond that which is necessary, and even when blade section 120 and bolt section 140 are subsequently relatively moved in the direction in which they move away from each other in the direction of axis O, corner sections 132 of end section 126 of hook section 124 are reliably and smoothly engaged with engaging sections 150 formed around hook hole 144, thereby leading to improved ease of operation.

Moreover, even in the state in which blade section 120 and bolt section 140 are mutually coupled, walls 129 restricting rotation in one direction formed on shaft section 125 of hook section 124 are in a state of contact with the rear sections in the direction of screwing rotation S of inner walls 147 in inner peripheral surface 146 of hook hole 144.

Consequently, although blade section 120 having cutting section 121 to be used for cutting workpieces is subjected to cutting resistance towards rear in the direction of tool rotation T, namely towards the front in the direction of screwing rotation S, in addition to corner sections 132 of end section 126 of hook section 124 engaging with engaging sections 150, as a result of walls 129 restricting rotation in one direction of shaft section 125 of hook section 124 making contact with the rear sections in the direction of screwing rotation S of inner walls 147 in inner peripheral surface 146 of hook hole 144 in order to inhibit relative rotation of blade section 120 towards the front in the direction of screwing rotation S with respect to bolt section 140, this cutting resistance acting towards the front in the direction of screwing rotation S can be reliably absorbed, thereby further ensuring the stable installation state of blade section 120.

Furthermore, although these walls 129 restricting rotation in one direction and walls 130 restricting rotation in the other direction may be formed such that the direction during relative rotation of blade section 120 with respect to bolt section 140 after end section 126 of hook section 124 has been inserted into and passed through hook hole 144 is restricted to towards the rear in the direction of screwing rotation S, if the problem of cutting resistance as described above is taken into consideration, it is preferable to allow relative rotation of blade section 120 towards the front in the direction of screwing rotation S with respect to bolt section 140 as in the present first embodiment.

Moreover, as a result of walls 129 restricting rotation in one direction and walls 130 restricting rotation in the other direction being formed on shaft section 125 of hook section 124, when compared with a shaft section of the prior art having a roughly cylindrical shape, the cross-sectional area becomes larger due to walls 129 restricting rotation in one direction and walls 130 restricting rotation in the other direction being formed, thereby enhancing the rigidity of shaft section 125 of hook section 124, and leading increased stability of the installation state of blade section 120.

In addition, in the state in which blade section 120 and bolt section 140 are mutually coupled, the surface over which there is close contact between walls 134 facing towards the rear end in the direction of axis O in corner sections 132 of end section 126 of hook section 124 and walls 151 facing towards the rear end in the direction of axis O in engaging sections 150 formed around hook hole 144 becomes a portion of the peripheral surface of virtual roughly shaped cone V centered about axis O and in which the apex faces towards the front in the direction of axis O, and is inclined so as to face towards the rear end in the direction of axis O moving towards the outside in the radial direction.

As a result of these walls 134 and walls 151 in close mutual contact being inclined so as to face towards the rear end in the direction of axis O moving towards the outside in the radial direction as described above, their mutual contact area can be increased as compared with the case in which walls extending perpendicular to axis O make contact.

In other words, bearing pressure decreases due to the increase in contact area, thereby making it possible to prevent elastic deformation of the sections at which these walls 134 and walls 151 are formed.

In addition, since these walls 134 and walls 151 form a portion of the peripheral surface of a virtual roughly shaped cone V, in the state in which blade section 120 and bolt section 140 are coupled, there are no detrimental effects on this coupled state not only in the state in which the phase angles of blade section 120 and bolt section 140 accurately differ by 60°, but also when they are shifted out of phase to a certain extent.

This is because, in the case blade section 120 is manufactured by a powder alloy process, due to the occurrence of deformation during sintering, a certain degree of clearance is actually provided between the walls facing toward the peripheral direction in corner sections 132 of end section 126 of hook section 124 (sections on the side of corner section 132 of walls 133 of end section 126) and the pair of side walls 152 facing towards the peripheral direction in each engaging section 150, and between walls 129 restricting rotation in one direction of shaft section 125 of hook section 124 and inner walls 147 in inner peripheral surface 146 of hook hole 144, I the state in which blade section 120 is coupled to bolt section 140.

In other words, this is because, even if the phase angles of blade section 120 and bolt section 140 have shifted to a certain extent from 60°, the walls that face towards the peripheral direction in corner sections 132 of end section 126 of hook section 124 are required to make normal contact with side walls 152 facing towards the peripheral direction in engaging sections 150, and walls 129 restricting rotation in one direction on shaft section 125 of hook section 124 are required to make normal contact with inner walls 147 in inner peripheral surface 146 of hook hole 144.

Moreover, with respect to the shape of blade section 120, due to the coupling section between outer peripheral surface 127 of shaft section 125 in hook section 124 and walls 134 facing towards the front end in the direction of axis O in corner sections 132 of end section 126 being connected by curved surfaces 134A, the concentration of stress in this coupling section can be suppressed.

Here, if the radius of curvature of cross-sectional arc (oval arc) of curved surfaces 134A that compose this coupling section is smaller than 0.02 mm, stress ends up concentrating easily in these curved surfaces 134A, and since blade section 120 is composed of a brittle material such as cemented carbide, there is the risk of breakage.

On the other hand, if the radius of curvature is greater than 0.2 mm, the surface area of walls 134 facing towards the front end in the direction of axis O must be made smaller, thereby resulting in the risk of an increase in bearing pressure.

In addition, as a result of providing pressing member 160 in bolt section 140, when the force by which end section 126 of hook section 124 is inserted towards hook hole 144 is reduced following relative rotation of blade section 120 towards the front in the direction of screwing rotation S by a prescribed angle with respect to bolt section 140 after end section 126 of hook section 124 has been inserted into and passed through hook hole 144, since head section 163 of presser 161 presses against end section 126 of hook section 124, blade section 120 and bolt section 140 are pressed in the direction in which they move away from each other in the direction of axis O, thereby causing corner sections 132 of end section 126 of hook section 124 to be naturally engaged with engaging sections 150 formed in walls 149 around hook hole 144.

As a result, even if blade section 120 and bolt section 140 are mutually coupled after they have been removed from tool body 110, since the coupling between blade section 120 and bolt section 140 is not easily disconnected, thereby allowing that coupled state to be continued to be maintained, and since they can be inserted and screwed into mounting hole 112 of tool body 110, ease of operation can be improved.

In particular, as a result of end surface 164 of head section 163 of pressing member 160 and end section 126 of hook section 124 making roughly point contact in the vicinity of axis O, when blade section 120 is relatively rotated by a prescribed angle towards the front in the direction of screwing rotation S with respect to bolt section 140 after inserting and passing end section 126 of hook section 124 through hook hole 144, rotational torque is nearly completely transmitted from end surface 164 of head section 163 of pressing member 160 to end surface 131 of end section 126 of hook section 124.

As a result, excessive force is not required when relatively rotating blade section 120 by a prescribed angle with respect to bolt section 140, thereby further improving ease of operation.

Furthermore, in the interchangeable blade cutting tool 100 according to this first embodiment, although end surface 131 of end section 126 of hook section 124 has a flat surface, and end surface 164 of head section 163 of pressing member 160 has a roughly spherical surface protruding towards the front end in the direction of axis O, this interchangeable blade cutting tool 100 is not limited to this, but rather, together with end surface 131 of end section 126 having a roughly spherical surface that protrudes towards the rear end in the direction of axis O, end surface 164 of head section 163 may have a flat surface. Moreover, together with end surface 131 of end section 126 having a roughly spherical surface protruding towards the rear end in the direction of axis O, end surface 164 of head section 163 may have a roughly spherical surface protruding towards the rear end in the direction of axis O.

In addition, by setting the pressing force of spring 167, which is used to press blade section 120 and bolt section 140 in the direction in which they move away from each other in the direction of axis O, in pressing member 160 to the range of 2 [N] to 20 [N], blade section 120 and bolt section 140 can be pressed in the direction in which they move away from each other in the direction of axis O by a suitable force.

If the pressing force of this spring 167 ends up being less than 2 [N], sufficient pressing force is unable to be obtained for pressing end section 126 of hook section 124 against the front end in the direction of axis O when in the state in which corner sections 132 of end section 126 of hook section 124 are engaged with engaging sections 150 formed around hook hole 144, thereby resulting in the risk of it being difficult to reliably maintain the coupled state of blade section 120 and bolt section 140 when removed from tool body 110.

Conversely, if the pressing force of spring 167 ends up being greater than 20 [N], the force when end section 126 of hook section 124 is inserted into hook hole 144 becomes excessively large until the state is reached in which blade section 120 can be relatively rotated in the front direction of the direction of screwing rotation S with respect to bolt section 140 after inserting end section 126 of hook section 124 into hook section containment hole 145 through hook hole 144, resulting in the risk of the ease of operation actually decreasing.

Furthermore, in the present first embodiment, although coupled blade section 120 and hook section 140 are unitarily screwed into mounting hole 112 after mutually coupling blade section 120 and bolt section 140 in the state in which they are removed from tool body 110 by providing pressing member 160 in bolt section 140 in the installation step of blade section 120 as previously described, the present invention is not limited to this, but rather this blade section 120 and bolt section 140 may be coupled after first screwing in male threads 142 of bolt section 140 into female threads 115 of mounting hole 112 by a prescribed amount in advance.

Namely, by inserting blade section 120 towards the rear end of mounting hole 112 with respect to bolt section 140 in the state in which male threads 142 are screwed into female threads 115 inside mounting hole 112 by a prescribed amount, end section 126 of hook section 124 is inserted into and passed through hook hole 144.

At this time, since pressing member 160 is provided in bolt section 140, end section 126 of hook section 124 inserted into hook section containment hole 145 from this hook hole 144 is pressed towards the front end in the direction of axis O by head section 163 of presser 161, and blade section 120 and bolt section 140 are pressed in the direction in which they move away from each other in the direction of axis O.

In other words, accompanying insertion of blade section 120 towards the rear end of mounting hole 112, and the insertion of end section 126 of hook section 124 into hook section containment hole 145 from hook hole 144, bolt section 140 is pressed towards the rear end in the direction of axis O, and pressing force of a suitable magnitude is generated in the direction of axis O between male threads 142 of this bolt section 140 and female threads 115 of mounting hole 112.

For this reason, together with inserting and passing end section 126 of hook section 124 through hook hole 144, when blade section 120 is relative rotated by a prescribed angle towards the front in the direction of screwing rotation S with respect to bolt section 140, frictional force acts to suppress relative rotation by bolt section 140 in the peripheral direction with respect to tool body 110.

In this manner, since frictional force that suppresses relative rotation of bolt section 140 and tool body 110 in the peripheral direction is generated between male threads 142 and female threads 115, only blade section 120 can be reliably relatively rotated towards the front in the direction of screwing rotation S with respect to tool body 110, thereby making it possible to inhibit blade section 120 and bolt section 140 from rotating unitarily together with that rotation.

In other words, blade section 120 can be reliably relatively rotated by a prescribed angle towards the front in the direction of screwing rotation S with respect to bolt section 140, and ease of operation can be improved when installing blade section 120 on tool body 110.

Subsequently, since end section 126 of hook section 124 is pressed towards the front end in the direction of axis O by pressing member 160, blade section 120 is pressed towards the front end in the direction of axis O, corner sections 132 of end section 126 of hook section 124 are engaged with engaging sections 150 located around hook hole 144, and blade section 120 and bolt section 140 are coupled together.

In addition, if male threads 142 of bolt section 140 are screwed into female threads 115 of mounting hole 112 in advance to couple blade section 120 to this bolt section 140 in advance, no problems occur in installation work of blade section 120 even if pressing member 160 is not provided in this bolt section 140.

For example, by inserting blade section 120 towards the rear end of mounting hole 112 with respect to bolt section 140 with male threads 142 screwed into female threads 115 by a prescribed amount within mounting hole 112 until the state is reached in which the outer peripheral surface of tapered section 122 of blade section 120 contacts the inner peripheral surface of tapered hole 113 of mounting hole 112, end section 126 of hook section 124 is inserted and passed through hook hole 144.

When blade section 120 is then relatively rotated towards the front in the direction of screwing rotation S with respect to bolt section 140 and tool body 110 to create a state in which the difference in the phase angles of blade section 120 and bolt section 140 is about 60°, walls 129 that restrict rotation in one direction formed on shaft section 125 of hook section 124 make contact with inner walls 147 in inner peripheral surface 146 of hook hole 144, resulting in a state in which relative rotation of blade section 120 towards the front in the direction of screwing rotation S with respect to bolt section 140 is inhibited.

If blade section 120 is continued to be relatively rotated with respect to tool body 110 while still in this state, as a result of relative rotation of blade section 120 towards the front in the direction of screwing rotation S with respect to bolt section 140 being inhibited, the rotational force imparted from blade section 120 is transmitted to bolt section 140, and male threads 142 of bolt section 140 are screwed into female threads 115 of mounting hole 112.

As a result, bolt section 140 is drawn towards the rear end in the direction of axis O, blade section 120 and bolt section 140 are relatively moved in the direction in which they move away from each other in the direction of axis O while maintaining a difference in their phase angles of about 60°, and finally corner sections 132 of end section 126 of hook section 124 are engaged with engaging sections 150 formed around hook hole 144, causing blade section 120 and bolt section 140 to be coupled, and blade section 120 to be removably installed and fixed on tool body 110.

Furthermore, in the present first embodiment, although presser 161 of pressing member 160 presses on end section 126 of hook section 124 as a result of force being applied to the front end in the direction of axis O by spring 167, pressing member 160 having presser 161 that presses on end section 126 of hook section 124 may also be provided in bolt section 140 without using spring 167.

For example, instead of spring 167, together with forming male threads on the outer peripheral surface of shaft section 162 of presser 161, female threads should be formed in the inner peripheral surface of second hole section 172 of pressing member containment hole 170, and the male threads of shaft section 162 in presser 161 should be to screw into the female threads of second hole section 172 in pressing member containment hole 170.

When this is done, by, for example, grabbing onto and rotating a protruding section (rear end section) that protrudes from second hole section 172 in shaft section 162 of presser 161 by hand, since this presser 161 can be relatively rotated in the peripheral direction with respect to bolt section 140, and the male threads formed on shaft section 162 can be screwed into the female threads formed in second hole section 172, presser 161 can be relatively rotated in the direction of axis O with respect to bolt section 140 corresponding to these threads being screwed together.

For this reason, when coupling blade section 120 and bolt section 140, as a result of first pulling down presser 161 towards the rear end in the direction of axis O relative to bolt section 140, and relatively rotating presser 161 in the peripheral direction with respect to bolt section 140 after inserting and passing end section 126 of hook section 124 through hook hole 144, and relatively rotating blade section 120 by a prescribed angle with respect to bolt section 140, this presser 161 is relatively moved towards the front end in the direction of axis O with respect to bolt section 140, and end section 126 of hook section 124 is pressed on by head section 163 of presser 161.

In the case of such a pressing member 160, the manufacturing cost can be lowered since spring 167 is not used.

Next, an explanation is provided of a second embodiment of the present invention. Those sections that are similar to the previously described first embodiment are indicated using the same reference symbols, and their explanations are omitted.

Figure 11:
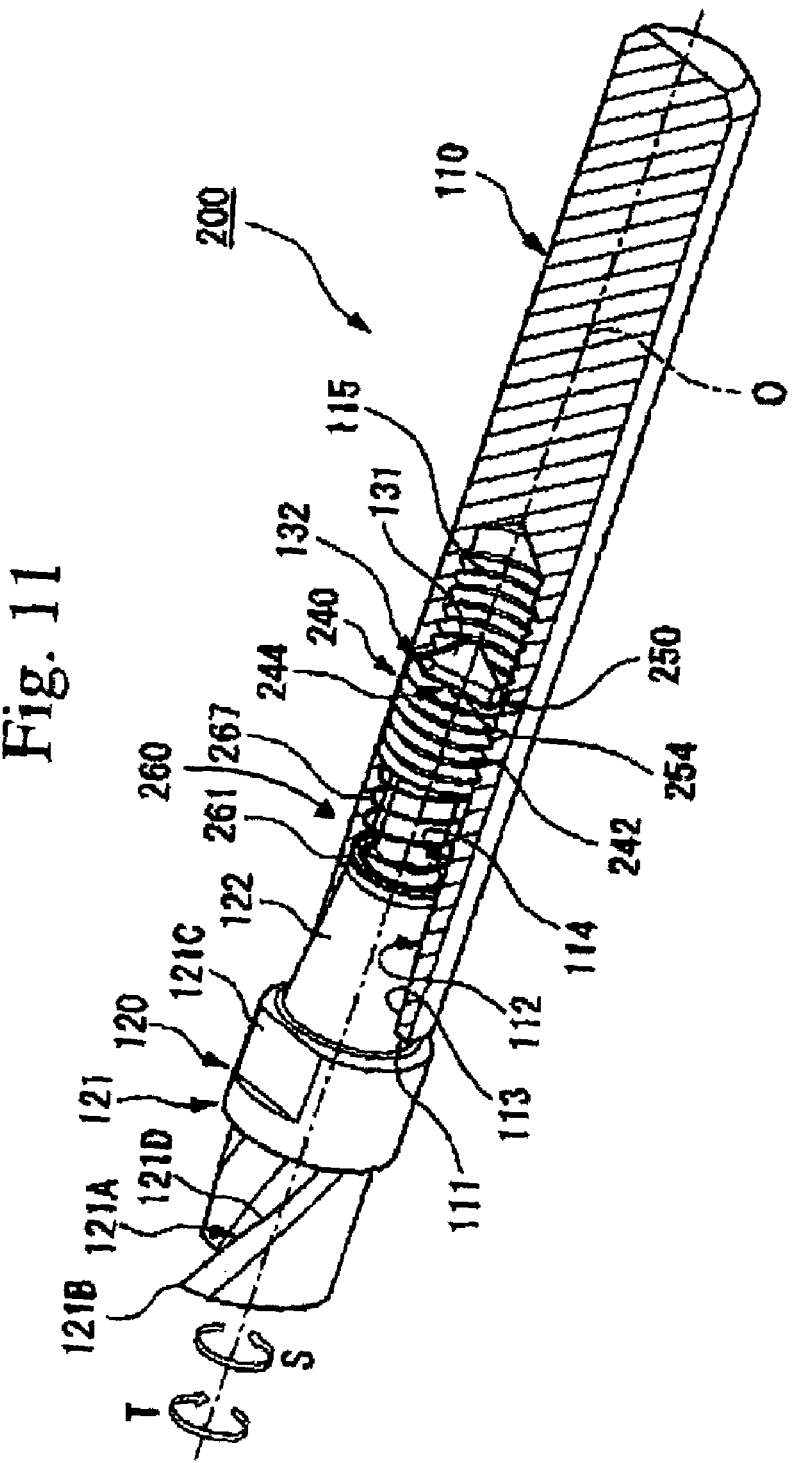
FIG. 11 is a partially exploded perspective view showing an interchangeable blade cutting tool according to a second embodiment of the present invention.

As shown in FIG. 11, an interchangeable blade cutting tool 200 according to the present second embodiment employs a similar constitution to the previously described first embodiment, and differs with respect to the shape of the bolt section.

As shown in FIG. 12, a bolt section 240 in this interchangeable blade cutting tool 200 is formed centered about axis O so as to have roughly a ring shape in which male threads 242 are formed on its outer peripheral surface.

Together with a hook hole 244 roughly having the shape of an equilateral triangle being formed in an end surface 243 (front end surface) of bolt section 240, the rear end of this hook hole 244 is opened towards the rear end surface 254 of bolt section 240.

In other words, hook hole 244 is formed penetrating in the direction of axis O over the entire length of bolt section 240 in the direction of axis O.

In addition, walls located around hook hole 244, namely three walls 249, which intersect three inner walls 247 that compose inner peripheral surface 246 of hook hole 244 and face towards the rear side in the direction of axis O, comprise rear end surface 254 of bolt section 240.

One each of engaging sections 250 are formed in the three walls 249 located around hook hole 244 and facing towards the rear end in the direction of axis O at their respective centers in the peripheral direction so as to be indented in the form of a ledge in the front end side in the direction of axis O from walls 249 facing towards the rear end in their direction of axis O. Moreover, these engaging sections 250 are opened towards the respective centers in the peripheral direction of inner walls 247 in inner peripheral surface 246 of hook hole 244.

Together with these three engaging sections 250 being arranged in the center in the peripheral direction of those three corner sections 248 of hook hole 244 that are adjacent in the peripheral direction, they are also arranged at roughly equal intervals in the peripheral direction in bolt section 240, thereby making it possible to engage with corner sections 132 of end section 126 roughly in the shape of an equilateral triangle of hook section 125 of blade section 120.

Each engaging section 250 has wall 251 facing towards the rear end in the direction of axis O, and a pair of walls 252 arranged so as to be mutually opposed facing in the peripheral direction. Moreover, as a result of extending from the opening into inner walls 247 in inner peripheral surface 246 of hook hole 244 towards the outside in the radial direction while its width in the peripheral direction gradually becomes smaller, the pair of walls 252 are made to intersect at an intermediate section without reaching the male threads 242 of the outer peripheral surface of bolt section 240.

Moreover, as shown in FIG. 12, a pressing member 260 is attached to front end surface 243 of bolt section 240.

Pressing member 260 is composed of spring 267 coupled to front end surface 243 of bolt section 240 and extending while encircling towards the front end in the direction of axis O, and presser 261 roughly in the shape of a ring that is coupled to the end of this spring 267, and this presser 261 applies force to bolt section 240 towards the front end in the direction of axis O.

Furthermore, the sizes of presser 261 and spring 267 are set so that end section 126 of hook section 124 in blade section 120 is able to pass through them.

As shown in FIG. 13, when installing blade section 120 on tool body 110, blade section 120 and bolt section 240 are relatively rotated so as to approach each other in the direction of axis O while matching the phase angles of blade section 120 and bolt section 240.

When this is done, as shown in FIG. 14, end section 126 of hook section 124 is inserted into hook hole 244 after sequentially being passed through presser 261 and spring 267 of pressing member 260.

As shown in FIG. 15, when end section 126 of hook section 124 is inserted and passed through hook hole 244, presser 261 of pressing member 260 provided in bolt section 240 and to which force is applied towards the front end in the direction of axis O makes contact with a ledge section 135 composed of a wall facing towards the rear end in the direction of axis O formed in a coupled section of tapered section 122 in blade section 120 and shaft section 125 of hook section 124, resulting in a state in which blade section 120 and bolt section 240 are pressed in the direction in which they move away from each other in the direction of axis O.

Figure 16A:
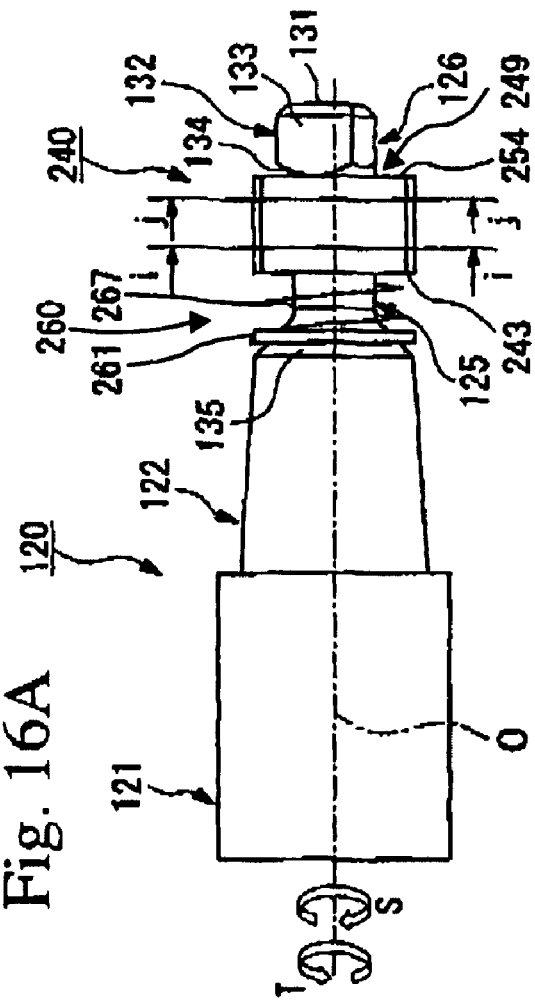
FIG. 16(a) is a side view of the blade section and bolt section for explaining the installation step of the blade section of an interchangeable blade cutting tool according to a second embodiment of the present invention.
Figure 16C:
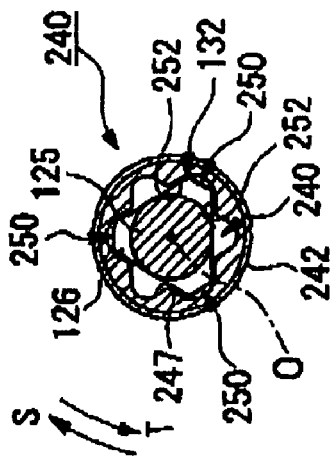
FIG. 16(c) is a cross-sectional view taken along line j—j in FIG. 16(a).
Figure 16B:
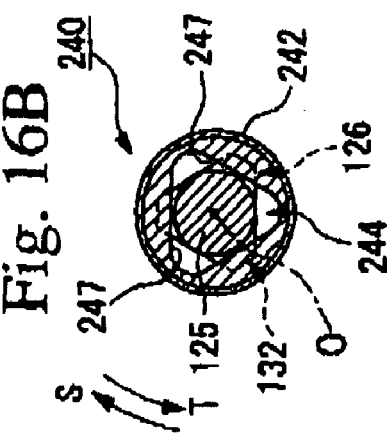
FIG. 16(b) is a cross-sectional view taken along line i—i in FIG. 16(a)
Figure 17A:
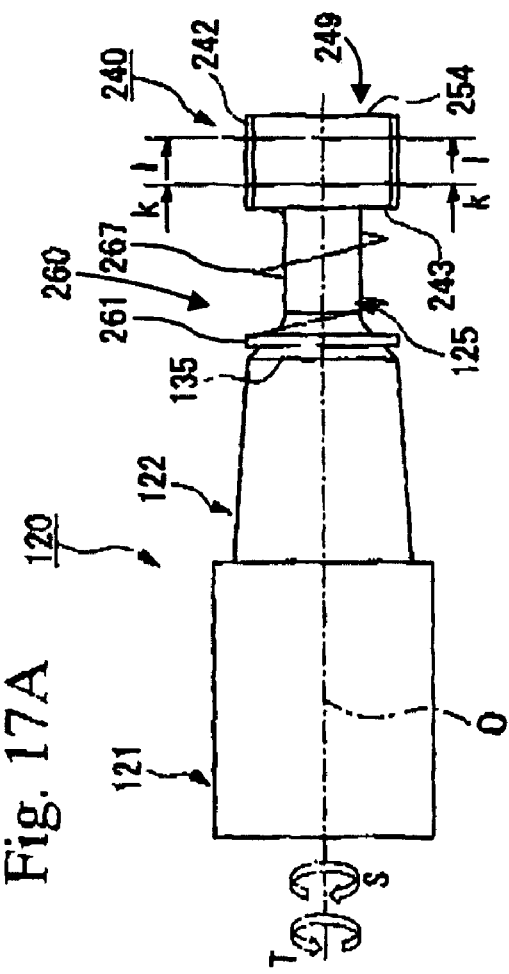
FIG. 17(a) is a side view of the blade section and bolt section for explaining the installation step of the blade section in an interchangeable blade cutting tool according to a second embodiment of the present invention.
Figure 17B:
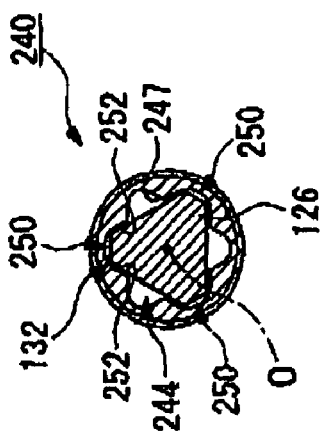
FIG. 17(b) is a cross-sectional view taken along line k—k in FIG. 17(a)
Figure 17C:
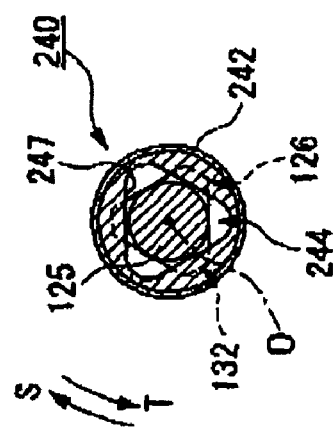
FIG. 17(c) is a cross-sectional view taken along line 1—1 in FIG. 17(a).

Subsequently, as shown in FIG. 16, when blade section 120 is relatively rotated by a prescribed angle towards the front end in the direction of screwing rotation S with respect to bolt section 240 (only bolt section 240 is shown when rotated towards the rear in the direction of screwing rotation S relative to blade section 120 in FIG. 16), blade section 120 and bolt section 240 are naturally pressed by pressing member 260 and relatively rotated in the direction in which they move away from each other in the direction of axis O, and as shown in FIG. 17, corner sections 132 of end section 126 of hook section 124 are engaged with engaging sections 250 formed around hook hole 244, resulting in blade section 120 and hook section 240 being coupled.

Furthermore, in this second embodiment, although engaging sections 250 formed around hook hole 144 do not have an opening to the outer peripheral surface of bolt section 240, in the case of mutually coupling bolt section 240 and blade section 120 in the state in which they have been removed from mounting hole 112, whether or not corner sections 132 of end section 126 of hook section 124 are reliably engaging with these engaging sections 150 can be confirmed visually from the side of rear end surface 254 of bolt section 240.

Figure 18B:
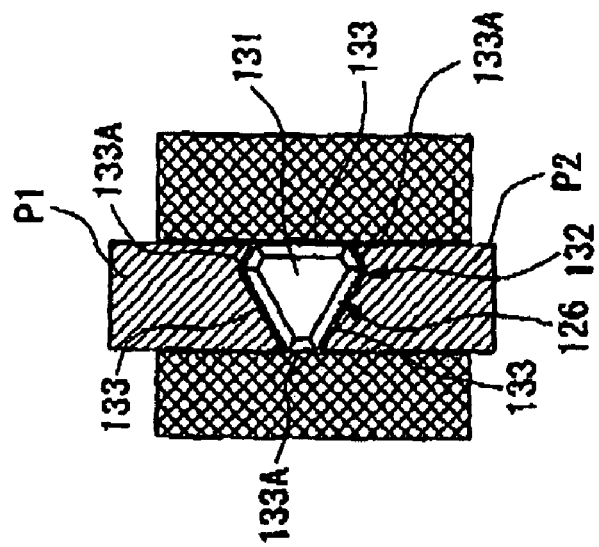
FIGS. 18(a) and (b) are explanatory drawings for explaining a manufacturing step for manufacturing the blade section according to an embodiment of the present invention.
Figure 18A:
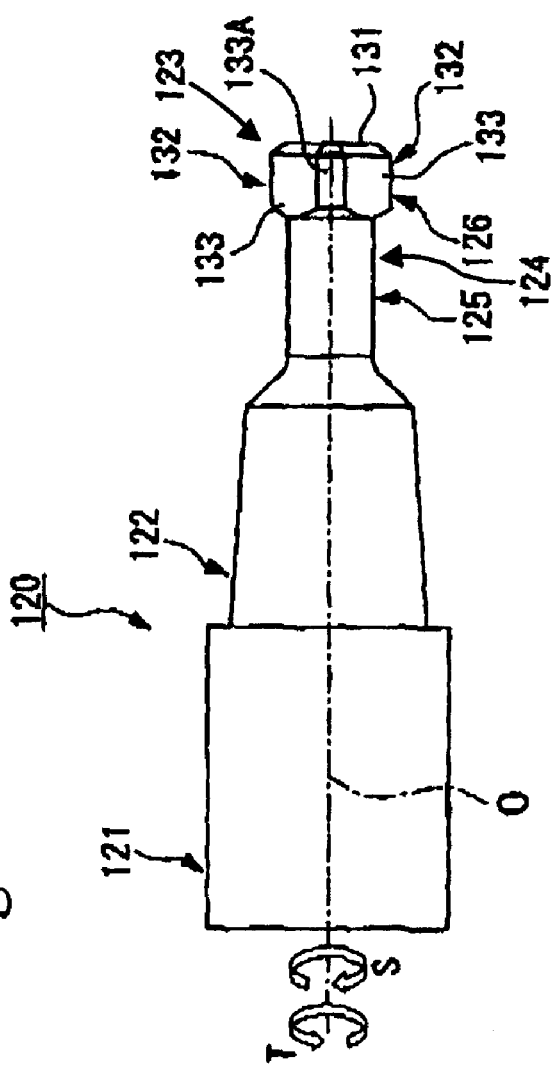

In addition, in blade section 120 used in the previously mentioned first and second embodiments, when end section 126 of hook section 124 is viewed in opposition to the front end in the direction of axis O opposing its end surface 131, despite roughly having the shape of an equilateral triangle, together with lateral surfaces 133 of end section 126 each comprising a flat surface, as a result of the sections in the vicinity of the three corner sections 132 with which these lateral surfaces 133 mutually intersect having notched surfaces 133A formed by cutting away notches in the flat surfaces, as shown in FIG. 18, they can be formed with a press by an upper punch P1 and lower punch P2.

Figure 19B:
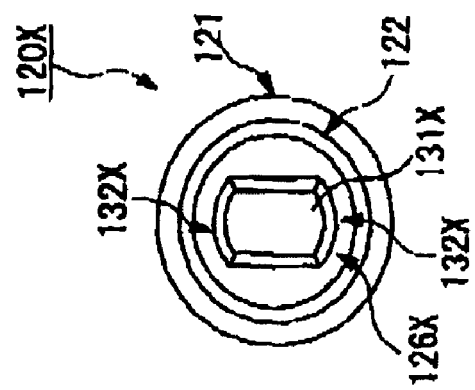
FIG. 19(b) is a rear end view of the same blade section.
Figure 19A:
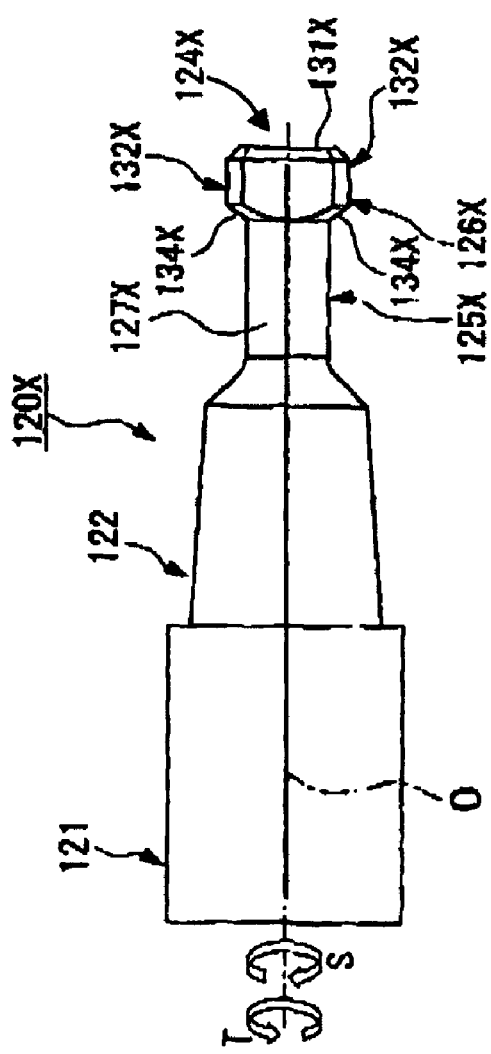
FIG. 19(a) is a side view showing the blade section according to a variation of the present invention.
Figure 20B:
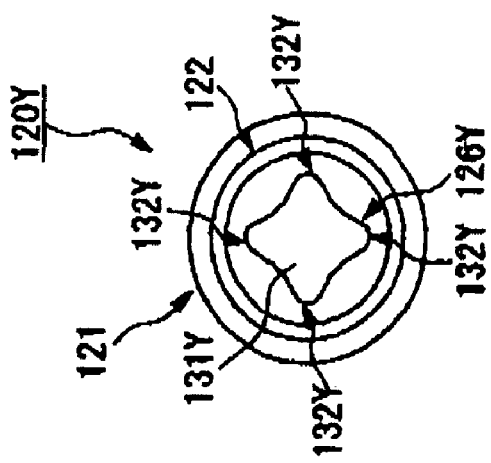
FIG. 20(b) is a rear end view of the same blade section.
Figure 20A:
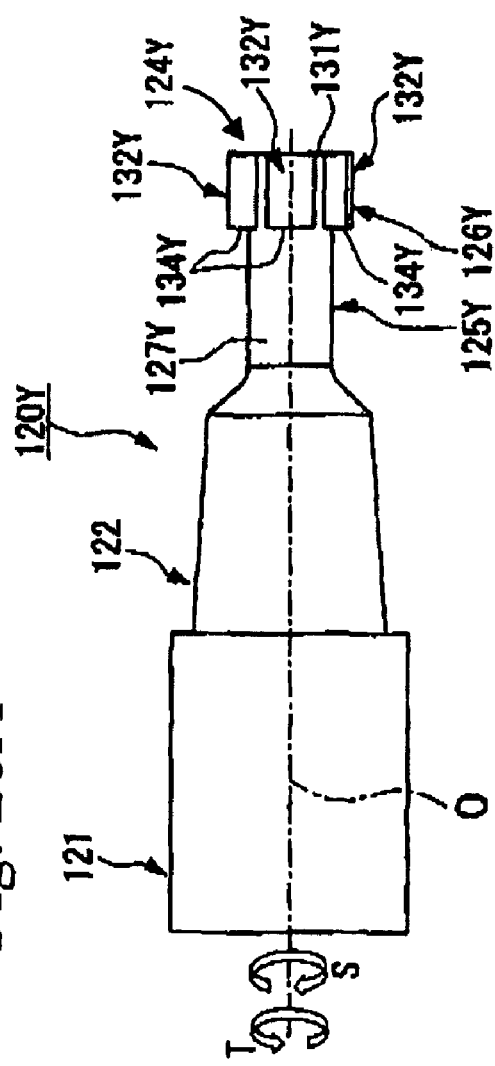
FIG. 20(a) is a side view showing the blade section according to a variation of the present invention.

Moreover, the shape of hook section 124 of blade section 120 is not limited to the shapes used in the previously mentioned first and second embodiments, but rather blade sections 120X and 120Y as shown in FIGS. 19 and 20 may also be used.

In blade section 120X shown in FIG. 19, when viewed towards the front end in the direction of axis O so as to oppose end section end section 131X (rear end surface in blade section 120X), as shown in FIG. 19(b), end section 126X of hook section 124X has a roughly rectangular shape, and the two corner sections 132X of end section 126X having this roughly rectangular shape respectively protrude in the form of a ledge towards the outside in the radial direction from outer peripheral surface 127X of shaft section 125X, and as a result, two walls 134X facing towards the front end in the direction of axis O are formed on the two corner sections 132X of end section 126X.

Furthermore, the entire hook section 124X, including this end section 126X of hook section 124X, is rotationally symmetrically having axis O as a two-fold axis.

In addition, in blade section 120Y shown in FIG. 20, when end section 126Y of hook section 124Y is viewed towards the front end in the direction of axis O so as to oppose its end surface 131Y (rear end surface in blade section 120Y), as shown in FIG. 20(b), end section 126Y has roughly a square shape, the four corner sections 132Y of end section 126Y having roughly a square shape protrude in the form of a ledge towards the outside in the radial direction farther than outer peripheral surface 127Y of shaft section 125Y, and as a result, four walls 134Y facing towards the front end in the direction of axis O are formed on corner sections 132Y of end section 126Y.

Furthermore, the entire hook section 124Y, including this end section 126Y of hook section 124Y, is rotationally symmetrical having axis O as a four-fold axis.

Although not shown in the drawings, the shapes of the bolt sections coupled to these blade sections 120X and 120Y may be suitably redesigned so as to correspond to these blade sections 120X and 120Y.

In the blade section 120X as described above, since end section 126X of hook section 124X has a roughly rectangular shape and is rotationally symmetrical having axis O as a two-fold axis (n=2), during coupling of blade section 120X and a bolt section, by relatively moving blade section 120X and the bolt section in the direction in which they move away from each other in the direction of axis O in the state in which blade section 120X is relatively rotated by $180°/n$ (=90°) towards the front in the direction of screwing rotation S relative to this bolt section after inserting and passing through end section 126X of hook section 124X through a hook hole, corner sections 132X of end section 126X of hook section 124X are engaged with each engaging section.

In addition, in the blade section 120Y as previously described, since end section 126Y of hook section 124 has a roughly square shape and is rotationally symmetrical having axis O as a four-fold axis (n=4), during coupling of blade section 120Y and a bolt section, by relatively moving blade section 120Y and the bolt section in the direction in which they move away from each other in the direction of axis O in the state in which blade section 120Y is relatively rotated by $180°/n$ (=45°) towards the front in the direction of screwing rotation S with respect to this bolt section after inserting and passing through end section 126Y of hook section 124Y through a hook hole, corner sections 132Y of end section 126Y of hook section 124Y are engaged with each engaging section.

In this manner, if the end section of the hook section is rotationally symmetrical having axis O as an nth-fold axis (n≧2), regardless of its shape, the value of n is suitably from 2 to 4 as indicated above in consideration of the contact area between those walls facing towards the front end in the direction of axis O in the corner sections of the end section of the hook section, and the walls facing towards the rear end in the direction of axis O in the engaging sections formed around the hook hole.

Next, an explanation is provided of a third embodiment of the present invention. Those sections that are similar to the previously described first and second embodiments are indicated using the same reference symbols, and their explanations are omitted.

Figure 21:
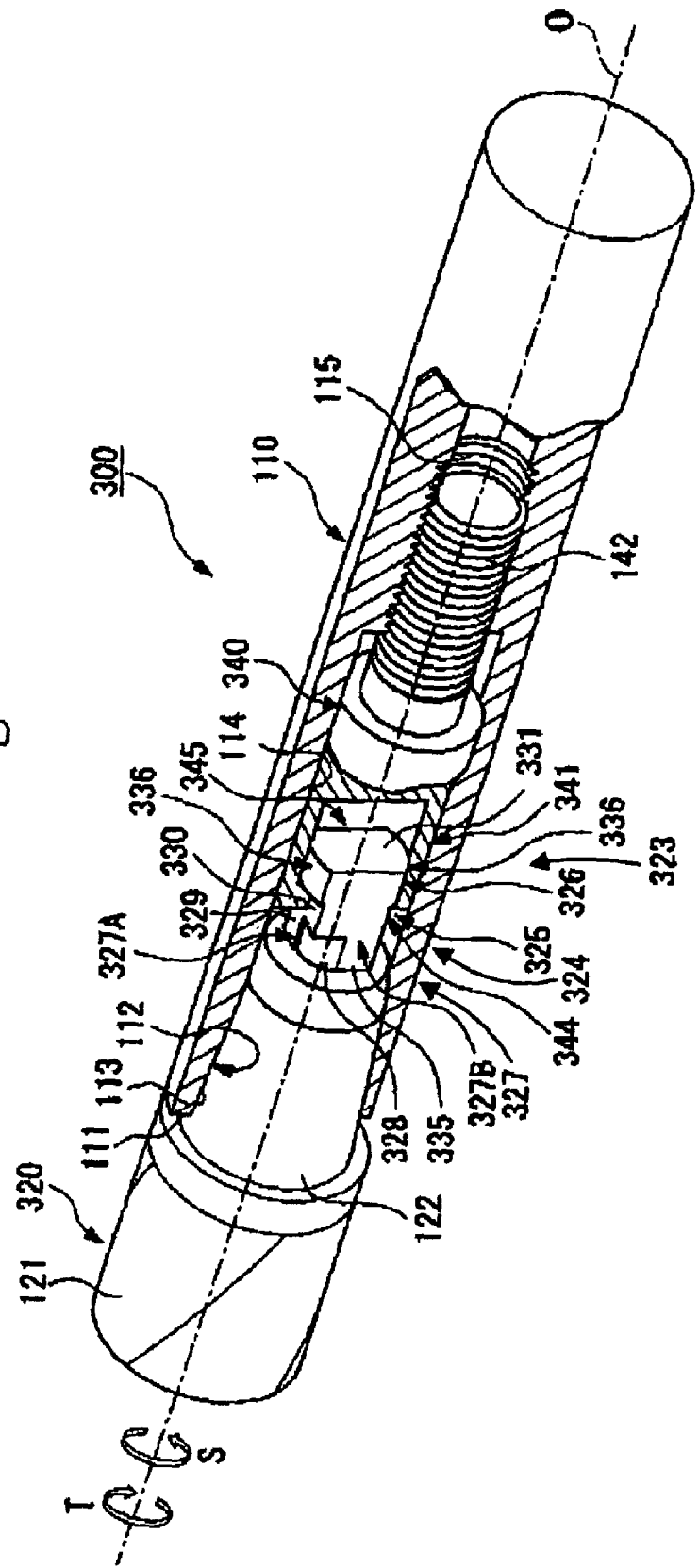
FIG. 21 is a partially exploded perspective view showing an interchangeable blade cutting tool according to a third embodiment of the present invention.

As shown in FIG. 21, an interchangeable blade cutting tool 300 according to the present third embodiment is composed of a tool body 110 rotated centering about axis O, blade section 320 removably installed and fixed on this tool body 110, and a drawing member in the form of bolt section 340 used to install blade section 320 on tool body 110.

Figure 22A:
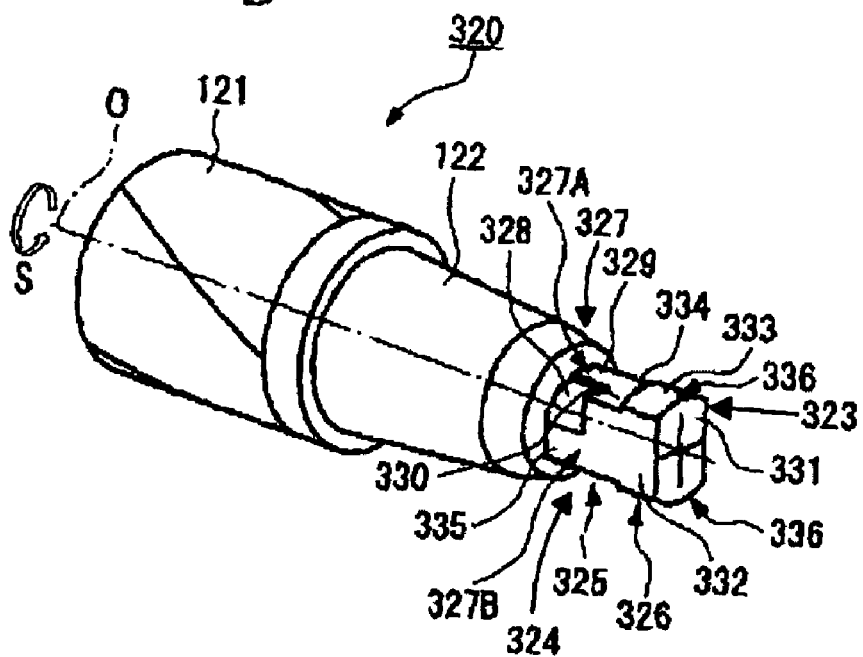
FIG. 22(a) is a perspective view showing the blade section of an interchangeable blade cutting tool according to a third embodiment of the present invention.

As shown in FIG. 22, rear end section 323 of blade section 320 is in the form of a hook section 324 composed of a shaft section 325 connected to the rear end of a tapered section 122 through a ledge section, and an end section 326 connected to the rear end of this shaft section 325 and serving as the rear end section of blade section 320.

Shaft section 325 of hook section 324 has roughly the shape of a square column centering on axis O, and by respectively cutting out the front end in the direction of axis O (on the side of tapered section 122) from a pair of opposing corner sections with respect to the O axis among the corner sections at which its four lateral surfaces 327 intersect, curved sections 328, which are cut up to the respective centers in the peripheral direction of two adjacent lateral surfaces 327, are formed in the rear end section of shaft section 325.

Figure 22B:
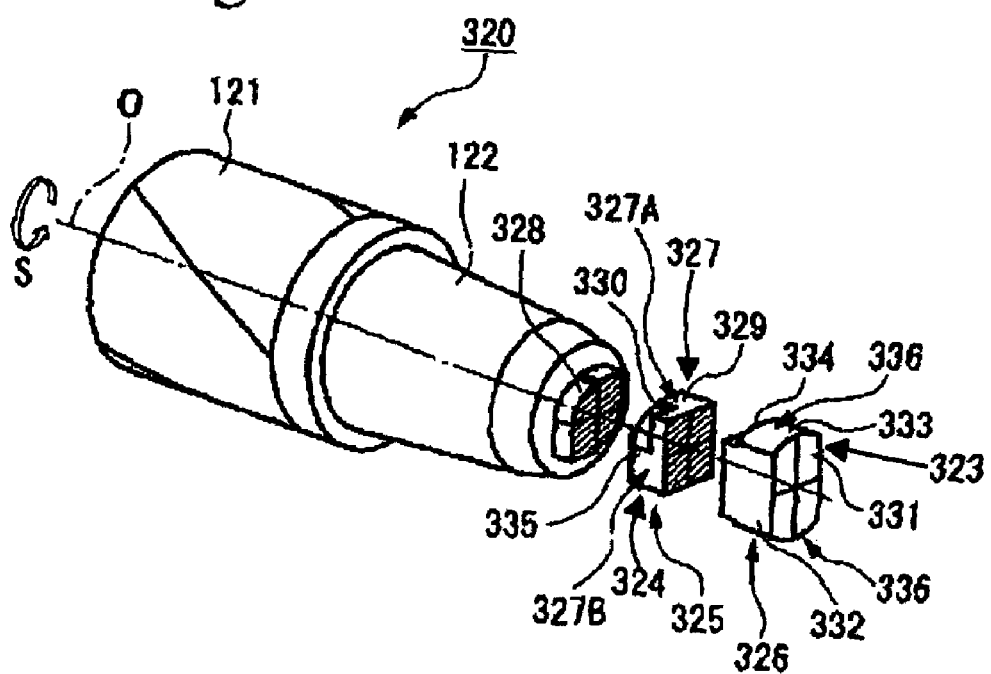
FIG. 22(b) is a partial cutaway view of FIG. 22(a).
Figure 23A:
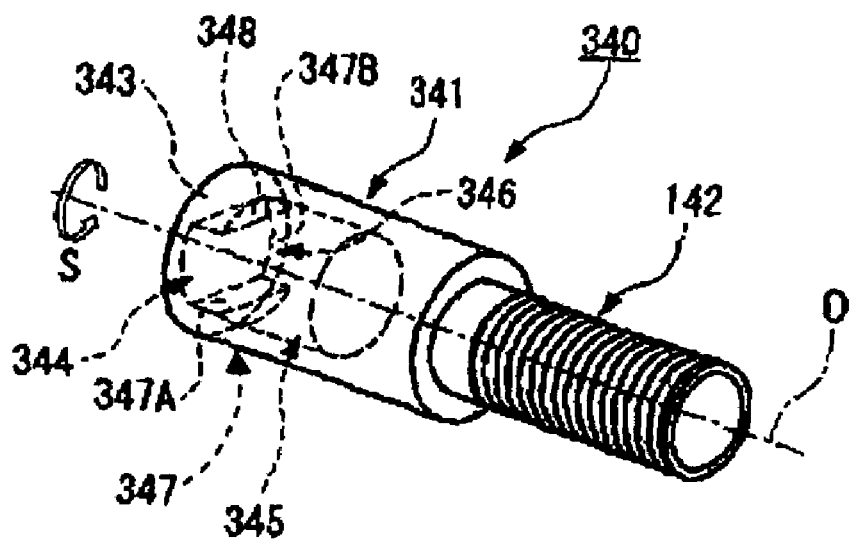
FIG. 23(a) is a perspective view showing the bolt section (drawing member) of an interchangeable blade cutting tool according to a third embodiment of the present invention.
Figure 23B:
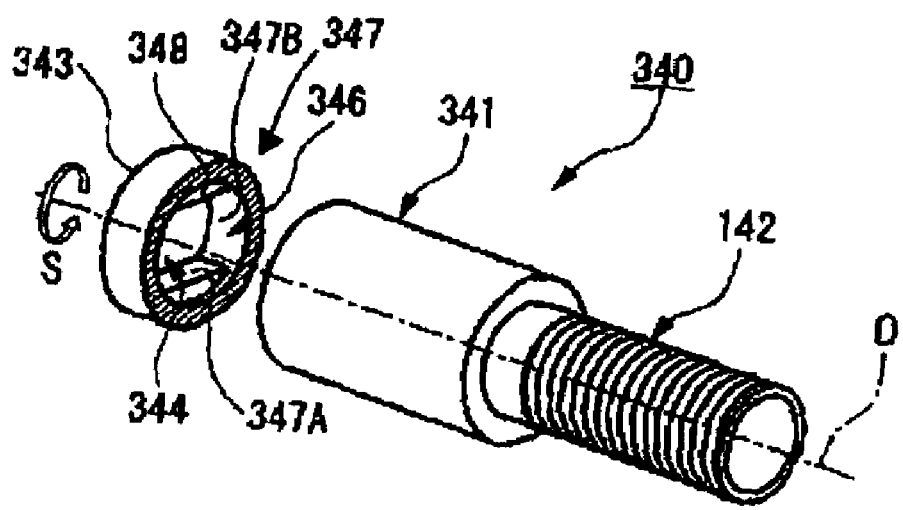
FIG. 23(b) is a partial cutaway view of FIG. 23(a).

As shown in FIG. 22(b), when viewed at the cross-section at which they are perpendicular to axis O, the pair of curved sections 328 formed in shaft section 325 of hook section 324 are each formed to have the shape of roughly a quarter arc centering on axis O, and due to the presence of this pair of curved sections 328, flat surfaces having a roughly L-shape are each left in the four lateral surfaces 327 in shaft section 325.

In the roughly L-shaped flat surface formed in lateral surface 327A located towards the rear in the direction of screwing rotation S among the two lateral surfaces 327 adjacent in the peripheral direction formed so as to respectively extend over each curved section 328, together with being continuous towards the rear in the direction of screwing rotation S with curved section 328, the flat surface located on the front end in the direction of axis O in shaft section 325 serves as a wall 329 that restricts rotation in one direction extending over roughly half the rear side in the direction of screwing rotation S of this single lateral surface 327A by being continuous with tapered section 122, and together with being continuous with the rear end sides in the direction of axis O of curved section 328 and wall 329 that restricts rotation in one direction, the flat surface located on the rear end in the direction of axis O in shaft section 325 serves as a wall 330 that restricts rotation in both directions extending over the entire length in the direction of screwing rotation S of this single lateral surface 327A by being continuous with end section 326.

On the other hand, in the roughly L-shaped flat surface formed in lateral surface 327B located on the front side in the direction of screwing rotation S among the two lateral surfaces 327 adjacent in the peripheral direction formed so as to respectively extend over each curved section 328, together with being continuous towards the front in the direction of screwing rotation S with curved section 328, the flat surface located on the front end in the direction of axis O in shaft section 325 serves as a wall 335 that restricts rotation in the other direction extending over roughly half the front side in the direction of screwing rotation S of this single lateral surface 327A by being continuous with tapered section 122.

Namely, in the lateral surface 327A described above, the flat surface located on the front end half in the direction of axis O and located on the rear half in the direction of screwing rotation S serves as wall 329 that restricts rotation in one direction, the flat surface located on the rear end half in the direction of axis O serves as wall 330 that restricts rotation in both directions by being continuous with this wall 329 that restricts rotation in one direction, and the flat surface located on the front end half in the direction of axis O and located in the front half in the direction of screwing rotation S in lateral surface 327B described above serves as wall 335 that restricts rotation in the other direction.

In other words, the shape of this shaft section 325 of hook section 324 is formed to have excess thickness at those sections where wall 329 that restricts rotation in one direction, wall 330 that restricts rotation in both directions and wall 335 that restricts rotation in the other direction are formed with respect to the virtual roughly shaped column having the above curved sections 328 as its outer peripheral surface, and when viewed at a cross-section perpendicular to axis O as well, the cross-sectional area is larger than a virtual circle having curved sections 328 as its arcs where wall 329 that restricts rotation in one direction, wall 330 that restricts rotation in both directions and wall 335 that restricts rotation in the other direction are formed.

Furthermore, the functions of wall 329 that restricts rotation in one direction, wall 330 that restricts rotation in both directions and wall 335 that restricts rotation in the other direction are described later.

When end section 326 of hook section 324 is viewed towards the front end in the direction of axis O so as to be opposed to its flat end surface 331 (rear end surface in blade section 320), end section 326 of hook section 324 has a roughly rectangular shape, and the two corner sections 336 of end section 326 having this roughly rectangular shape are protruding in the form of ledges to the outside in the radial direction farther than the pair of opposing lateral surfaces 327A (outer peripheral surface of shaft section 325) in shaft section 325.

These lateral surfaces 332 on the long side in this end section 326 having a roughly rectangular shape are composed by a flat surface serving as one surface of the roughly L-shaped flat surface in the pair of lateral surfaces 327B on which are formed wall 335 that restricts rotation in the other direction. In addition, together with protruding in the form of a ledge to the outside in the radial direction from the roughly L-shaped flat surface in the pair of lateral surfaces 327 in which wall 329 that restricts rotation in one direction and wall 330 that restricts rotation in both directions are formed, lateral surfaces 333 on the short side in end section 326 having a roughly rectangular shape are composed by curved surfaces so as to form a portion of the roughly columnar outer peripheral surface centering on axis O.

Here, as a result of the two corner sections 336 in end section 326 of hook section 324 protruding in the form of ledges towards the outside in the radial direction from the outer peripheral (the pair of lateral surfaces 327A) of shaft section 325 (lateral sections 333 on the short side in end section 326 of hook section 324 protruding in the form of ledges towards the outside in the radial direction from the outer peripheral surface of shaft section 325), walls 334 facing towards the front end in the direction of axis O are formed on these corner sections 336 while also rising from the pair of lateral surfaces 327A and intersecting lateral surfaces 333 on the short side in end section 326.

In addition, although not shown in detail in the drawing, walls 334 facing towards the front end in the direction of axis O on these corner sections 336 are actually formed in the form of curved surfaces serving as a portion of the peripheral surface of a virtual roughly shaped cone, the apex of which is facing towards the front end in the direction of axis O, centering around axis O in the same manner as the previously mentioned first embodiment, and are inclined towards the rear end in the direction of axis O as they approach the outside in the radial direction. Moreover, although also not shown in detail in the drawing, walls 334 facing towards the front end in the direction of axis O on these corner sections 336 are actually smoothly connected through curved surfaces having a roughly arc shape (or roughly oval shape) for which the radius of curvature has been set to 0.02–0.2 mm when viewed at a cross-section (cross-section perpendicular to lateral surface 327A and parallel to axis O) with respect to the outer peripheral surface (pair of lateral surfaces 327A) of shaft section 325 of hook section 324.

Furthermore, the entire hook section 324, including this end section 326 of hook section 324, is rotationally symmetrical having axis O as a two-fold axis.

Figure 32:
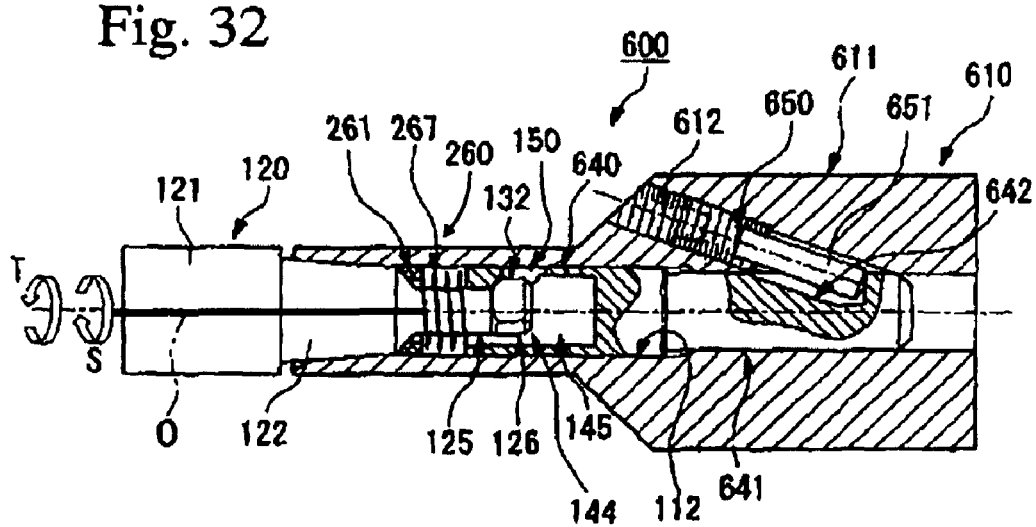
FIG. 32 is a partially exploded cross-sectional view showing an interchangeable blade cutting tool according to sixth embodiment of the present invention.
Figure 37A:
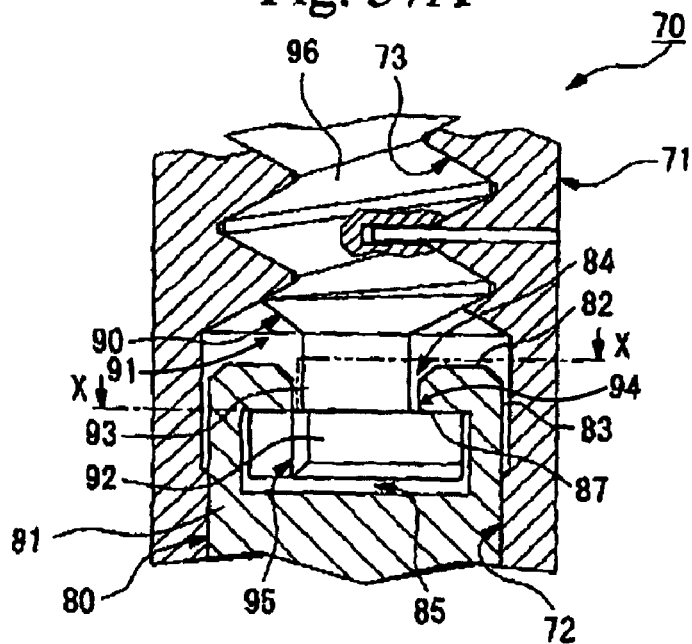
FIG. 37(a) is a partially exploded cross-sectional view showing an example of an interchangeable blade cutting tool of the prior art.
Figure 37B:
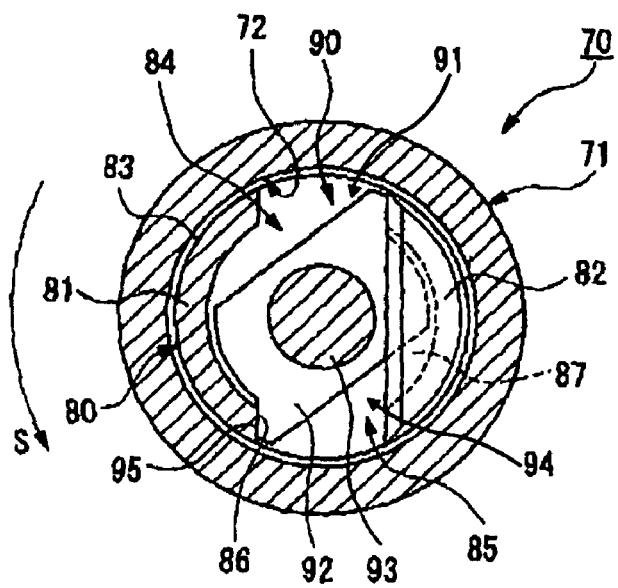
FIG. 37(b) is a cross-sectional view taken along line X—X in FIG. 37(a).

On the other hand, as shown in FIG. 32, in rear end section 341 having a roughly columnar shape in bolt section 340, together with hook hole 344 being formed that opens to its end surface 343 (front end surface in bolt section 340), hook section containment hole 345, roughly in the shape of a columnar hole having a fixed inner radius centering on axis O, is formed so as to be continuous with the rear end side of this hook hole 344.

Hook hole 344 has a roughly rectangular shape when viewed towards the rear end in the direction of axis O by opposing end surface 343 of front end section 341.

Inner walls 347A on the long side of the four inner walls 347 that compose inner peripheral surface 346 of this hook hole 344 having a roughly rectangular shape are in the form of a pair of flat surfaces mutually separated at a prescribed interval, while inner walls 347B on the short side are in the same plane as the inner peripheral surface of hook section containment hole 345, and are in the form of curved surfaces that compose a portion of a roughly columnar outer peripheral surfaces centering on axis O.

Here, as a result of this hook hole 344 having a roughly rectangular shape as described above, it has a shape corresponding to end section 326 of hook section 324 in blade section 320, is set to a size that allows end section 326 and shaft section 325 of hook section 324 to just pass through it, and opens to end surface 343 of front end section 341 of bolt section 340.

In addition, hook section containment hole 345 roughly in the shape of a columnar hole is formed to be continuous in the rear end of hook hole 344 having a roughly rectangular shape, and moreover, since only inner walls 347B on the short side in inner peripheral surface 346 of hook hole 344 are formed to as to be in the same plane as the inner peripheral surface of hook section containment hole 345, two walls are formed so as to be located around this hook hole 344 which, together with rising from the inner peripheral surface of hook section containment hole 345 and intersecting with the two inner walls 347 on the long side in inner peripheral surface 346 of hook section 344, face towards the rear end in the direction of axis O.

Although not shown in detail in the drawing, these walls 348 located around hook hole 344 and facing towards the rear end in the direction of axis O are actually formed in the form of curved surfaces that compose a portion of the peripheral surface of a virtual roughly shaped cone, the apex of which faces towards the front end in the direction of axis O, centering on axis O so as to match the shape of walls 334 facing towards the front end in the direction of axis O in corner sections 336 of end section 326 of hook section 324 as previously described, and are inclined towards the rear end in the direction of axis O as they approach the outside in the radial direction.

Furthermore, the entire front end section 341 of bolt section 340, including this hook hole 344 and hook section containment hole 345, is rotationally symmetrical having axis O as a two-fold axis.

However, in this interchangeable blade cutting tool according to the present third embodiment as well, although pressing member 160 like that explained in the previously described first embodiment is provided in bolt section 340, since the constitution and function of this pressing member 160 are similar to those explained in the first embodiment, only its reference symbol is used in the text, and its representation in the drawings is omitted.

In the state in which a blade section 320 having a constitution like that described above is installed on tool body 110 by means of bolt section 340, end section 326 of hook section 324 that serves as rear end section 323 of blade section 320 is inserted and passed through hook hole 344 formed in front end section 341 of bolt section 340, and housed within hook section containment hole 345 located on the rear end side of this hook hole 344.

At this time, the direction facing towards one of the two corner sections 336 from axis O in end section 326 of hook section 324 having a roughly rectangular shape (lengthwise direction of end section 326), and the direction facing towards one of the two corners sections (the two inner walls 347B on the short side in inner peripheral surface 346 of hook hole 344) from axis O in hook hole 344 having a roughly rectangular shape (lengthwise direction of hook hole 344) are intersecting at an angle of intersection of about 90°, namely are in a state in which the phase angles of blade section 320 and bolt section 340 differ by about 90°.

In addition, as a result of pressing member 160 having presser 161 not shown, to which force is applied towards the front end in the direction of axis O, being provided in bolt section 340, end section 326 of hook section 324 housed in hook section containment hole 345 is pressed towards the front end in the direction of axis O as a result of its end surface 331 making roughly point contact with end surface 164 having a roughly spherical shape of head section 163 of presser 161.

Moreover, as a result of walls 334 facing towards the front end in the direction of axis O in the two corner sections 336 of end section 326 of hook section 324 being arranged so as to oppose walls 348 located around hook hole 344 and facing towards the rear end in the direction of axis O while also making mutually close contact, relative movement of blade section 320 and bolt section 340 in the direction in which they move away from each other in the direction of axis O is inhibited.

Here, since walls 334 facing towards the front end in the direction of axis O in corner sections 336 of end section 326, and walls 348 located around hook hole 344 and facing towards the rear end in the direction of axis O, are actually formed in the form of curved surfaces so as to compose a portion of the peripheral surface of a virtual roughly shaped cone, their contact surfaces also are in the form of curved surfaces so as to compose a portion of the peripheral surface of a virtual roughly shaped cone, the apex of which faces towards the front end in the direction of axis O, centering on axis O, and are inclined towards the rear end in the direction of axis O as they approach the outside in the radial direction.

In addition, since the rear end section in shaft section 325 of hook section 324 (section on the side of end section 326) is housed in hook hole 344, and wall 330 that restricts rotation in both directions formed on the pair of lateral surfaces 327A in this shaft section 325 are arranged and mutually make contact so as to oppose inner walls 347A on the long side in inner peripheral surface 346 of hook hole 344, relative rotation of blade section 320 and bolt section 340 in the peripheral direction is inhibited.

Blade section 320 and bolt section 340, which are in a coupled state in which relative movement in the direction in which they move away from each other in the direction of axis O and relative rotation in the peripheral direction are inhibited in this manner, are inserted into mounting hole 112 provided in tool body 110 so that tapered section 122 roughly in the shape of a truncated cone of blade section 320 is housed in tapered hole 113, and rear end section 323 (hook section 324) of blade section 320 and front end section 341 of bolt section 340 are housed in containment hole 114 roughly in the shape of a columnar hole of mounting hole 112, and then male threads 142 of bolt section 340 are screwed into female threads 115 of mounting hole 112.

As a result of male threads 142 of bolt section 340 being screwed into female threads 115 of mounting hole 112, together with this bolt section 340 being drawn towards the rear end in the direction of axis O within mounting hole 112, blade section 320, having rear end section 323 coupled with front end section 341 of bolt section 340, is drawn towards the rear end in the direction of axis O within mounting hole 112.

As a result, roughly the entire surface of the outer peripheral surface of tapered section 122 of blade section 320 presses against roughly the entire surface of the inner peripheral surface of tapered hole 113 of mounting hole 112, axis O of blade section 320 and axis O of tool body 110 are aligned and centered, and blade section 320 is removably installed and fixed on tool body 110.

Furthermore, in the present third embodiment, although drawings are used in which threads are formed over nearly the entire length of male threads 142 of bolt section 340, by forming threads only on the front end section of male threads 142 as in the previously described first embodiment, male threads 142 of bolt section 340 and female threads 115 of mounting hole 112 may naturally be set to mesh for about 2–6 threads in the state in which blade section 320 is installed and fixed on tool body 110.

Next, an explanation is provided of the process by which blade section 320 is installed on tool body 110.

Figure 24A:
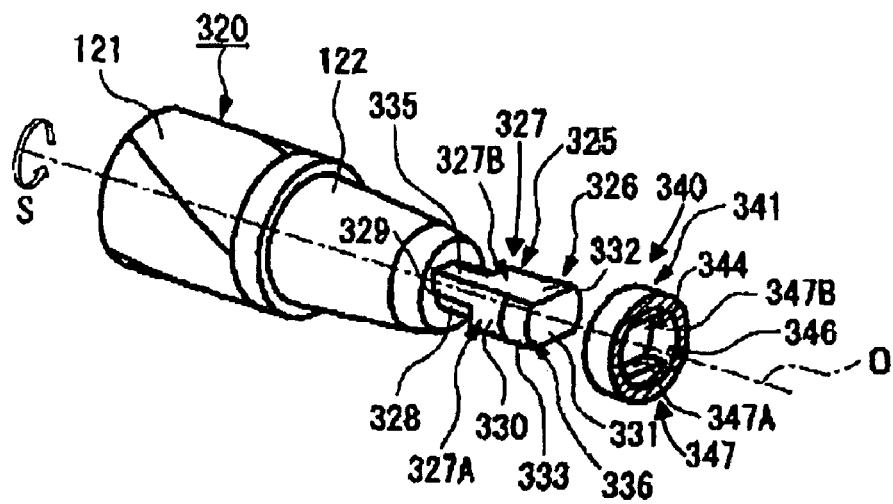
FIG. 24(a) is a partially cutaway perspective view showing the installation step of the blade section of an interchangeable blade cutting tool according to a third embodiment of the present invention.
Figure 24B:
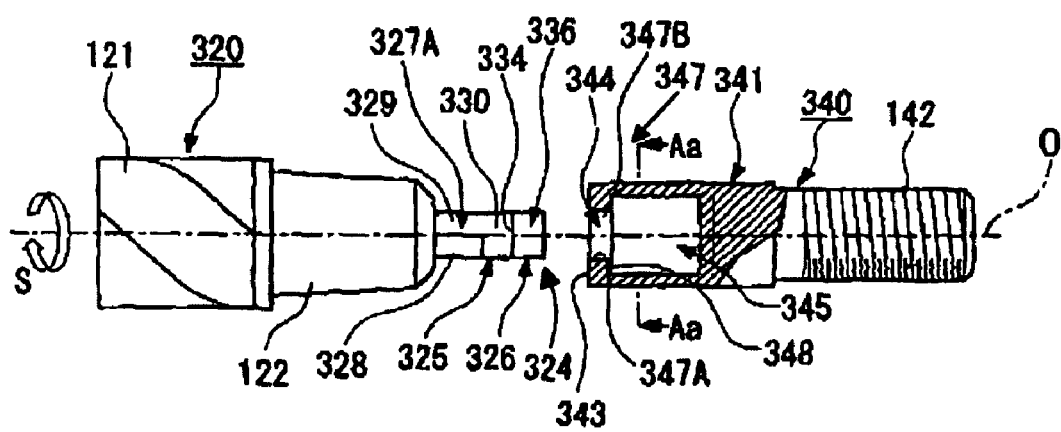
FIG. 24(b) is a partially exploded cross-sectional view of the interchangeable blade cutting tool in the state of FIG. 24(a)
Figure 24C:
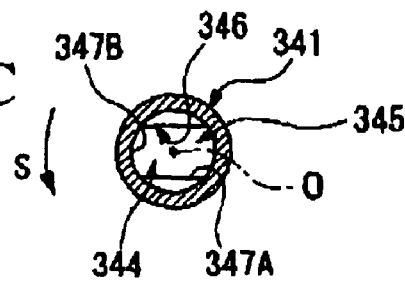
FIG. 24(c) is a cross-sectional view taken along line Aa—Aa in FIG. 24(b).

To begin with, as shown in FIG. 24, blade section 320 and bolt section 340 are prepared in the state in which they are removed from tool body 110, and then blade section 320 and bolt section 340 are relatively rotated so as to approach each other in the direction of axis O while aligning end section 326 having a roughly rectangular shape of hook section 324 with hook hole 344 having a roughly rectangular shape, namely aligning the phase angles of blade section 320 and bolt section 340.

Furthermore, the direction towards one of the two corner sections 336 from axis O in end section 326 of hook section 324 having a roughly rectangular shape (lengthwise direction of end section 326), and the direction towards one of the two corner sections (the two inner walls 347B on the short side in inner peripheral surface 346 of hook hole 344) from axis O in hook hole 344 having a roughly rectangular shape (lengthwise direction of hook hole 344) at this time are considered to be aligned and intersecting at an angle of intersection of about 0°, namely, the difference in the phase angles of blade section 320 and bolt section 340 is considered to be about 0°.

Whereupon, end section 326 of hook section 324 is inserted and passed through hook hole 344 formed to a size that allows end section 326 of hook section 324 to just pass through.

Here, since pressing member 160 not shown, having presser 161 to which force is applied towards the front end in the direction of axis O, is provided in bolt section 340, end surface 331 of end section 326 of hook section 324 that has passed through hook hole 344 makes roughly point contact with end surface 164 of head section 163 of presser 161 in pressing member 160.

By then continuing to insert end section 326 of hook section 324 into hook hole 344 (relative movement of blade section 320 and bolt section 340 in the direction in which they approach each other in the direction of axis O) while aligning the roughly L-shaped flat surface in the pair of lateral surfaces 327B of shaft section 325 of hook section 324 with inner walls 347A on the long side in inner peripheral surface 346 of hook hole 344, as shown in FIG. 25, end section 326 of hook section 324 is located within hook section containment hole 345, and the front end section of shaft section 325 of hook section 324, namely the portion at which curved sections 328 are formed, is located within hook hole 344, while the phase angles of blade section 320 and bolt section 340 are aligned.

In this state, since spring 167 of pressing member 160 is compressed by end section 326 of hook section 324, blade section 320 and bolt section 340 are pressed in the direction in which they move away from each other in the direction of axis O due to the restoring force of spring 167 itself.

Figure 25A:
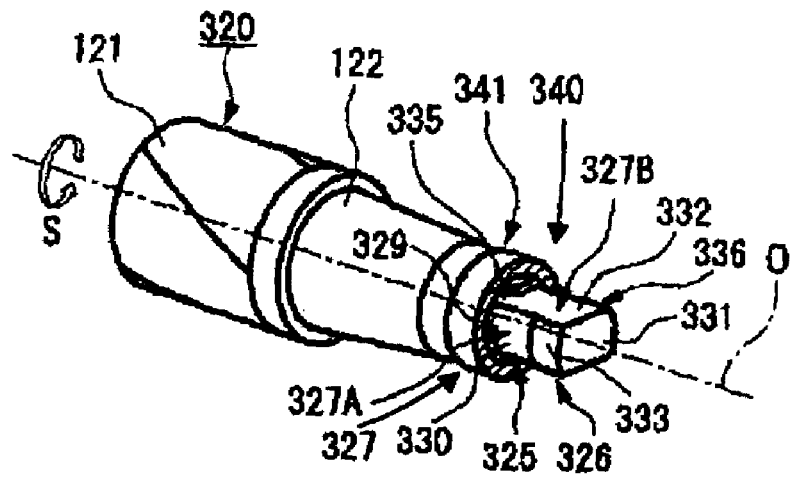
FIG. 25(a) is a partially cutaway perspective view showing the installation step of the blade section of an interchangeable blade cutting tool according to a third embodiment of the present invention.
Figure 25B:
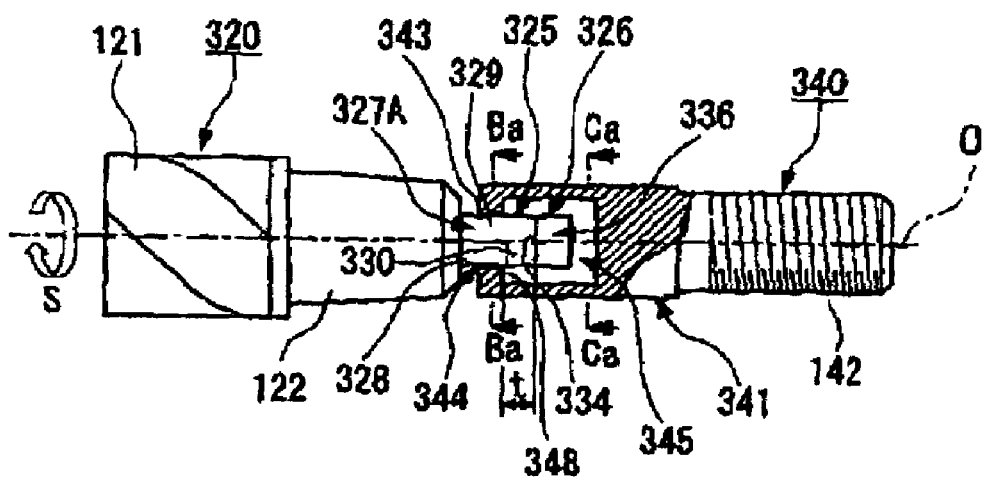
FIG. 25(b) is a partially exploded cross-sectional view of the interchangeable blade cutting tool in the state of FIG. 25(a)
Figure 25C:
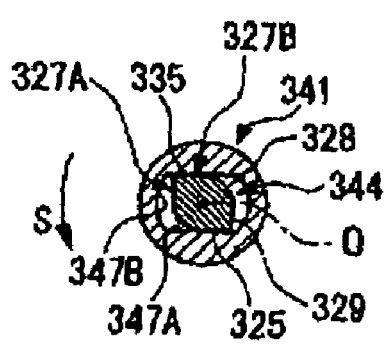
FIG. 25(c) is a cross-sectional view taken along line Ba—Ba in FIG. 25(b)
Figure 25D:
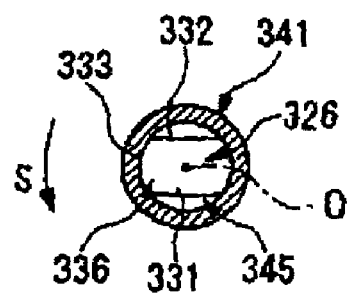
FIG. 25(d) is a cross-sectional view taken along line Ca—Ca in FIG. 25(b).

Moreover, in this state, although the outer peripheral surface of the front end section of shaft section 325 of hook section 324 (front end sections of the four lateral surfaces 327) is arranged in opposition to inner walls 347 in inner peripheral surface 346 of hook hole 344, since walls 335 that restrict rotation in the other direction on the pair of lateral surfaces 327B of shaft section 325 are located roughly on the same plane as lateral surfaces 332 on the long side of end section 326, and the phase angles of blade section 320 and bolt section 340 are aligned, as shown in FIG. 25(c), together with these walls 335 that restrict rotation in the other direction making mutual contact by being arranged in opposition to the front side sections in the direction of screwing rotation S of inner walls 347A on the long side on inner peripheral surface 346 of hook hole 344, curved sections 328 formed continuously on the rear sides in the direction of screwing rotation S of walls 335 that restrict rotation in the other direction are arranged in opposition to the rear side sections in the direction of screwing rotation S of inner walls 347A on the long side in inner peripheral surface 346 of hook hole 344.

Furthermore, at this time, walls 334 facing towards the front end in the direction of axis O in corner sections 336 of end section 326 of hook section 324, and walls 348 facing towards the rear end in the direction of axis O located around hook hole 344 are moving away by distance t that is larger than the distance along the direction of axis O between end section 326 and curved sections 328 in hook section 324.

In this manner, as a result of walls 335 that restrict rotation in the other direction formed on shaft section 325 of hook section 324 making mutual contact by being arranged in opposition to the front side sections in the direction of screwing rotation S of inner walls 347A on the long side in inner peripheral surface 346 of hook hole 344, together with the relative rotation of blade section 320 towards the rear in the direction of screwing rotation S with respect to bolt section 340 being inhibited, since curved sections 328 formed on shaft section 325 of hook section 324 are arranged in opposition to the rear side sections in the direction of screwing rotation S of inner walls 347A on the long side in inner peripheral surface 346 of hook hole 344, relative rotation of blade section 320 towards the front in the direction of screwing rotation S with respect to bolt section 340 is allowed.

Figure 26:
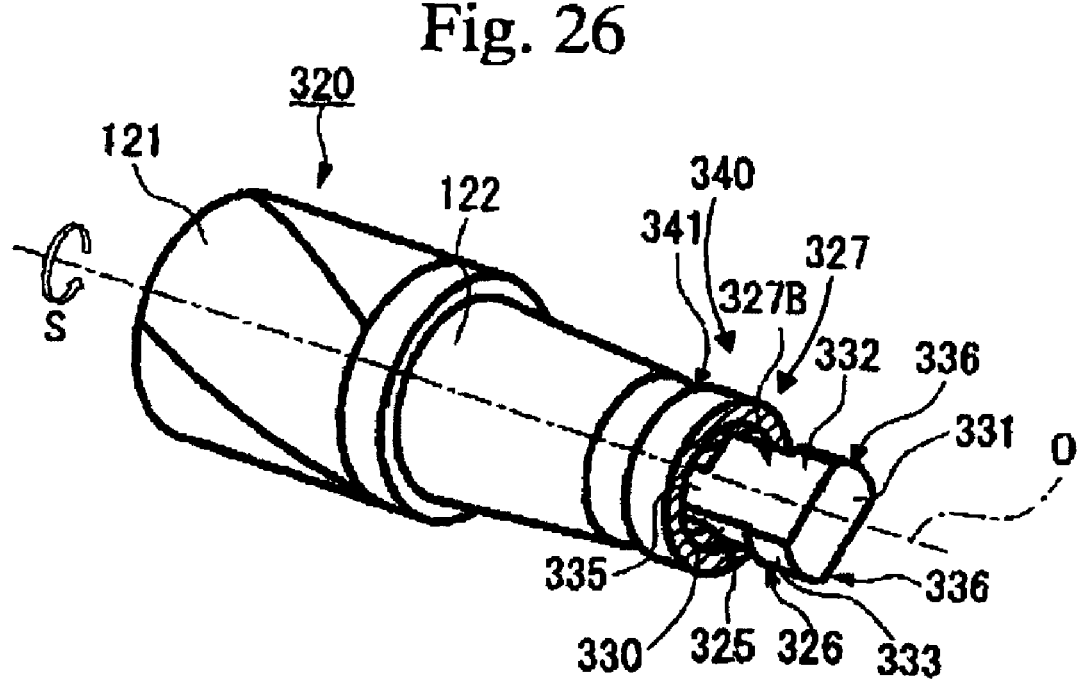
FIG. 26 is a partially cutaway perspective view showing the installation step of the blade section of an interchangeable blade cutting tool according to a third embodiment of the present invention.

If blade section 320 is then relatively rotated towards the front in the direction or screwing rotation S around axis O with respect to bolt section 340 as shown in FIG. 26, when this blade section 320 is relatively rotated towards the front in the direction of screwing rotation S by a prescribed angle (about 90° in the present third embodiment) with respect to bolt section 340 as shown in FIG. 27, walls 329 that restrict rotation in one direction formed on the pair of lateral surfaces 327A of shaft section 325 of hook section 324 make mutual contact by being arranged in opposition to the rear side sections in the direction of screwing rotation S in inner walls 347A on the long side of inner peripheral surface 346 of hook hole 344.

In addition, in the state in which blade section 320 is relatively rotated by a prescribed angle with respect to bolt section 340, and walls 329 that restrict rotation in one direction on shaft section 325 of hook section 324 are in contact with inner walls 347A on the long side in inner peripheral surface 346 of hook hole 344, as shown in FIG. 27(d), together with these walls 329 that restrict rotation in one direction making mutual contact by being arranged in opposition to the rear side sections in the direction of screwing rotation S of inner walls 347A on the long side in inner peripheral surface 346 of hook hole 344, curved sections 328 formed continuously with the front sides in the direction of screwing rotation S of walls 329 that restrict rotation in one direction are arranged in opposition to the front side sections in the direction of screwing rotation S of inner walls 347A on the long side in inner peripheral surface 346 of hook hole 344.

In this manner, as a result of walls 329 that restrict rotation in one direction formed on shaft section 325 of hook section 324 making mutual contact by being arranged in opposition to the rear side sections in the direction of screwing rotation S of inner walls 347A on the long side in inner peripheral surface 346 of hook hole 344, relative rotation of blade section 320 towards the front in the direction of screwing rotation S with respect to bolt section 340 is inhibited.

By then relatively rotating blade section 320 with respect to bolt section 340 towards the front in the direction of screwing rotation S by about 90° after inserting and passing end section 326 of hook section 324 through hook hole 344, a state is reached in which the difference in the phase angles of blade section 320 and bolt section 340 is changed from about 0° to about 90°.

Here, the range over which the difference in phase angles of blade section 320 and bolt section 340 is changed is restricted to the range of 0° to 90° by walls 329 that restrict rotation in one direction and walls 335 that restrict rotation in the other direction being formed on shaft section 325 of hook section 324.

Subsequently, if the force that presses blade section 320 and bolt section 340 in the direction in which they approach each other in the direction of axis O is reduced, as a result of blade section 320 and bolt section 340 being pressed in the direction in which they move away from each other in the direction of axis O by pressing member 160 not shown, blade section 320 and bolt section 340 are relatively moved in the direction in which they move away from each other in the direction of axis O while remaining in the state in which the phase angles of blade section 320 and bolt section 340 differ by about 90°.

Accompanying relative movement of blade section 320 and bolt section 340 in the direction in which they move away from each other in the direction of axis O, inner walls 347A on the long side in inner peripheral surface 346 of hook hole 344, which are in contact with the front end section of walls 329 that restrict rotation in one direction formed on shaft section 325 of hook section 324, are moved along these walls 329 that restrict rotation in one direction towards the rear end while maintaining contact with these walls 329 that restrict rotation in one direction.

As a result, the distance t in the direction of axis O between walls 334 facing towards the front end in the direction of axis O in corner sections 336 of end section 326 of hook section 324 housed in hook section containment hole 345, and wall 348 facing towards the rear end in the direction of axis O located around hook hole 344, gradually becomes smaller.

Whereupon, since wall 330 that restricts rotation in both directions in the same plane as wall 329 that restricts rotation in one direction is formed on the rear end section of this wall 329 that restricts rotation in one direction in the roughly L-shaped flat surface in lateral surface 327A, inner walls 347A on the long side in inner peripheral surface 346 of hook hole 344 are in a state in which they are in mutual contact by being arranged in opposition to wall 330 that restricts rotation in both directions.

Namely, walls 329 that restrict rotation in one direction formed on shaft section 325 of hook section 324 are made to inhibit the relative rotation of blade section 320 towards the front in the direction of screwing rotation S with respect to bolt section 340 at a prescribed angle (about 90° in the present third embodiment) so that walls 330 that restrict rotation in both directions formed on shaft section 325 of hook section 324 are precisely in opposition to and make contact with inner walls 347A on the long side in inner peripheral surface 346 of hook hole 344 when blade section 320 and bolt section 340 are relatively rotated in the direction in which they move away from each other in the direction of axis O.

At this time, as a result of the rear end section in the direction of screwing rotation S of wall 330 that restricts rotation in both directions making contact with the rear end section in the direction of screwing rotation S of inner wall 347A on the long side in inner peripheral surface 346 of hook hole 344, relative rotation of blade section 320 towards the front in the direction of screwing rotation S with respect to hook section 340 is inhibited, and as a result of the front end section in the direction of screwing rotation S of wall 330 that restricts rotation in both directions making contact with the front end section in the direction of screwing rotation S of inner wall 347A on the long side in inner peripheral surface 346 of hook hole 344, relative rotation of blade section 320 towards the rear in the direction of screwing rotation S with respect to bolt section 340 is inhibited, and relative movement of blade section 320 and bolt section 340 in the peripheral direction is inhibited.

In other words, a state is achieved in which the rotational force when blade section 320 is rotated in the peripheral direction (towards the front and rear in the direction of screwing rotation S) is transmitted to bolt section 340 at all times.

Continuing, as a result of relative movement of blade section 320 and bolt section 340 in the direction in which they move away from each other in the direction of axis O continuing, finally, as shown in FIG. 28, in addition to relative rotation of blade section 320 and bolt section 340 in the peripheral direction being inhibited, as a result of walls 334 facing towards the front end in the direction of axis O in the two corner sections 336 of end section 326 of hook section 324, and walls 348 located around hook hole 344 and facing towards the rear end in the direction of axis O, making contact and being pressed together, relative movement of blade section 320 and bolt section 340 in the direction in which they move away from each other in the direction of axis O is inhibited.

In the manner described above, blade section 320 and bolt section 340 are coupled since relative movement of blade section 320 and bolt section 340 in the direction in which they move away from each other in the direction of axis O, as well as their relative rotation in the peripheral direction, are inhibited.

Thus, since it is possible to integrally handle blade section 320 and bolt section 340, together with inserting coupled blade section 320 and bolt section 340 into mounting hole 112 provided in tool body 110, by, for example, applying a wrench to flat surface 121C formed in cutting section 121 of blade section 120, blade section 320 is relatively rotated with respect to tool body 110 towards the front in the direction of screwing rotation S of male threads 142.

Whereupon, as a result of the rotational force towards the front in the direction of screwing rotation S being transmitted to bolt section 340 for which relative rotation in the peripheral direction is inhibited due to being coupled to blade section 320, and male threads 142 of bolt section 340 being screwed into female threads 115 of mounting hole 112, bolt section 340 is drawn towards the rear end in the direction of axis O within mounting hole 112 with respect to tool body 110.

As a result, blade section 320, which is coupled to bolt section 340 and for which relative rotation in the direction in which they move away from each other in the direction of axis O is inhibited, is also drawn towards the rear end in the direction of axis O within mounting hole 112 with respect to tool body 110, a state is reached in which the outer peripheral surface of tapered section 122 of blade section 320 presses against the inner peripheral surface of tapered hole 113 of mounting hole 112, and blade section 320 is removably installed and fixed on tool body 110.

On the other hand, in the process of removing blade section 320 from tool body 110, by, for example, applying a wrench to flat surface 121C formed on cutting section 121 of blade section 320, blade section 320 is relatively rotated towards the rear in the direction of screwing rotation S of male threads 142 of bolt section 340 with respect to tool body 110.

Here, in the state in which blade section 320 is coupled to bolt section 340, by walls 330 that restrict rotation in both directions formed on shaft section 325 of hook section 324 making contact with inner walls 347A on the long side in inner peripheral surface 346 of hook hole 344, the rotational force when blade section 320 is relatively rotated towards the rear in the direction of screwing rotation S with respect to tool body 110 is transmitted directly to bolt section 340.

As a result of then relatively rotating blade section 320 towards the rear in the direction of screwing rotation S with respect to tool body 110 while in this state, accompanying the loosening of male threads 142 of bolt section 340 from female threads 115 of mounting hole 112, bolt section 340 is pressed towards the front end in the direction of axis O within mounting hole 112, and the pressing of the outer peripheral surface of tapered section 122 of blade section 320 against the inner peripheral surface of tapered hole 113 of mounting hole 112 is released.

Continuing, as a result of relatively rotating blade section 320 towards the rear in the direction of screwing rotation S with respect to tool body 110, the meshing of male threads 142 of bolt section 340 with female threads 115 of mounting hole 112 is completely released, and blade section 320 and bolt section 340 can be removed from tool body 110 in the state in which blade section 320 and bolt section 340 remain coupled.

In addition, if mutually coupled blade section 320 and bolt section 340 are desired to be disconnected, in addition to applying a force that presses blade section 320 and bolt section 340, which are pressed in the direction in which they move away from each other in the direction of axis O, in the direction in which they approach each other in the direction of axis O by pressing member 160 not shown, by relatively moving blade section 320 and bolt section 340 in the direction in which they approach each other in the direction of axis O, the contact by walls 330 that restricts rotation in both directions formed on shaft section 325 of hook section 324 with inner walls 347A on the long side in inner peripheral surface 346 of hook hole 344 is completely released.

When blade section 320 is relatively rotated towards the rear in the direction of screwing rotation S by a prescribed angle with respect to bolt section 340, since walls 335 that restrict rotation in the other direction formed on shaft section 325 of hook section 324 contact inner walls 347A on the long side in inner peripheral surface 346 of hook hole 344, the phase angles of blade section 320 and bolt section 340 are aligned, and this relative rotation is inhibited.

This being the case, as a result of blade section 320 and bolt section 340 being pressed in the direction in which they move away from each other in the direction of axis O by pressing member 160 not shown, blade section 320 and bolt section 340 are relatively moved in the direction in which they move away from each other in the direction of axis O, and end section 326 of hook section 324 naturally is pulled out from hook hole 344, enabling blade section 320 to be removed from bolt section 340.

According to the interchangeable blade cutting tool 300 according to the present third embodiment composed in this manner, similar effects are able to be obtained with respect to those sections that employ constitution similar to the previously described first and second embodiments.

Furthermore, in the present third embodiment, the coupling between blade section 320 and bolt section 340 is carried out by relatively moving blade section 320 and bolt section 340 in the direction in which they move away from each other in the direction of axis O in the state in which blade section 320 and bolt section 340 are relatively rotated by about 90° (=180°/n) after inserting and passing end section 326 of hook section 324 through hook hole 344, and together with arranging in opposition and contacting walls 330 that restrict rotation in both directions formed on shaft section 325 of hook section 324 with inner walls 347A on the long side in inner peripheral surface 346 of hook hole 344, walls 334 facing towards the front end in the direction of axis O in corner sections 336 of end section 326 of hook section 324 are made to contact walls 348 located around hook hole 344 and facing towards the rear end in the direction of axis O.

Consequently, although there are some differences in the respective constitutions between the third embodiment and the first (second) embodiment, by understanding that the corresponding matters fulfilling similar roles like those respectively indicated in (1) through (4) below can be suitably substituted for each other as necessary, an explanation of the effects obtained by those sections having a somewhat different composition from the first embodiment may be omitted:

(1) "walls 334 facing towards the front end in the direction of axis O" (and "walls 348 facing towards the rear end in the direction of axis O" that mutually make contact with them) in the third embodiment, and "walls 134 facing towards the front end in the direction of axis O" (and walls 151 facing towards the rear end in the direction of axis O" that mutually make contact with them) in the first embodiment;

(2) "walls 330 that restrict rotation in both directions" (and "inner walls 347A on the long side" that mutually make contact with them) in the third embodiment, and "walls facing toward the peripheral direction in corner sections 132 (sections of corner sections 132 in lateral surfaces 133)" (and "side walls 152 facing toward the peripheral direction in engaging sections 150" that mutually make contact with them) in the first embodiment;

(3) "walls 329 that restrict rotation in one direction" (and "inner walls 347A on the long side" that mutually make contact with them) in the third embodiment, and "walls 129 that restrict rotation in one direction" (and "inner walls 147" that mutually make contact with them) in the first embodiment; and, (4) "walls 335 that restrict rotation in the other direction" (and "inner walls 347A on the long side" that mutually make contact with them) in the third embodiment, and "walls 130 that restrict rotation in the other direction" (and "innerwalls 147" that mutually make contact with them) in the first embodiment.

Next, an explanation is provided of a fourth embodiment of the present invention. Those sections that are similar to the previously described first through third embodiments are indicated using the same reference symbols, and their explanations are omitted.

Figure 29:
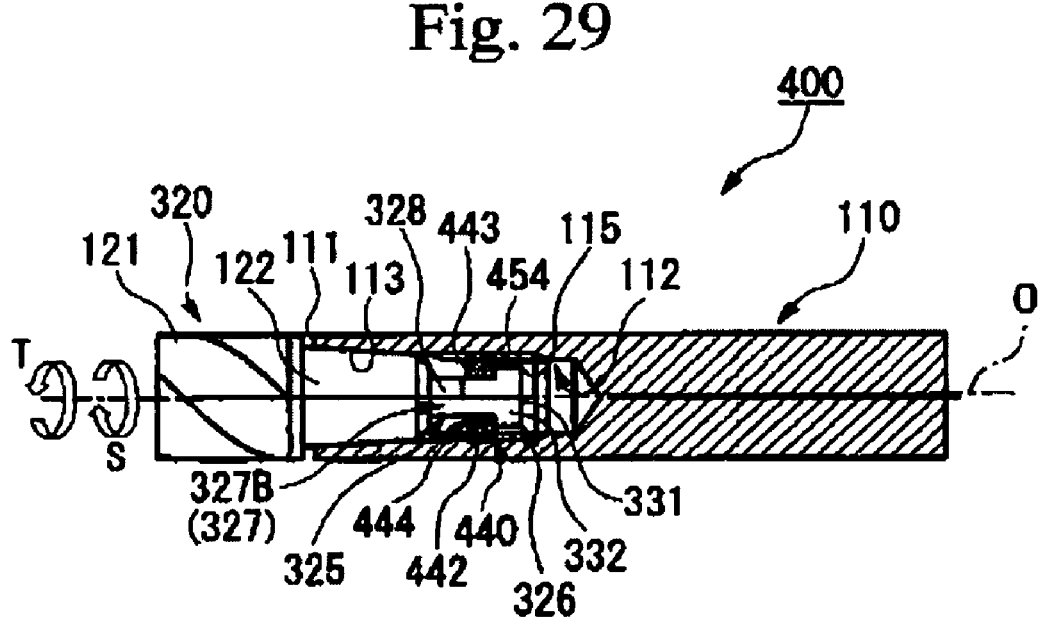
FIG. 29 is a partially exploded cross-sectional view showing an interchangeable blade cutting tool according to a fourth embodiment of the present invention.

As shown in FIG. 29, an interchangeable blade cutting tool 400 according to the present fourth embodiment is composed in the same manner as the previously described third embodiment, and is different from the third embodiment with respect to the shape of the bolt section.

As shown in FIG. 29, bolt section 440 in this interchangeable blade cutting tool 400 is formed centering about axis O so as to have a roughly a ring shape in which male threads 442 are formed on its outer peripheral surface.

Together with a hook hole 444 that opens in a roughly rectangular shape to an end surface 443 (front end surface) being formed in bolt section 440, the rear end of this hook hole 444 is open to rear end surface 454 of bolt section 440.

In other words, hook hole 444 is formed to be passing through the entire length of bolt section 440 in the direction of axis O while being centered about axis O.

In addition, together with intersecting the walls located around hook hole 444, namely the four inner walls on the long side in the inner peripheral surface that compose the inner walls of hook hole 444, two walls facing towards the rear end in the direction of axis O serve as rear end surfaces 454 of bolt section 440.

However, in this interchangeable blade cutting tool 400 according to the present fourth embodiment as well, although a pressing member 260 like that explained in the previously described second embodiment is provided in bolt section 440, since the constitution and function of this pressing member 260 are similar to those explained in the second embodiment, its representation in the drawings is omitted.

In the case of this interchangeable blade cutting tool 400 according to the present fourth embodiment as well, blade section 320 and bolt section 440 are coupled by going through a process similar to that of the previously described second embodiment.

Furthermore, the shape of hook section 324 of blade section 320 is not limited to that used in the previously described third embodiment and present fourth embodiment, and although it may of any shape provided end section 326 of hook section 324 is rotationally symmetrical having axis O as an n-fold axis (n≧2) (and the shape of the bolt section may also be suitably redesigned corresponding to the blade section), as explained in FIGS. 19 and 20 corresponding to blade section 120 used in the first and second embodiments, for example, it is suitable that n=2 to 4 in consideration of the contact surface area between the walls facing towards the front end in the direction of axis O in the corner sections of the end section of the hook section, and the walls facing towards the rear end in the direction of axis O located around the hook hole.

In addition, in each of the previously mentioned embodiments, although an explanation was provided in which tool body 110 was composed entirely of steel, tool body 110 is not limited to this, but rather it may also be composed by, for example, composing at least the section that contains female threads 115 in mounting hole 112 of tool body 110 with steel, while composing the other sections of tool body 110 with cemented carbide.

Figures 30A, 30B:
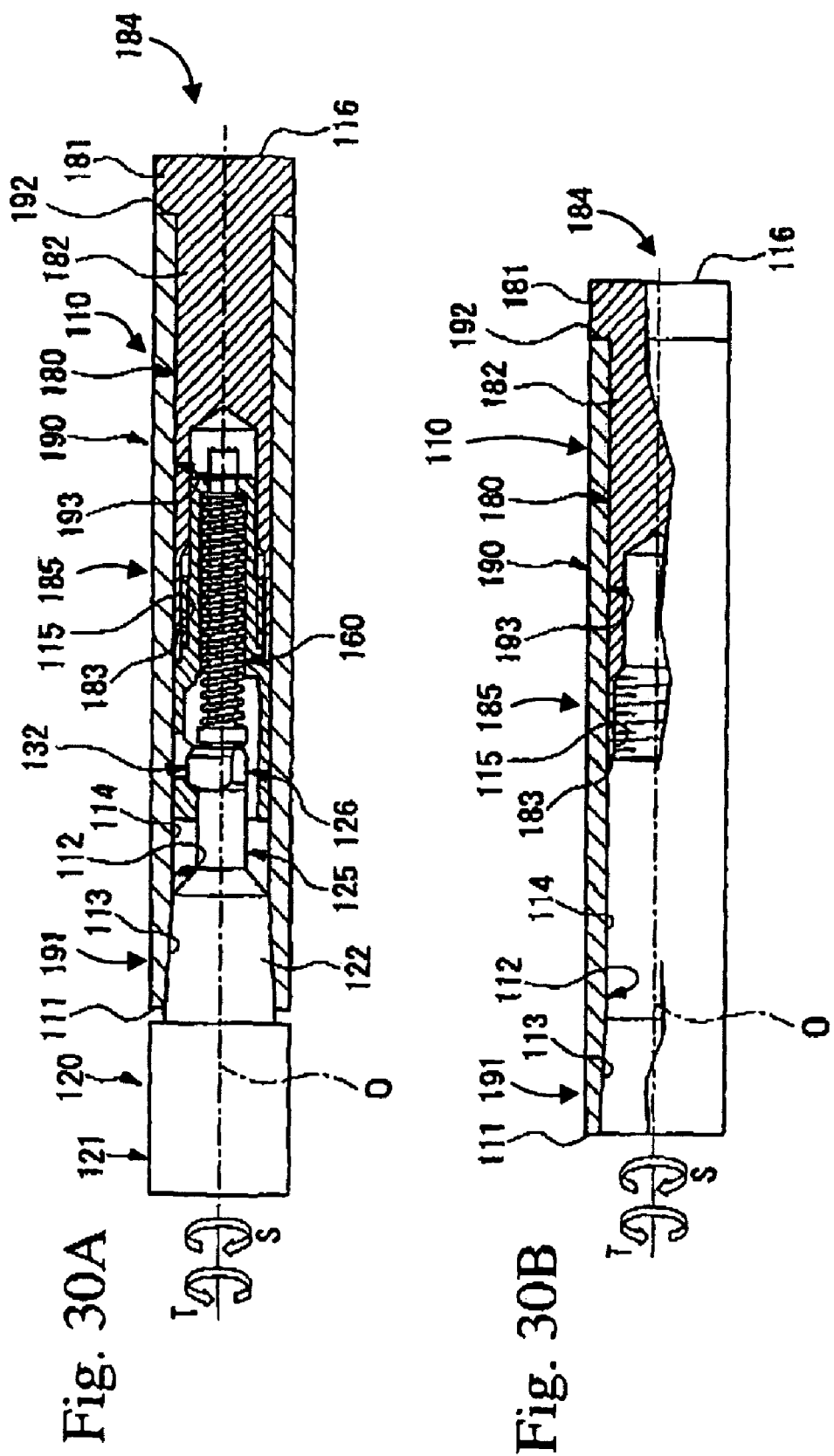
FIG. 30(a) is a partially exploded cross-sectional view showing a variation of the tool body of an interchangeable blade cutting tool according to an embodiment of the present invention.
FIG. 30(b) is a partially exploded cross-sectional view showing the tool body of the same interchangeable blade cutting tool.

For example, as in the variation shown in FIG. 30 (those sections that are similar to the previously described first through third embodiments are indicated using the same reference symbols, and there explanations are omitted), tool body 110 may be composed by joining a first cutting tool section 180 made of steel in which female threads 115 are formed in mounting hole 112, and a second tool body section 190 made of cemented carbide.

First tool body section 180 is has a rear end section 181 which is made of steel and roughly in the shape of a multi-staged column, and provided with rear end surface 184 serving as rear end surface 116 of tool body 110, and rear end section 182, which together with being further narrowed on the rear end side of this rear end section 181, is provided with female threads 185 facing towards the rear end side from its rear end surface 183.

On the other hand, second tool body section 190 has through hole 193, which is made of cemented carbide and roughly in the shape of a column, and passes from front end surface 191, which serves as front end surface 111 of tool body 110, to rear end surface 192.

After having inserted front end section 182 of first tool body section 180 into the through hole 193 from the opening to rear end surface 192 of through hole 193 of second body section 190 until rear end surface 192 of second tool body section 190 and rear end section 181 of first tool body section 180 make contact, first tool body section 180 and second tool body section 190 are mutually coupled to compose tool body 110.

As a result, tapered section 113 and containment hole 114 of mounting hole 112 are composed by the front end section in through hole 193 of second tool body section 190, and female threads 115 of mounting hole 112 are composed by female threads 185 of first tool body section 180.

In an interchangeable blade cutting tool using this type of tool body 110, even though it is possible to enhance the overall rigidity of tool body 110 by second tool body section 190 made of cemented carbide, female threads 115 can be easily formed in first tool body section 180 made of steel.

Furthermore, although any coupling means may be used for the coupling of first tool body section 180 and second tool body section 190, and one example of such a coupling means is brazing.

In addition, in each of the above embodiments, although a bolt section is used as a drawing member for drawing a blade section towards the rear end in the direction of axis O of a tool body, and is composed so that, together with the drawing member having a meshing section in the form of male threads, the male threads are screwed onto a meshed section in the form of female threads of a mounting hole, this interchangeable blade cutting tool is not limited to this, but rather, together with forming a meshing section in the form of female threads in a drawing member, a meshed section in the form of male threads may be formed in the mounting hole.

Figure 31:
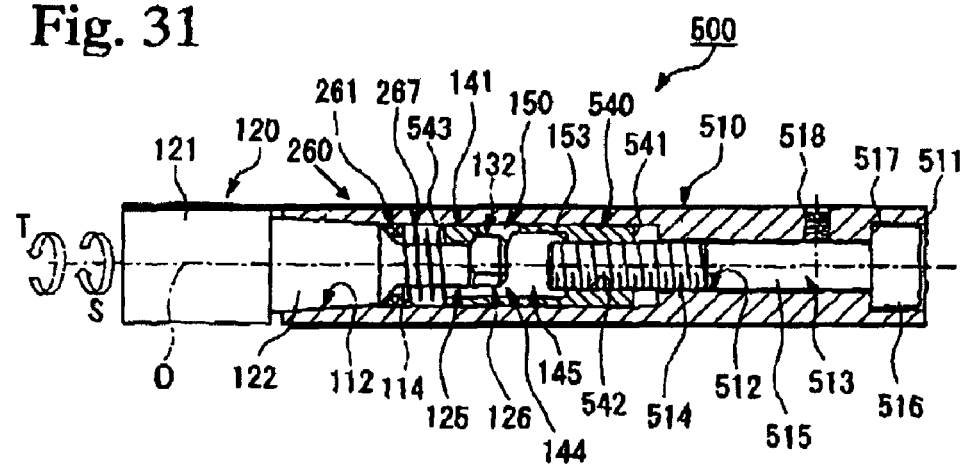
FIG. 31 is a partially exploded cross-sectional view showing an interchangeable blade cutting tool according to a fifth embodiment of the present invention.

For example, an interchangeable blade cutting tool like that of a fifth embodiment shown in FIG. 31 may also be employed (those sections that are similar to the previously described first through fourth embodiments are indicated using the same reference symbols, and their explanations are omitted).

In the interchangeable blade cutting tool 500 of this fifth embodiment, a drawing member 540, which is coupled with a blade section 120 and is for drawing blade section 120 towards the rear end in the direction of axis O, has roughly the shape of a column, a hook hole 144, engaging sections 150 and a hook section containment hole 145 are formed in its front end section 141, and a meshing section in the form of female threads 542 is formed in its rear end section to as to pass from bottom surface 153 of hook section containment hole 145 to rear end surface 541 of drawing member 540.

In addition, a spring 267 coupled to its front end surface 543 and extending while encircling towards the front end in the direction of axis O, and a pressing member 260 coupled to the front end of this spring 267 and composed of a roughly ring-shaped presser 261, are attached to this drawing member 540.

A locking bolt containment hole 512, which is continuous with the rear end side of a containment hole 114 of mounting hole 112 and passes through to rear end surface 511 of tool body 510, is formed in tool body 510 so as to correspond to drawing member 540, and a locking bolt 513 is inserted and fixed in this locking bolt containment hole 512.

A meshed means in the form of male threads 514 is formed in the front end section of locking bolt 513, and a shaft section 515 and a head section 516 are formed so as to be sequentially continuous on its rear end side.

In the state in which this locking bolt 513 is inserted into locking bolt containment hole 512, head section 516 of locking bolt 513 is housed within ledge section 517 widened in the form of a ledge and formed as an opening to rear end surface 511 in locking bolt containment hole 512, shaft section 515 of locking bolt 513 is housed within locking bolt containment hole 512, and males threads 514 of locking bolt 513 are housed within containment hole 114 of mounting hole 112 so as to be protruding towards the rear end in the direction of axis O.

In addition, movement of this locking bolt 513 in the direction of axis O and in the peripheral direction within locking bolt containment hole 512 is inhibited by locking bolt locking screw 518 inserted into a hole formed to pass through tool body 510 from the outer peripheral surface of tool body 510 to locking bolt containment hole 512 of mounting hole 112.

As a result, male threads 514 of locking bolt 513 in the state in which they are housed within containment hole 114 of mounting hole 112 serve as a meshed section in mounting hole 112, and female threads 524 formed in the rear end section of drawing member 540 are screwed onto these male threads 514.

Furthermore, in this fifth embodiment, the direction of screwing rotation S of the meshing section is the direction of rotation when drawing member 540 is rotated about axis O with respect to tool body 510 when a meshing section in the form of female threads 542 in drawing member 540 are screwed onto a meshed section in the form of male threads 514 in mounting hole 112.

In an interchangeable blade cutting tool 500 according to this fifth embodiment using a drawing member 540 and tool body 510 as explained above, since locking bolt 513 is comprised of steel, and the other sections of tool body 510 excluding this are comprised of cemented carbide, similar to the variation of the tool body shown in FIG. 30 as previously described, the meshed section in the form of male threads 514 can be formed easily while enhancing the overall rigidity of tool body 510.

In addition, in the each of the above embodiments, although a constitution is employed for the drawing means for drawing a drawing member towards the rear end in the direction of axis O in which the meshing section of the drawing member is screwed onto the meshed section of a mounting hole, the interchangeable blade cutting tool is not limited to this, but rather the drawing member may also be drawn towards the rear end in the direction of axis O by a drawing bolt.

One possible example is a sixth embodiment shown in FIGS. 32 (those sections that are similar to the previously described first through fifth embodiments are indicated using the same reference symbols, and their explanations are omitted).

In an interchangeable blade cutting tool 600 of this sixth embodiment, drawing bolt engaging section 642 is provided in the outer peripheral surface of a rear end section 641 of drawing member 640, and together with being inclined towards the rear end in the direction of axis O as it approaches the inside in the radial direction, drawing bolt meshing section 612 that passes through to mounting hole 112 is provided in the outer peripheral surface of rear end section 611 of tool body 610.

In addition, as a result of drawing bolt 650, which has a front end section 651 roughly in the shape of a column, being screwed into this drawing bolt meshing section 612 provided in tool body 610, this front end section 651 of drawing bolt 650 engages with drawing bolt engaging section 642 formed in the rear end section 641 of drawing member 640.

Since drawing bolt 650 is screwed into drawing bolt meshing section 612, drawing member 640, which has drawing bolt engaging section 642 engaged with front end section 651 of drawing bolt 650, is drawn towards the rear end in the direction of axis O of tool body 610.

In addition, in each of the above embodiments, although the blade section is restrained as a result of tightly pressing together the outer peripheral surface of tapered section 122 of this blade section and the inner peripheral surface of tapered hole 113 of mounting hole 112, in order to further enhance the installation rigidity of this blade section, the blade section should be restrained on two sides by tightly pressing together front end surface 111 of tool body 110 and the wall of the blade section arranged in opposition to this front end surface 111 simultaneous to tightly pressing together the outer peripheral surface of tapered section 122 and the inner peripheral surface of tapered hole 113.

However, in order to realize restraint of the blade section on two sides, the outer peripheral surface of tapered section 122 and the inner peripheral surface of tapered hole 113, as well as front end surface 111 of tool body 110 and the wall of the blade section in opposition to it, end up being required to be machined with high precision.

Therefore, that in the manner of a seventh embodiment shown in FIG. 33, for example, can be considered (those sections that are similar to the previously described first through sixth embodiment are indicated using the same reference symbols, and their explanations are omitted).

In an interchangeable blade cutting tool 700 of this seventh embodiment, the connecting section between cutting section 121 and tapered section 122 in its blade section 120 is in the form of an auxiliary tapered section 722 roughly in the shape of a truncated cone which, together with being continuous with the rear end of cutting section 121 and the front end of tapered section 122, has an outer diameter that gradually becomes narrower at a constant gradient as it approaches the rear end.

Here, in contrast to taper angle $\theta$ at one corner of tapered section 122 (the acute angle formed by tapered section 122 with axis O when viewed from a cross-section containing axis O) being set within the range of 2–25°, taper angle $\theta1$ at one corner of auxiliary tapered section 722 (acute angle formed by auxiliary tapered section 722 with axis O when viewed from a cross-section containing axis O) is set within the range of 10–80° so as to be larger than the above taper angle $\theta$ ($\theta<\theta1$).

In this manner, since auxiliary tapered section 722 that connects cutting section 121 and tapered section 122 is formed in blade section 120, and taper angle $\theta1$ at one corner of auxiliary tapered section 722 is larger than taper angle $\theta$ at one corner of tapered section 122, the outer peripheral surface of this auxiliary tapered section 722 (wall of blade section 120) is arranged in opposition to front end surface 111 of tool body 110.

A ring member 710 is interposed so as to encircle blade section 120 between the mutually opposing outer peripheral surface of auxiliary tapered section 722 of blade section 120 and front end surface 111 of tool body 110.

This ring member 710 is an elastic body in which Young's modulus is set within the range of 60–220 GPa, and more specifically, is made of, for example, aluminum or steel, and composed so as to be seamlessly continuous over its entire circumference.

One end surface 711, facing towards the rear end in the direction of axis O among a pair of end surfaces 711 and 712 roughly in the shape of a ring in ring member 710, extends so as to be perpendicular to the direction of axis O so as to correspond to the extension of front end surface 111 of tool body 110 perpendicular to the direction of axis O, while the other end surface 712 facing towards the front end in the direction of axis O has tapered surface 713 so that the inner diameter gradually becomes narrower as it approaches the rear end in the direction of axis O so as to correspond to the shape of auxiliary tapered section 722 of blade section 120 (the taper angle at one corner in tapered surface 713 roughly coincides with taper angle $\theta1$ at one corner in auxiliary tapered section 722).

In the state in which blade section 120 is installed on tool body 110, a state results in which the outer peripheral surface of tapered section 122 of blade section 120 is pressed tightly against the inner peripheral surface of tapered hole 113 of mounting hole 112, the outer peripheral surface of auxiliary tapered section 722 of blade section 120 is pressed tightly against tapered surface 713 formed on the other end surface 712 of ring member 710, and one end surface 711 of ring member 710 is pressed tightly against front end surface 111 of tool body 110.

Consequently, the outer peripheral surfaces of tapered section 122 and auxiliary tapered section 722 of blade section 120 press against the inner peripheral surface of tapered hole 113 in mounting hole 112 and tapered surface 713 formed in the other end surface 712 in ring member 710, respectively, and axis O of blade section 120 and axis O of tool body 110 are aligned and centered.

In interchangeable blade cutting tool 700 according to the seventh embodiment composed in this manner, since mutually coupled blade section 120 and bolt section 140 are inserted into mounting hole 112 followed by rotation of blade section 120 during installation of blade section 120 on tool body 110, blade section 120 is drawn towards the rear end in the direction of axis O by rotating bolt section 140 coupled to this blade section 120, and screwing male threads 142 of bolt section 140 into female threads 115 of mounting hole 112.

At this time, since ring member 710 is interposed between the outer peripheral surface of auxiliary tapered section 722 of blade section 120 and front end surface 111 of tool body 110, prior to contact between the outer peripheral surface of tapered section 122 of blade section 120 and the inner peripheral surface of tapered hole 113 of mounting hole 112, contact is made between the outer peripheral surface of auxiliary tapered section 722 of blade section 120 and tapered surface 713 formed in the other end surface 712 of ring member 710.

When blade section 120 is then continued to be drawn towards the rear end in the direction of axis O by rotating blade section 120 while in this state, one end surface 711 in the elastic body of ring member 710 presses tightly against front end surface 111 of tool body 110, and together with forming a tightly pressed surface that extends to as to be perpendicular to axis O, tapered surface 713 formed in the other end surface 712 in ring member 710 is pressed tightly against the outer peripheral surface of auxiliary tapered section 722 of blade section 120, resulting in the formation of a tightly pressed surface having a tapered shape for which the diameter gradually becomes narrower approaching the rear end in the direction of axis O (taper angle θ1 at one corner).

Among these two tightly pressed surfaces, since the tightly pressed surface of tapered surface 713 formed on the other end surface 712 in ring member 710 and the outer peripheral surface of auxiliary tapered section 722 of blade section 120 has a tapered shape in which the diameter gradually narrows as it approaches the rear end in the direction of axis O, accompanying blade section 120 being drawn towards the rear end in the direction of axis O, the elastic body of ring member 710 is widened by being elastically deformed so that is pushed apart towards the outside in the radial direction by the pressing force applied to its tapered surface 713.;

Consequently, blade section 120 can be further drawn towards the rear end in the direction of axis O by the amount ring member 710 is widened due to elastic deformation while maintaining the outer peripheral surface of auxiliary tapered section 722 of blade section 120 and tapered surface 713 formed on the other end surface 712 of ring member 710 in a state in which they are tightly pressed together, and finally the outer peripheral surface of tapered section 122 of blade section 120 and the inner peripheral surface of tapered hole 113 of mounting hole 112 are pressed tightly together.

As a result, blade section 120 is installed on tool body 110 while restrained on two sides in a state in which the outer peripheral surface of tapered section 122 and the outer peripheral surface of auxiliary tapered section 722 in blade section 120 are pressed against the inner peripheral surface of tapered hole 113 of mounting hole 112 and the tapered surface 713 formed on the other end surface 712 in ring member 710, respectively.

According to this seventh embodiment, since ring member 710 comprised of an elastic body is interposed between front end surface 111 of tool body 110 and a wall of blade section 120 in opposition to it (outer peripheral surface of auxiliary tapered section 722 of blade section 120) so that front end surface 111 and the outer peripheral surface of auxiliary tapered section 722 are tightly pressed together, when blade section 120 is drawn towards the rear end in the direction of axis O within mounting hole 112, even if the tightening torque applied by a worker to rotate blade section 120 is excessively large, due to the presence of this ring member 710, blade section 120 can be prevented from entering too deep into mounting hole 112, thereby preventing the occurrence of the problem in which blade section 120 can no longer be removed.

In addition, since the tightly pressed surface of tapered surface 713 formed on the other end surface 712 in ring member 710 comprised of an elastic body and the outer peripheral surface of auxiliary tapered section 722 in blade section 120 has a tapered shape in which the diameter gradually narrows as it approaches the rear end in the direction of axis O, when blade section 120 is drawn towards the rear end in the direction of axis O, this ring member 710 is widened by elastic deformation.

The degree of freedom of the movement of blade section 120 in the direction of axis O increases by the amount of this plastic formation by ring member 710, and simultaneous to maintaining a state in which the outer peripheral surface of auxiliary tapered section 722 in blade section 120 and tapered surface 713 formed on the other end surface 712 in ring member 710 are tightly pressed together, the outer peripheral surface of tapered section 122 of blade section 120 can be reliably tightly pressed against the inner peripheral surface of tapered hole 113 of mounting hole 112.

As a result, since a certain degree of error in machining accuracy can be absorbed, blade section 120 can be realized to be restrained on two side both easily and reliably, thereby enhancing the installation rigidity of blade section 120 and preventing the occurrence of chatter vibrations during cutting machining.

Moreover, by using this type of ring member 710, since the entrance of dust and other foreign objects into the gap between front end surface 111 of tool body 110 and the outer peripheral surface of auxiliary tapered section 722 arranged in opposition to this front end surface 111 can be prevented, even if blade section 120 is repeatedly installed and removed, the risk of foreign objects entering between the outer peripheral surface of tapered section 122 of blade section 120 and the inner peripheral surface of tapered hole 113 of mounting hole 112 is reduced, thereby making it possible to continuously maintain blade section 120 in a stable installation state.

Here, as a result of setting Young's modulus of the elastic body of ring member 710 to the range of 60–220 GPa, pressing force along the direction of axis O required to enhancing the installation rigidity of blade section 120 can be suitably generated, and elastic deformation required to absorb error in machining accuracy can be suitably obtained.

If this Young's modulus is less than 60 GPa, the required pressing force along the direction of axis O is unable to be adequately obtained, resulting in the risk of being unable to enhance installation rigidity. On the other hand, if Young's modulus is greater than 220 GPa, there is the risk of being unable to adequately obtain the required elastic deformation of ring member 710.

Furthermore, Young's modulus of ring member 710 is preferably set to the range of 70–130 GPa in order to obtain the above effects more reliably.

In addition, by setting taper angle θ1 at one corner of auxiliary tapered section 722 to the range of 10–80° with respect to the tightly pressed surface of tapered surface 713 formed on the other end surface 712 in ring member 710 and the outer peripheral surface of auxiliary tapered section 722 in blade section 120, pressing force along the direction of axis O required to enhance the installation rigidity of blade section 120 can be adequately secured, and elastic deformation of ring member 710 required to absorb error in machining accuracy can be adequately generated.

If this taper angle θ1 is smaller than 10°, it becomes difficult to obtain pressing force along the direction of axis O, resulting in the risk of the effect of enhancing the installation rigidity of blade section 120 by restraining on two sides being diminished. On the other hand, if taper angle θ1 is larger than 80°, the friction generated on this tapered tightly pressed surface becomes excessively large, thereby resulting in the risk of it being difficult to widen the diameter of ring member 710 by elastic deformation.

Furthermore, taper angle θ1 is preferably set to a range of 30–60° in order to obtain the above effects more reliably.

Furthermore, in this seventh embodiment, although the tightly pressed surface of ring member 710 (tapered surface 713 formed on the other end surface 712) and a wall of blade section 120 (outer peripheral surface of auxiliary tapered section 722) employs a tapered shape in which the diameter is gradually widened as it approaches the rear end in the direction of axis O, the present invention is not limited to this. For example, even if the tightly pressed surface of ring member 710 and front end surface 111 of tool body 110 has a tapered shape in which the diameter is gradually widened as it approaches the rear end in the direction of axis O, effects like those described above can still be obtained. In addition, both the tightly pressed surfaces of ring member 710 and front end surface 111 of tool body 110 as well as ring member 710 and a wall of blade section 120 may have a tapered shape.

Moreover, ring member 710 is not limited to that which is seamlessly continuous over its entire circumference, but rather that may be used which is roughly C-shaped having a single notch cut out of it.

In addition, although a hook section composed of an end section and a shaft section is formed in the rear end section of the blade section, and a large hook hole through which the end section and shaft section of the hook section are able to pass is formed in the front end section of a bolt section (drawing member) in each of the previously described embodiments, the present invention is not limited to this, but rather together with forming a hook hole in the rear end section of the blade section that opens to its rear end and has a size that allows the end section of the hook section to pass through, disengaging sections capable of engaging with the corner sections of the end section of the hook section may be formed on the walls around this hook hole, and a hook section, composed of a shaft section and an end section provided with a corner section that protrudes in the from of a ledge towards the outside in the radial direction farther than the shaft section, may be formed in the front end section of the bolt section (drawing member).

In addition, in an interchangeable blade cutting tool as explained above, although the rear end section of the tool body is installed on a rotary shaft of a machine tool, and this tool body is rotated about an axis, the present invention is not limited to this, but rather, for example, the rotary shaft of the machine tool may serve as the tool body, or in other words, a mounting hole like that described above may be provided in the front end surface in the rotary shaft of the machine tool, and a blade section may be installed in this mounting hole (the tool body is expressed in a manner in which it includes the rotary shaft of the machine tool).

Moreover, although the cutting section of the blade section used in an interchangeable blade cutting tool as explained above has been explained to be provided with at least one cutting blade, the present invention is not limited to this, but rather, for example, a blade section may be used that has a cutting section in which at least one cutting blade is formed by post-machining in the form of grinding, a blade section may be used in which a cutting section provided with at least one cutting blade is joined by brazing and so forth, or a blade section may be used in which a cutting section provided with at least one cutting blade is installed in the manner of a throwaway type such as by fastening with screws.

What is claimed is:

1. An interchangeable blade cutting tool comprising:
    a blade section having a cutting section and a rear end section;
    a drawing member removably coupled to the rear end section;
    a tool body having a mounting hole into which said blade section and said drawing member are inserted by drawing the drawing member towards a back end in an axial direction of the tool body as to be removably installed in the tool body;
    a hook section, formed in at least one of the rear end section of the blade section and the drawing member, comprising:
        a shaft section; and
        an end section having a corner section protruding farther to an outside of the tool body in a radial direction than the shaft section; and
    a hook receiving section, formed opposite the hook section in the other of the blade section and the drawing member, and having an end face having an opening sized to allow passage of an end section of the hook section;
    wherein said opening is closed in a peripheral direction;
    wherein the end section of the hook section is passed through the opening and the blade section is relatively rotated by a prescribed angle in the peripheral direction with respect to the drawing member, and as a result of contacting the hook receiving section with the hook section, relative rotation in the peripheral direction by the blade section and drawing member, as well as relative movement in the direction in which they move away from each other in the axial direction, are inhibited, and the blade section and drawing member are coupled.

2. An interchangeable blade cutting tool according to claim 1, wherein:
    the hook receiving section having engaging sections capable of engaging with corner sections of the end section of the hook section in at least one of the rear end section of the blade section and the drawing member, and
    wherein, the hook section contacts the rear end section in the other of the blade section and the drawing member having the hook receiving section, and the blade section and the drawing member are coupled.

3. An interchangeable blade cutting tool according to claim 1, wherein
    the hook section having a first wall that restricts rotation in both directions capable of contacting the inner peripheral surface of the hook receiving section in the shaft section thereof, and
    by contacting the first wall that restricts rotation in both directions with the inner peripheral surface of the hook receiving section, and by contacting corner sections of the end section of the hook section with walls around the hook receiving section, the hook section contacts a rear end section of the hook receiving section, and the blade section and the drawing member are coupled.

4. An interchangeable blade cutting tool according to claim 1, wherein
    the hook section having a second wall that restricts rotation in one direction in the shaft section thereof for inhibiting further relative rotation in one direction in the peripheral direction by contacting an inner peripheral surface of the hook receiving section such that the blade section is relatively rotated by the prescribed angle in one direction in the peripheral direction with respect to the drawing member after inserting and passing the end section of a hook section through the opening in the hook receiving section.

5. An interchangeable blade cutting tool according to claim 1, wherein
    the drawing member has a meshing section,
    a mounting section has a meshed section, and
    the meshing section of the drawing member being screwed into the meshed section of the mounting section,
    the drawing member is drawn towards an end of the tool body in the axial direction of the tool body.

6. An interchangeable blade cutting tool according to claim 1, wherein
    the blade section has the cutting section, a tapered section roughly in the shape of a truncated cone that is continuous with a bottom end of the cutting section and in which an outer diameter is gradually narrowed towards a bottom end, and a bottom end section of the blade section continuous with the bottom end of the tapered section, a mounting section having a tapered hole roughly in the shape of a truncated cone in which an inner diameter is gradually narrowed towards a rear end side, and the blade section is removably installed by an outer peripheral surface of the tapered section of the blade section pressing against an inner peripheral surface of the tapered hole of the mounting section.

7. An interchangeable blade cutting tool according to claim 1, wherein:

a pressing member which presses the blade section and the drawing member in the direction in which the blade section and the drawing section move away from each other when inserting the end section of the hook section into the hook receiving section.

8. A blade section installed on an interchangeable blade cutting tool according to claim 1, further comprising:

the cutting section, and wherein the corner section of the end section protruding as a ledge farther to an outside in the radial direction than the shaft section, and the hook receiving section, having an opening size to allow passage of the end section of the hook section through an end section surface, being formed in the rear end section.

9. A blade section installed on an interchangeable blade cutting tool according to claim 1, wherein the blade section is composed of material having greater rigidity than the hook receiving section.

* * * * *